(12) United States Patent
Murakami et al.

(10) Patent No.: US 9,160,491 B2
(45) Date of Patent: Oct. 13, 2015

(54) RECEIVING APPARATUS AND RECEIVING METHOD

(71) Applicant: PANASONIC INTELLECTUAL PROPERTY CORPORATION OF AMERICA, Torrance, CA (US)

(72) Inventors: Yutaka Murakami, Osaka (JP); Kiyotaka Kobayashi, Kanagawa (JP); Masayuki Orihashi, Kanagawa (JP); Akihiko Matsuoka, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/094,420

(22) Filed: Dec. 2, 2013

(65) Prior Publication Data

US 2014/0086366 A1 Mar. 27, 2014

Related U.S. Application Data

(63) Continuation of application No. 13/591,840, filed on Aug. 22, 2012, now Pat. No. 8,625,702, and a
(Continued)

(30) Foreign Application Priority Data

Nov. 26, 2003 (JP) .................................. 2003-395219
Oct. 1, 2004 (JP) .................................. 2004-290441

(51) Int. Cl.
*H04L 27/06* (2006.01)
*H04L 1/06* (2006.01)
(Continued)

(52) U.S. Cl.
CPC ................ *H04L 1/06* (2013.01); *H04B 7/0413* (2013.01); *H04B 7/0854* (2013.01); *H04L 1/006* (2013.01);
(Continued)

(58) Field of Classification Search
CPC ..... H04L 27/38; H04L 27/34; H04L 27/3488; H04L 1/0041; H04L 1/0071; H04L 1/0054; H04L 1/005; H04L 25/067; H04L 1/0066; H04L 27/18; H04L 27/0008; H04L 27/2035; H04L 27/2057; H04L 27/2085; H04L 27/186; H04L 27/2071; H04L 27/2273; H04L 1/004; H04L 1/0059; H04L 25/06; H04L 27/22; H04L 27/2332; H04L 2027/003; H04L 27/2276; H04L 2027/0067; H04L 1/0045; H04L 27/2647; H04L 1/007; H04B 1/707; H03M 13/41; H03M 13/4107; H03M 13/6502; G11B 20/10009; H04N 19/39; H04N 19/70; H04N 19/30; H04N 19/187; H04N 19/44
USPC ......... 374/261, 262, 279, 280, 281, 329, 332, 374/316, 340, 341, 377
See application file for complete search history.

(56) References Cited

U.S. PATENT DOCUMENTS 4,823,346 A 4/1989 Kobayashi
5,600,672 A 2/1997 Oshima
(Continued)

FOREIGN PATENT DOCUMENTS

JP 62-243431 10/1987
JP 6-164665 6/1994
(Continued)

OTHER PUBLICATIONS

PCT International Search Report dated Feb. 8, 2005 for PCT/JP2004/016339.
(Continued)

*Primary Examiner* — Tesfaldet Bocure
(74) *Attorney, Agent, or Firm* — Dickinson Wright PLLC

(57) ABSTRACT

A transmitting apparatus and method transmits different modulated signals from a plurality of antennas, and employs a configuration that includes a modulation section that obtains a modulated signal by performing signal point mapping of transmit bits using a signal point arrangement that is divided into a plurality of signal point sets on the IQ plane, whereby the minimum distance between signal points within a signal point set is smaller than the minimum signal point distance between signal point sets; and an antenna that transmits a modulated signal obtained by the modulation section. A signal point generating apparatus generates a first and second symbols to be transmitted by first and second antennas, respectively.

4 Claims, 36 Drawing Sheets

Related U.S. Application Data continuation of application No. 13/043,147, filed on Mar. 8, 2011, now Pat. No. 8,275,069, and a continuation of application No. 12/694,089, filed on Jan. 26, 2010, now Pat. No. 7,920,647, which is a continuation of application No. 10/580,398, filed as application No. PCT/JP2004/016339 on Nov. 4, 2004, now Pat. No. 7,715,504.

(51) Int. Cl.
| | | |
|---|---|---|
| H04N 19/39 | (2014.01) | |
| H04L 1/00 | (2006.01) | |
| H04L 25/06 | (2006.01) | |
| H04L 27/34 | (2006.01) | |
| H04L 27/38 | (2006.01) | |
| H04B 7/04 | (2006.01) | |
| H04B 7/08 | (2006.01) | |
| H04L 25/03 | (2006.01) | |

(52) U.S. Cl.
CPC .............. *H04L 1/007* (2013.01); *H04L 1/0054* (2013.01); *H04L 25/03305* (2013.01); *H04L 25/03324* (2013.01); *H04L 25/03891* (2013.01); *H04L 25/061* (2013.01); *H04L 27/3488* (2013.01); *H04L 27/38* (2013.01); *H04N 19/39* (2014.11); *H04L 2025/03611* (2013.01)

(56) References Cited

U.S. PATENT DOCUMENTS

| | | | |
|---|---|---|---|
| 5,802,241 | A | 9/1998 | Oshima |
| 5,819,000 | A | 10/1998 | Oshima |
| 5,892,879 | A | 4/1999 | Oshima |
| 5,953,376 | A | 9/1999 | Wei |
| 6,115,435 | A | 9/2000 | Harada |
| 6,289,485 | B1* | 9/2001 | Shiomoto ............... 714/779 |
| 6,404,755 | B1 | 6/2002 | Schafer |
| 6,798,838 | B1* | 9/2004 | Ngo ............... 375/240.19 |
| 2002/0131515 | A1 | 9/2002 | Rodriguez |
| 2002/0150038 | A1 | 10/2002 | Sumasu |
| 2002/0155835 | A1 | 10/2002 | Pankaj |
| 2002/0191535 | A1 | 12/2002 | Sugiyama |
| 2003/0021355 | A1* | 1/2003 | You ............... 375/267 |
| 2003/0067991 | A1 | 4/2003 | Okamoto |
| 2004/0028157 | A1 | 2/2004 | Aoki |
| 2004/0132413 | A1 | 7/2004 | Hwang |
| 2004/0137864 | A1 | 7/2004 | Hwang |
| 2005/0111581 | A1 | 5/2005 | Walker |
| 2006/0050805 | A1* | 3/2006 | Chen et al. ............... 375/295 |
| 2006/0085727 | A1* | 4/2006 | Azenkot et al. ............... 714/792 |
| 2006/0153315 | A1* | 7/2006 | Chen et al. ............... 375/295 |
| 2006/0160496 | A1 | 7/2006 | Murakami |
| 2007/0011716 | A1* | 1/2007 | Koslov et al. ............... 725/135 |
| 2007/0248200 | A1 | 10/2007 | Aoki |
| 2008/0123578 | A1 | 5/2008 | Golitschek Edler Von Elbwart et al. |

FOREIGN PATENT DOCUMENTS

| | | |
|---|---|---|
| JP | 8-32633 | 2/1996 |
| JP | 10-136046 | 6/1998 |
| JP | 2000-315957 | 1/2000 |
| JP | 2000-187948 | 7/2000 |
| JP | 2001-127809 | 5/2001 |
| JP | 2003-87345 | 3/2003 |
| JP | 2003-124907 | 4/2003 |
| JP | 2003-152818 | 5/2003 |
| JP | 2003/525537 | 8/2003 |
| JP | 2003-273837 | 9/2003 |
| WO | 01/39455 | 5/2001 |
| WO | WO0165848 | * 9/2001 |
| WO | 02/45442 | 6/2002 |
| WO | 03/081804 | 10/2003 |

OTHER PUBLICATIONS

European Search Report dated Oct. 10, 2008 for European Patent Application No. 04 79 9499.

European Search Report dated Dec. 23, 2010 for European Patent Application No. 10191874.6.

Notice of the Reasons for Rejection dated Aug. 16, 2011 for Japanese Application No. 2009-283052.

Japanese Office Action dated Dec. 13, 2011 for Japanese Application No. 2009-283052.

M. Morimoto, et al,, "Joint On-Board Resource Sharing and Hierarchical Modulation Scheme for Satellite Communication," Global Telecommunications Conference, Nov. 13, 1995, Vo. 3, pp. 1662-1666.

E. Biglieri, et al., "Digital Transmission in the 21st Century: Conflating Modulation and Coding," IEEE Communications Magazine, May 1, 2002, vol. 40, No. 5, pp. 128-137.

P. Vitthaladevuni, et al., "BER Computation of Generalized QAM Constellations," University of Minnesota Department of Electrical and Computer Engineering, IEEE Global Telecommunications Conference 2001, GLOBECOM '01, vol. 1, Nov. 2001, pp. 632-636.

P. Vitthaladevuni, et al., "BER Computation of 4/M-QAM Hierarchical Constellations," University of Minnesota Department of Electrical and Computer Engineering, 12th IEEE International Symposium on Personal, Indoor, and Mobile Radio Communications, 2001, vol. 1, Sep. 2001, pp. B-85-B-89.

P. Vitthaladevuni, et al., "BER Computation of 4/M-QAM Hierarchical Constellations," University of Minnesota Department of Electrical and Computer Engineering, IEEE Transactions on Broadcasting, vol. 47, No. 3, Sep. 2001, pp. 228-239.

P. Vitthaladevuni, et al., "Exact BER Computation of Generalized Hierarchical PSK Constellations," University of Minnesota Department of Electrical and Computer Engineering, IEEE International Conference on Communications, 2002, vol. 3, May 2002, pp. 1974-1978.

P. Vitthaladevuni, et al., "A Recursive Algorithm for the Exact BER Computation of Generalized Hierarchical QAM Constellations," University of Minnesota Department of Electrical and Computer Engineering, IEEE Transactions on Information Theory, vol. 49, No. 1, Jan. 2003, pp. 297-307.

M. Hossain, et al., "Hierarchical Modulations for Multimedia and Multicast Transmission over Fading Channels," University of Minnesota and University of Victoria Departments of Electrical and Computer Engineering, IEEE Semiannual Vehicular Technology Conference 2003, vol. 4, Apr. 2003, pp. 2633-2637.

P. Vitthaladevuni, et al., "An Upper Bound on the BER of Block Coded Hierarchical Constellations," University of Minnesota Department of Electrical and Computer Engineering, IEEE Pacific Rim Conference on Communications, Computers and Signal Processing, 2003, vol. 2, Aug. 2003, pp. 950-953.

P. Vitthaladevuni, et al., "Errata for 'BER Computation of 4/M-QAM Hierarchical Constellations'," University of Minnesota Department of Electrical and Computer Engineering, IEEE Transactions on Broadcasting, vol. 49, No. 4, Dec. 2003, p. 408.

ETSI EN 300 744 V1.6.1 (Final Draft), "Digital Video Broadcasting (DVB); Framing structure, channel coding and modulation for digital terrestrial television," European Broadcasting Union, Sep. 2008, 66 pages.

ETS 300 744, "Digital Video Broadcasting (DVB); Framing structure, channel coding and modulation for digital Terrestrial television (DVB-T)," European Telecommunications Standards Institute, Mar. 1997, 48 pages.

T. Aoki, et al., "A study on group detection using ZF and MLD algorithm in a MIMO channel," The Institute of Electronics, Information and Communication Engineers Koen Ronbunshu Tsushin Society Taikai 1, B-5-16, Sep. 10, 2003, p. 393.

(56) References Cited

OTHER PUBLICATIONS

Y. Ashina, et at, "Computational Complexity Reduction of MIMO-MLD for Space Division Multiplexing Systems," the $25^{th}$ Symposium of Information Theory and Its Applications, Dec. 10-13, 2002, pp. 503-506.

X. Zhuang, et al., "Coding-Assisted MIMO Joint Detection arid Decoding in Turbo-Coded OFDM," Vehicular Technology Conferences, 2002, Proceedings, VTC 2002-Fall, 2002 IEEE 56th, vol. 1, Sep. 2002, pp. 23-27.

K. Kobayashi, et al., "Soft-Decision Decoder Employing Eigenvalue of Channel Matrix in MIMO Systems," The 14th IEEE 2003 International Symposium on Personal Indoor and Mobile Radio Communication Proceedings, Sep. 2003, pp. 1703-1707.

B. Bjerke, et at, "Multiple-Antenna Diversity Techniques for Transmission over Fading Channels," IEEE, WCNC, Sep. 1999, pp. 1038-1042.

H. Sung, et al., "A Simplified Maximum Likelihood Detection Scheme for MIMO Systems," in Proceedings of the IEEE VTC 2003, Oct. 2003, vol. 1, pp. 419-423.

E. Cavus, et al., "A Computationally Efficient Algorithm for Space-Time Block Decoding," ICC 2001, 2001 IEEE International Conference on Communications, Conference Record, Helsinki, Finland, Jun. 11-14, 2001, IEEE International Conference on Communications, New York, NY, IEEE, US, vol. 4, Jun. 11, 2001, pp. 1157-1162.

M. Isaka, et al., "Error Performance Analysis of Multilevel Coded Asymmetric Modulation with Multistage Decoding and Unequal Error Protection," Technical Report of IEICE, Jan. 27, 1998, vol. 97, No. 511, pp. 7-12.

M. Morimoto, et al., "A Study on a Hierarchical Image Transmission System in a Rayleigh Fading Channel," Technical Report of IEICE, RCS96-22, vol. 96, No. 49, May 21, 1996, pp. 33-38 with partial translation.

K. Sumiya, et al., "The Euclidean Distances between Codes with Block Coded Modulation over Fading Channels," Technical Report of IEICE, Jan. 28, 1994, vol. 93, No. 445, pp. 95-100 with English translation.

Japanese Office Action dated Oct. 13, 2009 for Japanese Application No. 2004.290441 with English Translation.

* cited by examiner

AREA 1  Sa0=1
AREA 2  Sa0=0
AREA 3  Sa2=1
AREA 4  Sa2=0
AREA 5  Sa3=1

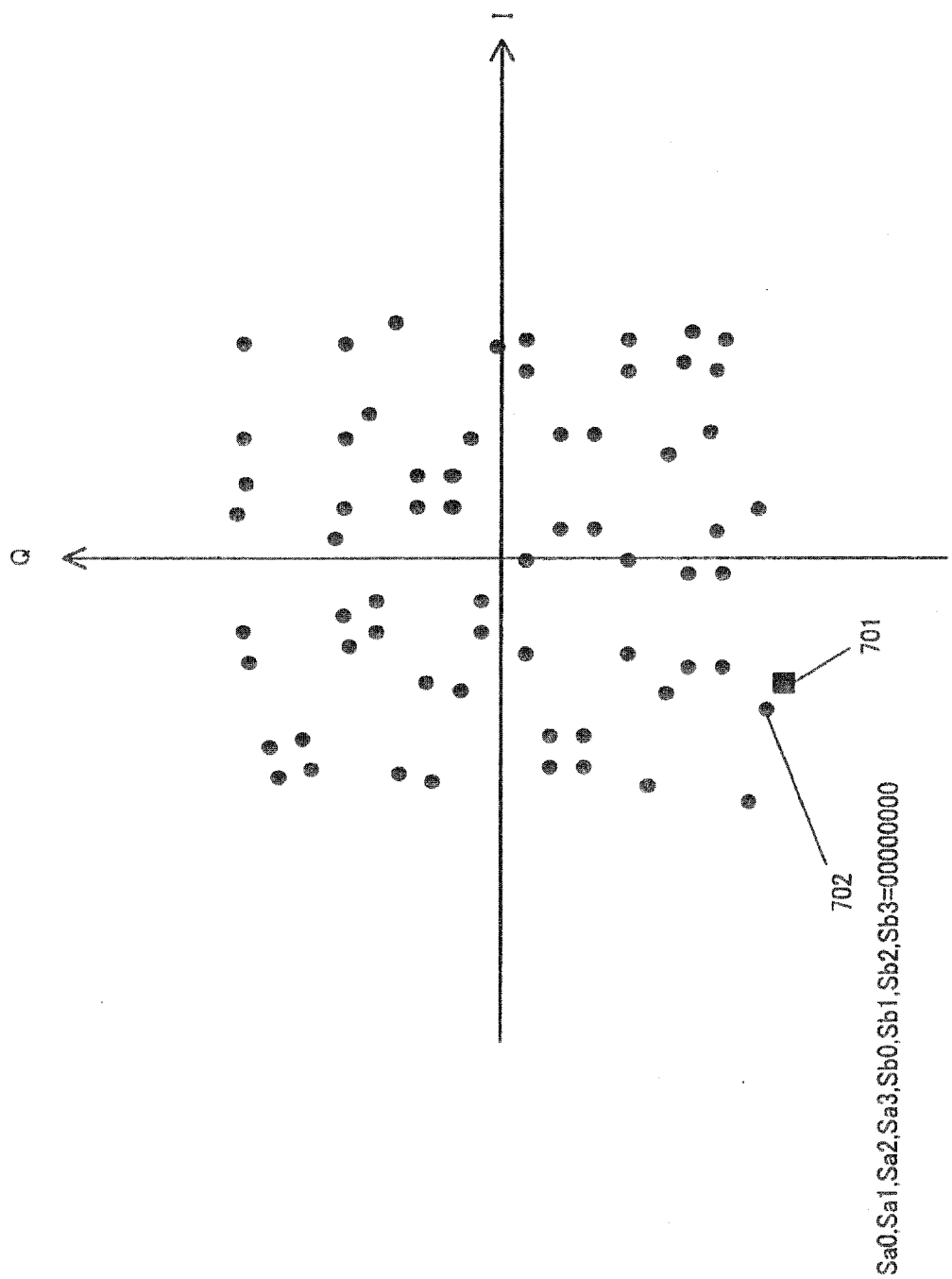

RECEIVING APPARATUS AND RECEIVING METHOD

This is a continuation application of application Ser. No. 13/591,840 filed Aug. 22, 2012, which is a continuation application of application Ser. No. 13/043,147 filed Mar. 8, 2011, which is a continuation application of application Ser. No. 12/694,089 filed Jan. 26, 2010, which is a continuation application of application Ser. No. 10/580,398 filed May 24, 2006, which is a national stage of PCT/JP2004/016339 filed Nov. 4, 2004, which is based on Japanese Application No. 2003-395219 filed Nov. 26, 2003 and Japanese Application No. 2004-290441 filed Oct. 1, 2004, the entire contents of each of which are incorporated by reference herein.

TECHNICAL FIELD

The present invention relates to a receiving apparatus that receives and demodulates modulated signals transmitted simultaneously from a plurality of antennas and a transmitting apparatus that transmits modulated signals simultaneously from a plurality of antennas.

BACKGROUND ART

Hitherto, the technology disclosed in Non-Patent Document 1 has been known as a demodulation method using a plurality of antennas. The contents disclosed in this Non-Patent Document 1 are briefly described below using an accompanying drawing.

In FIG. 1, in a transmitting apparatus 30, a transmit signal A digital signal 1 and transmit signal 13 digital signal 2 are input to a modulated signal generation section 3. Modulated signal generation section 3 executes BPSK (Binary Phase Shift Keying), QPSK (Quadrature Phase Shift Keying), 16QAM (Quadrature Amplitude Modulation), or suchlike modulation on transmit signal A digital signal 1 and transmit signal B digital signal 2, thereby obtaining a transmit signal A baseband signal 4 and transmit signal B baseband signal 5, and sends these signals to a radio section 6.

Radio section 6 executes predetermined radio processing such as frequency conversion and amplification on transmit signal A baseband signal 4 and transmit signal B baseband signal 5, thereby obtaining a transmit signal A modulated signal 7 and transmit signal B modulated signal 8, and supplies these signals to an antenna 9 and antenna 10 respectively. By this means, transmit signal A modulated signal 7 is emitted as a radio wave from antenna 9, and transmit signal B modulated signal 8 is emitted as a radio wave from antenna 10.

In a receiving apparatus 40, a radio section 13 executes radio processing such as frequency conversion and amplification on a received signal 12 received by an antenna 11, thereby obtaining a baseband signal 14, and sends this signal to a maximum likelihood detection section 19. Similarly, a radio section 17 executes radio processing such as frequency conversion and amplification on a received signal 16 received by an antenna 15, thereby obtaining a baseband signal 18, and sends this signal to maximum likelihood detection section 19.

By detecting baseband signals 14 and 18, maximum likelihood detection section 19 obtains a transmit signal A received digital signal 20 and transmit signal B received digital signal 21. At this time, maximum likelihood detection section 19 performs Maximum Likelihood Detection (MLD) as shown in Non-Patent Document 1.

Non-patent Document 1: IEEE WCNC 1999, pp. 1038-1042, September 1999.

DISCLOSURE OF INVENTION

Problems to be Solved by the Invention

However, with the configuration in FIG. 1, if 16QAM is performed by modulated signal generation section 3, for example, when MLD is performed by maximum likelihood detection section 19, it is necessary to find the Euclidian distances between 16×16=256 candidate signal points and a received signal. Furthermore, if 64QAM is performed by modulated signal generation section 3, when MLD is performed by maximum likelihood detection section 19, it is necessary to find the Euclidian distances between 64×64=4096 candidate signal points and a received signal. When detection is performed by means of such computations, while good reception quality (bit error rate performances) can certainly be achieved, there is a problem in that the computational complexity is large because of the large number of computations. As described above, this problem becomes more pronounced as the modulation M-ary number increases.

It is an object of the present invention to provide a receiving apparatus that can demodulate a plurality of modulated signals transmitted from a plurality of antennas with a comparatively small computational complexity and good bit error rate performances. It is also an object of the present invention to provide a transmitting apparatus that forms a transmit signal such that a received signal with good bit error rate performances can be obtained on the receiving side with a comparatively small computational complexity.

Means for Solving the Problems

A receiving apparatus of the present invention receives modulated signals transmitted from a transmitting apparatus that transmits different modulated signals from a plurality of antennas; and employs a configuration that includes: a channel fluctuation estimation section that finds a channel estimate of each modulated signal; a partial bit demodulation section that demodulates only some bits of a modulated signal using a detection method different from likelihood detection; a signal point reduction section that reduces the number of candidate signal points using demodulated partial bits and a channel estimate; and a likelihood detection section that performs likelihood detection using a reduced number of candidate signal points and a received baseband signal.

According to this configuration, since demodulation of only some bits is performed by the partial bit demodulation section using a detection method different from likelihood detection, partial bits can be obtained with a small amount of computation. Also, likelihood detection is performed by the likelihood detection section using a reduced number of candidate signal points so that the remaining bits can be found with a high degree of precision using a small amount of computation. As likelihood detection is performed on a partial basis in this way, a received digital signal with good bit error rate performances can be obtained while reducing the number of computations for finding Euclidian distances.

A transmitting apparatus of the present invention transmits different modulated signals from a plurality of antennas, and employs a configuration that includes: a modulation section that obtains a modulated signal by performing signal point mapping of transmit hits using a signal point arrangement that is divided into a plurality of signal point sets on the IQ plane, and whereby the minimum distance between signal points within a signal point set is smaller than the minimum signal point distance between signal point sets; and an antenna that transmits a modulated signal obtained by the modulation section.

According to this configuration, a bit common to signal points within a signal set can be determined easily and accurately on the receiving side. Thus, an extremely convenient transmit signal can be formed for a receiving apparatus for which demodulation of only some bits (partial bits) of a modulated signal is required.

Advantageous Effect of the Invention

According to the present invention, a receiving apparatus can be realized that can demodulate a plurality of modulated signals transmitted from a plurality of antennas with a comparatively small computational complexity and good bit error rate performances. Also, a transmitting apparatus can be realized that forms a transmit signal such that a received signal with good bit error rate performances can be obtained on the receiving side with a comparatively small computational complexity.

BRIEF DESCRIPTION OF DRAWINGS

FIG. 7 is a drawing showing a 16QAM bit arrangement applied to modulated signal A (FIG. 7A) and a 16QAM bit arrangement applied to modulated signal B (FIG. 7B);

FIG. 10 is a drawing showing the signal point state after signal point reduction according to Embodiment 1;

MODES FOR CARRYING OUT THE INVENTION

Embodiments of the present invention will now be described in detail with reference to the accompanying drawings.

(Embodiment 1)

Figure 2:
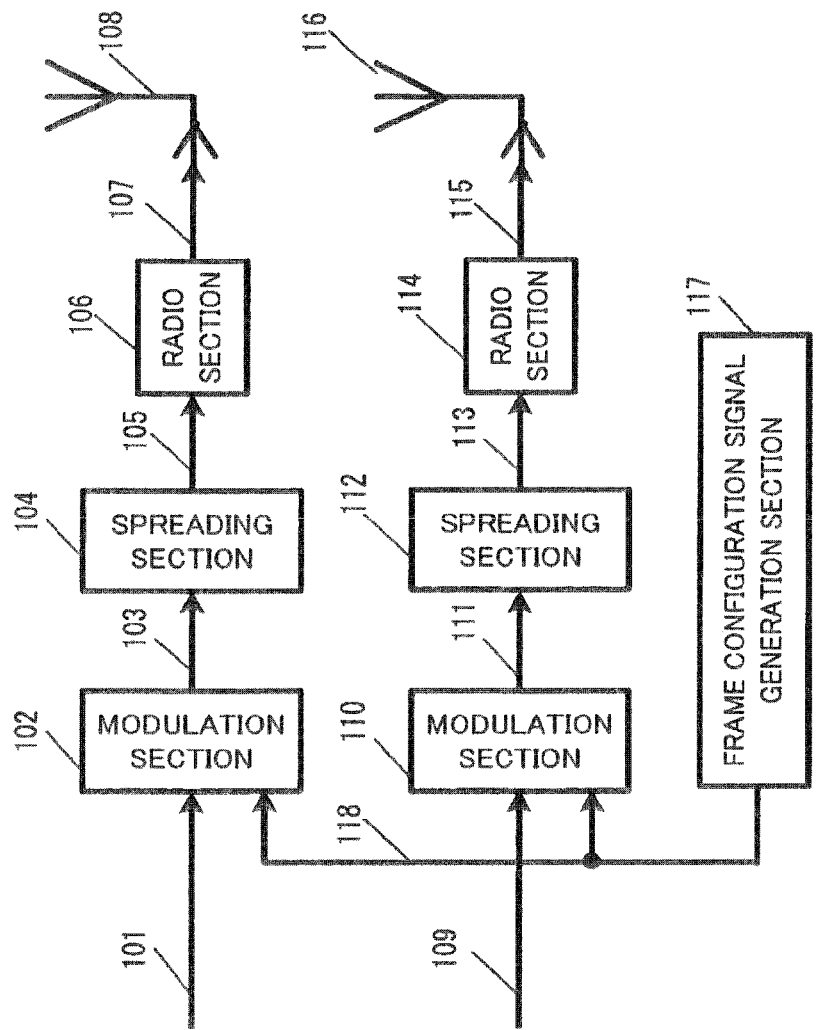
FIG. 2 is a block diagram showing the configuration of a transmitting apparatus according to Embodiment 1 of the present invention.

FIG. 2 shows the configuration of a transmitting apparatus of this embodiment. In transmitting apparatus 100, digital signal 101 is input to modulation section 102, and digital signal 109 is input to modulation section 110.

Modulation section 102 has digital signal 101 and frame configuration signal 118 as input, modulates digital signal 101 in accordance with frame configuration signal 118, and sends baseband signal 103 thus obtained to spreading section 104. Spreading section 104 multiplies baseband signal 103 by a spreading code, and sends a spread baseband signal 105 thus obtained to radio section 106. Radio section 106 executes frequency conversion, amplification, and so forth on spread baseband signal 105, thereby obtaining modulated signal 107. Modulated signal 107 is output as a radio wave from an antenna 108.

Modulation section 110 has digital signal 109 and frame configuration signal 118 as input, modulates digital signal 109 in accordance with frame configuration signal 118, and sends baseband signal 111 thus obtained to spreading section 112. Spreading section 112 multiplies baseband signal 111 by a spreading code, and sends spread baseband signal 113 thus obtained to radio section 114. Radio section 114 executes frequency conversion, amplification, and so forth on spread baseband signal 113, thereby obtaining modulated signal 115. Modulated signal 115 is output as a radio wave from an antenna 116.

In the following description, a signal transmitted from antenna 108 is referred to as modulated signal A, and a signal transmitted from antenna 116 is referred to as modulated signal B.

Figure 3:
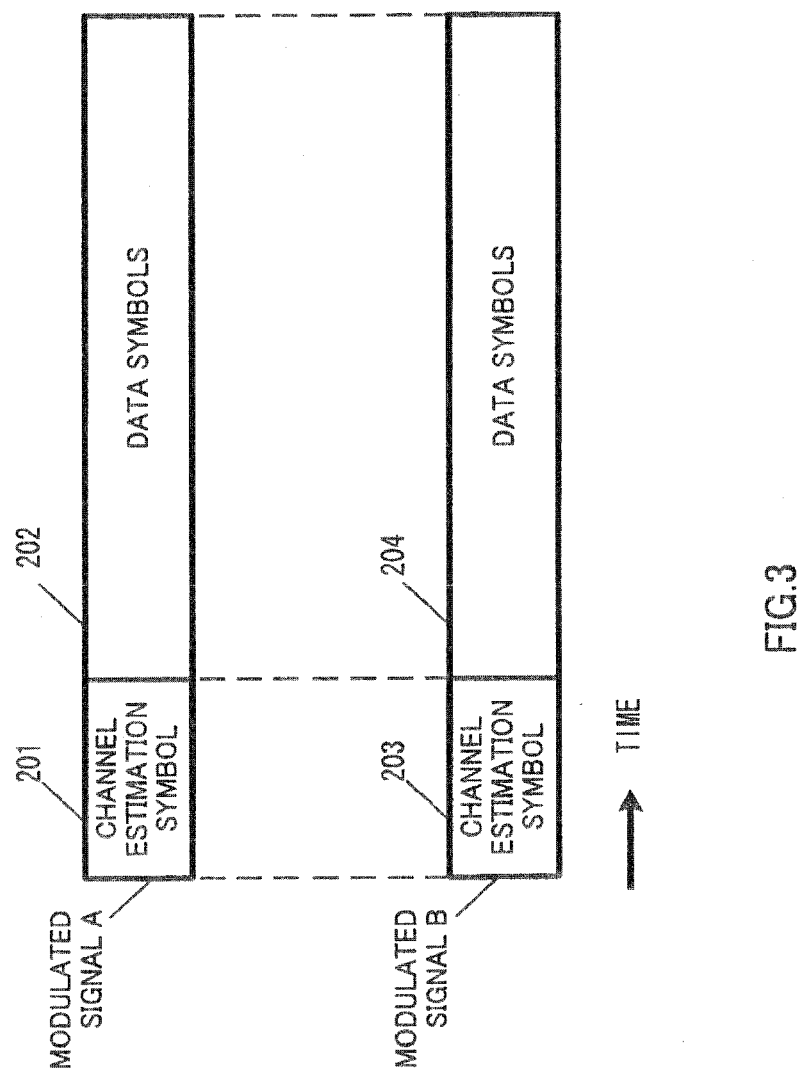
FIG. 3 is a drawing showing frame configurations of Embodiment 1.

Frame configuration signal generation section 117 outputs information indicating frame configurations—such as information on the frame configurations in FIG. 3, for example—as frame configuration signal 118.

FIG. 3 shows sample frame configurations of modulated signals transmitted from antennas 108 and 116 of transmitting apparatus 100. Modulated signal A transmitted from antenna 108 and modulated signal B transmitted from antenna 116 have channel estimation symbols 201 and 203 for channel estimation, and data symbols 202 and 204. Transmitting apparatus 100 transmits modulated signal A and modulated signal B with the frame configurations shown in FIG. 3 at virtually the same time. Channel estimation symbols 201 and 203 for channel estimation can also be referred to as pilot symbols, unique words, or preambles.

Figure 4:
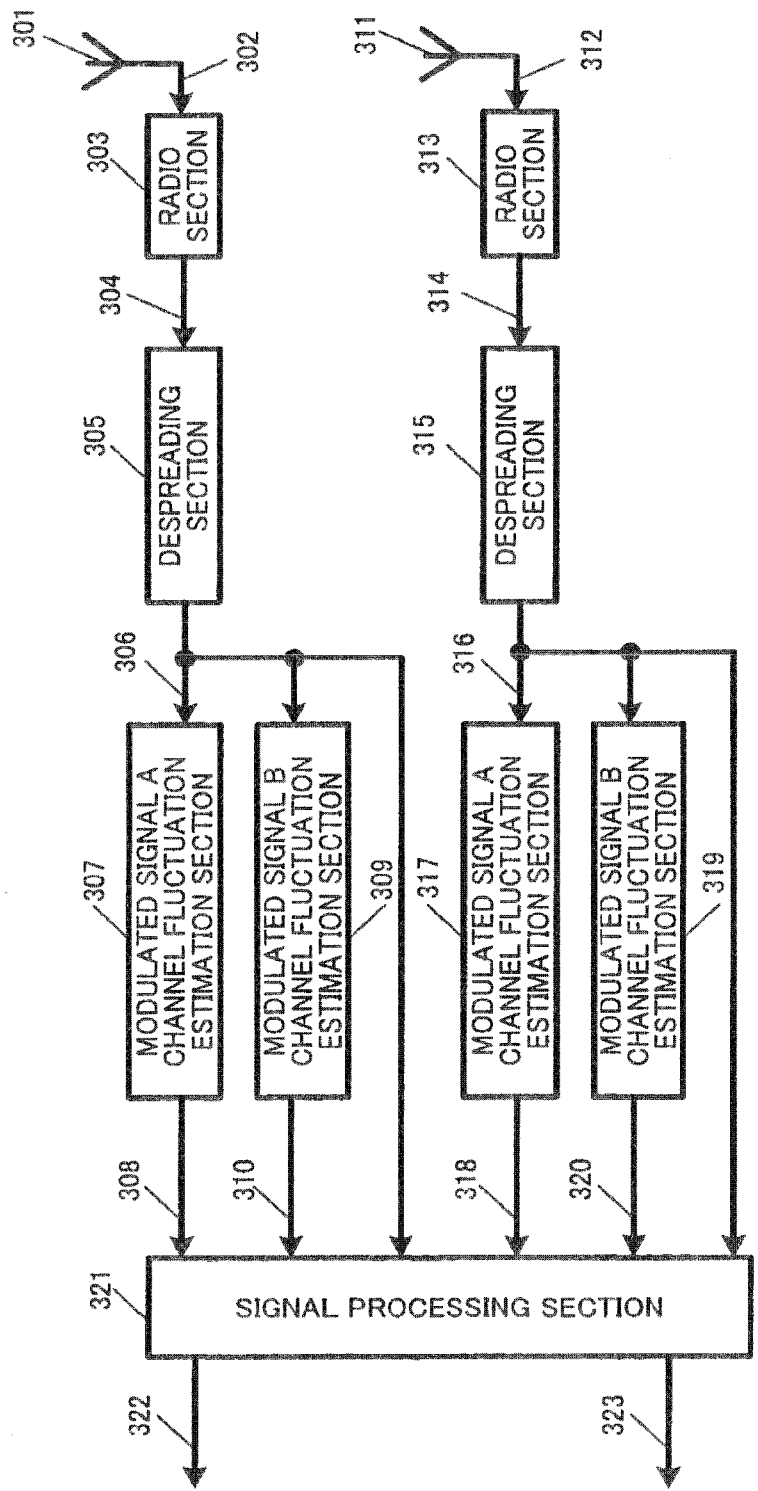
FIG. 4 is a block diagram showing the configuration of a receiving apparatus according to Embodiment 1 of the present invention.

FIG. 4 shows the configuration of a receiving apparatus of this embodiment. Receiving apparatus 300 receives signals from two antennas 301 and 311.

A radio section 303 has received signal 302 received by antenna 301 as input, executes frequency conversion, quadrature demodulation, and so forth on received signal 302, and sends baseband signal 304 thus obtained to despreading section 305. Despreading section 305 despreads baseband signal 304, and outputs despread baseband signal 306 thus obtained.

Modulated signal A channel fluctuation estimation section 307 has despread baseband signal 306 as input, estimates channel fluctuation using modulated signal A channel estimation symbol 201 in the frame configuration in FIG. 3, for example, and sends modulated signal A channel fluctuation signal 308 thus obtained to signal processing section 321. Similarly, modulated signal B channel fluctuation estimation section 309 has despread baseband signal 306 as input, estimates channel fluctuation using modulated signal B channel estimation symbol 203 in the frame configuration in FIG. 3, for example, and sends modulated signal B channel fluctuation signal 310 thus obtained to signal processing section 321.

Radio section 313 has received signal 312 received by antenna 311 as input, executes frequency conversion, quadrature demodulation, and so forth on received signal 312, and sends baseband signal 314 thus obtained to despreading section 315. Despreading section 315 despreads baseband signal 314, and outputs despread baseband signal 316 thus obtained.

Modulated signal A channel fluctuation estimation section 317 has despread baseband signal 316 as input, estimates channel fluctuation using modulated signal A channel estimation symbol 201 in the frame configuration in FIG. 3, for example, and sends modulated signal A channel fluctuation signal 318 thus obtained to signal processing section 321. Similarly, modulated signal B channel fluctuation estimation section 319 has despread baseband signal 316 as input, estimates channel fluctuation using modulated signal B channel estimation symbol 203 in the frame configuration in FIG. 3, for example, and sends modulated signal B channel fluctuation signal 320 thus obtained to signal processing section 321.

Figure 5:
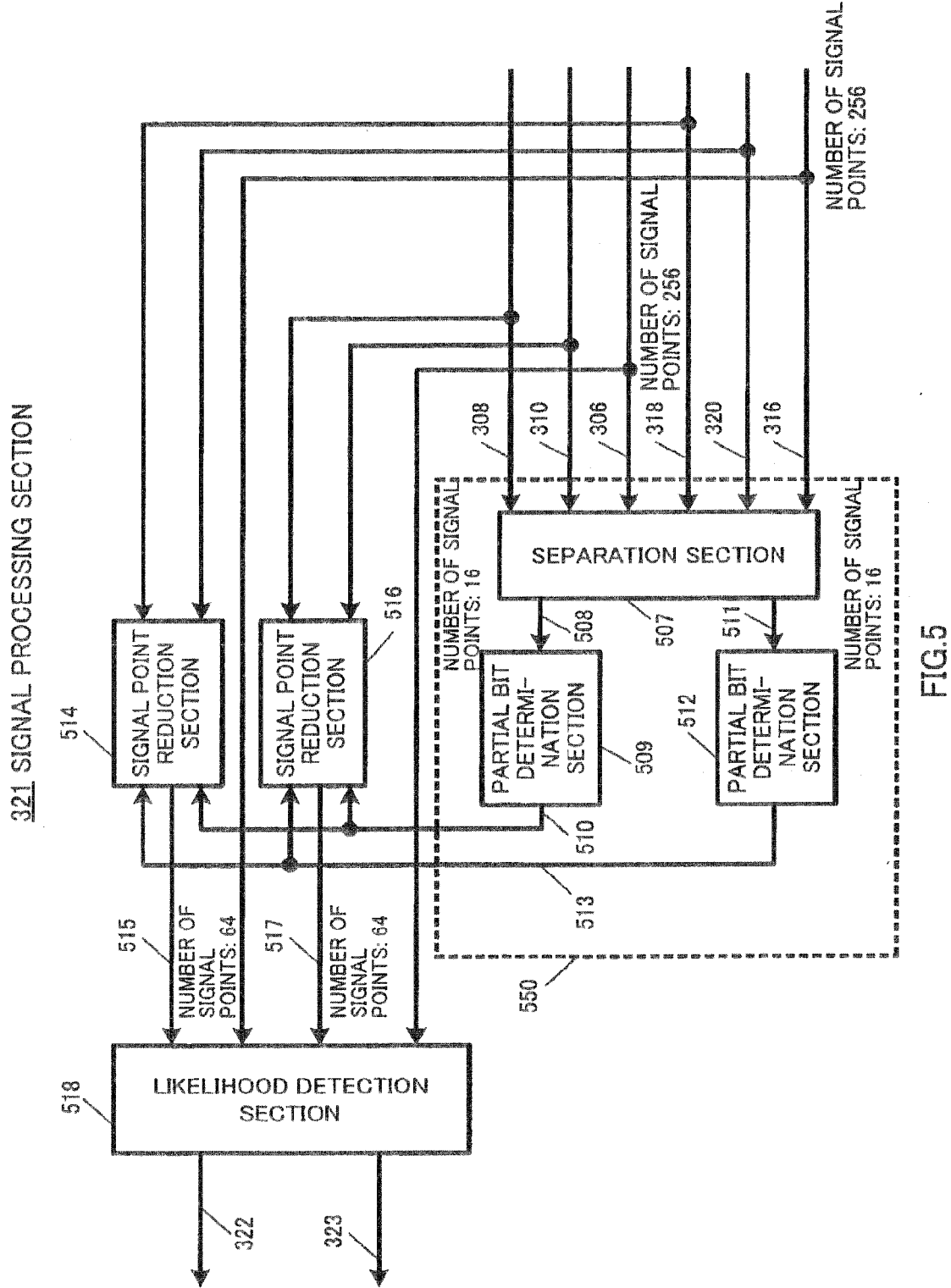
FIG. 5 is a block diagram showing the configuration of a signal processing section of a receiving apparatus.

Signal processing section 321 has despread baseband signals 306 and 316, modulated signal A channel fluctuation signals 308 and 318, and modulated signal B channel fluctuation signals 310 and 320 as input, and by performing modulated signal A and B detection, decoding, and so forth, using these signals, obtains modulated signal A digital signal 322 and modulated signal B digital signal 323. The detailed configuration of signal processing section 321 is shown in FIG. 5, and details of its operation will be described later herein.

Figure 6:
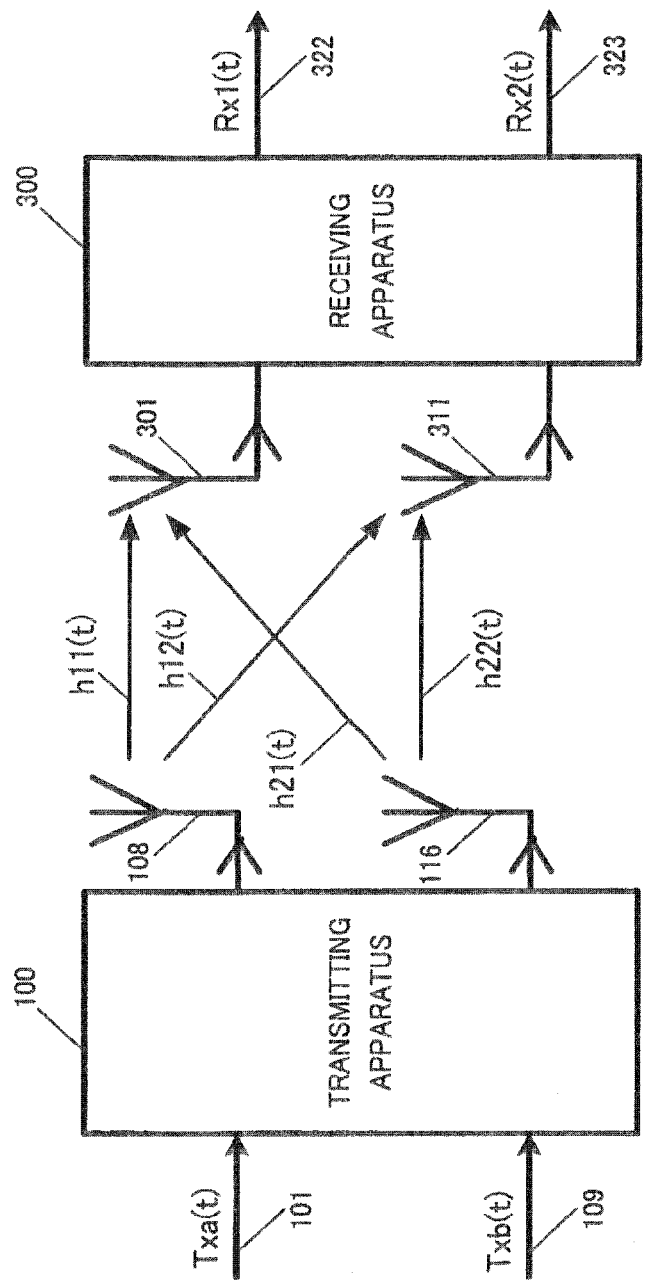
FIG. 6 is a drawing showing the relationship of transmitting and receiving antennas in Embodiment 1.

FIG. 6 shows the relationship between transmitting and receiving apparatuses according to this embodiment. Assume that a signal transmitted from antenna 108 of transmitting apparatus 100 is designated Txa(t), and a signal transmitted from antenna 116, Txb(t); a signal received by antenna 301 of receiving apparatus 300 is designated Rx1(t), and a signal received by antenna 311, Rx2(t); and propagation fluctuations between the antennas are designated h11(t), h12(t), h21(t), and h22(t). Then the relational expression in the following equation holds true, where t denotes time.

$$\begin{pmatrix} Rx1(t) \\ Rx2(t) \end{pmatrix} = \begin{pmatrix} h11(t) & h21(t) \\ h12(t) & h22(t) \end{pmatrix} \begin{pmatrix} Txa(t) \\ Txb(t) \end{pmatrix} \qquad (1)$$

Figures 7A, 7B:
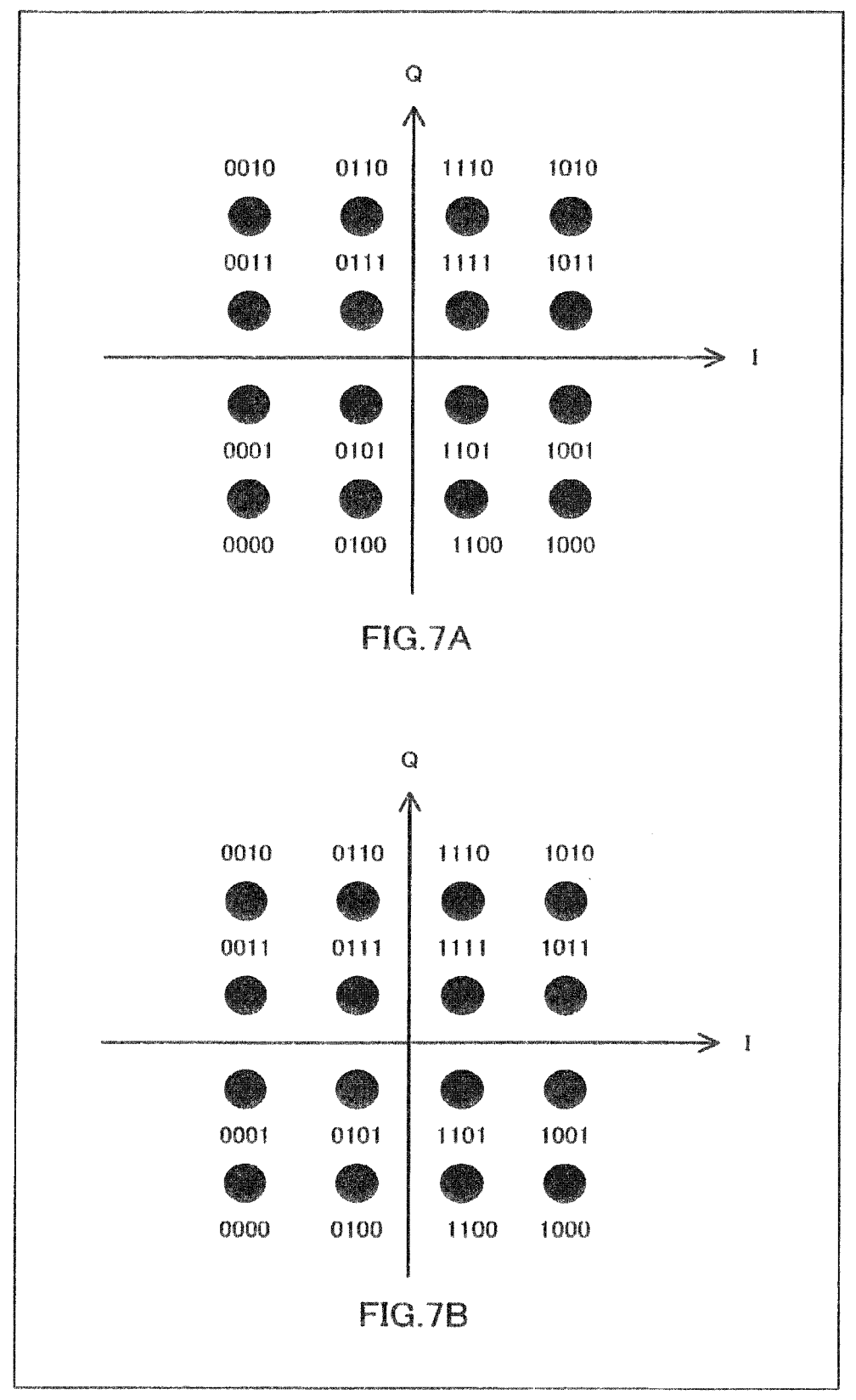

FIG. 7A and FIG. 7B show the signal point arrangements and bit assignments of modulated signal A and modulated signal B when 16QAM (Quadrature Amplitude Modulation) is performed by modulation sections 102 and 110. FIG. 7A shows the signal point arrangement and bit assignments of modulated signal A, and FIG. 7B shows the signal point arrangement and bit assignments of modulated signal B. For both modulated signal A and modulated signal B, 4 bits are assigned to one symbol. In this embodiment, for the sake of explanation, the 4 bits assigned to one symbol of modulated signal A are designated (Sa0, Sa1, Sa2, Sa3), and the 4 bits assigned to one symbol of modulated signal B are designated (Sb0, Sb1, Sb2, Sb3). That is to say, (Sa0, Sa1, Sa2, Sa3) and (Sb0, Sb1, Sb2, Sb3) can each have 16 values from (0, 0, 0, 0) to (1, 1, 1, 1).

When modulated signal A and modulated signal B are 16QAM signals as shown in FIG. 7A and FIG. 7B, there are 16×16-256 signal points in a multiplexed received signal. Estimated signal points for these 256 signal points in the I-Q plane can be obtained from modulated signal A channel fluctuation signal 308 and modulated signal B channel fluctuation signal 310 in FIG. 4. An example of this signal point arrangement is shown in FIG. 8.

Figure 8:
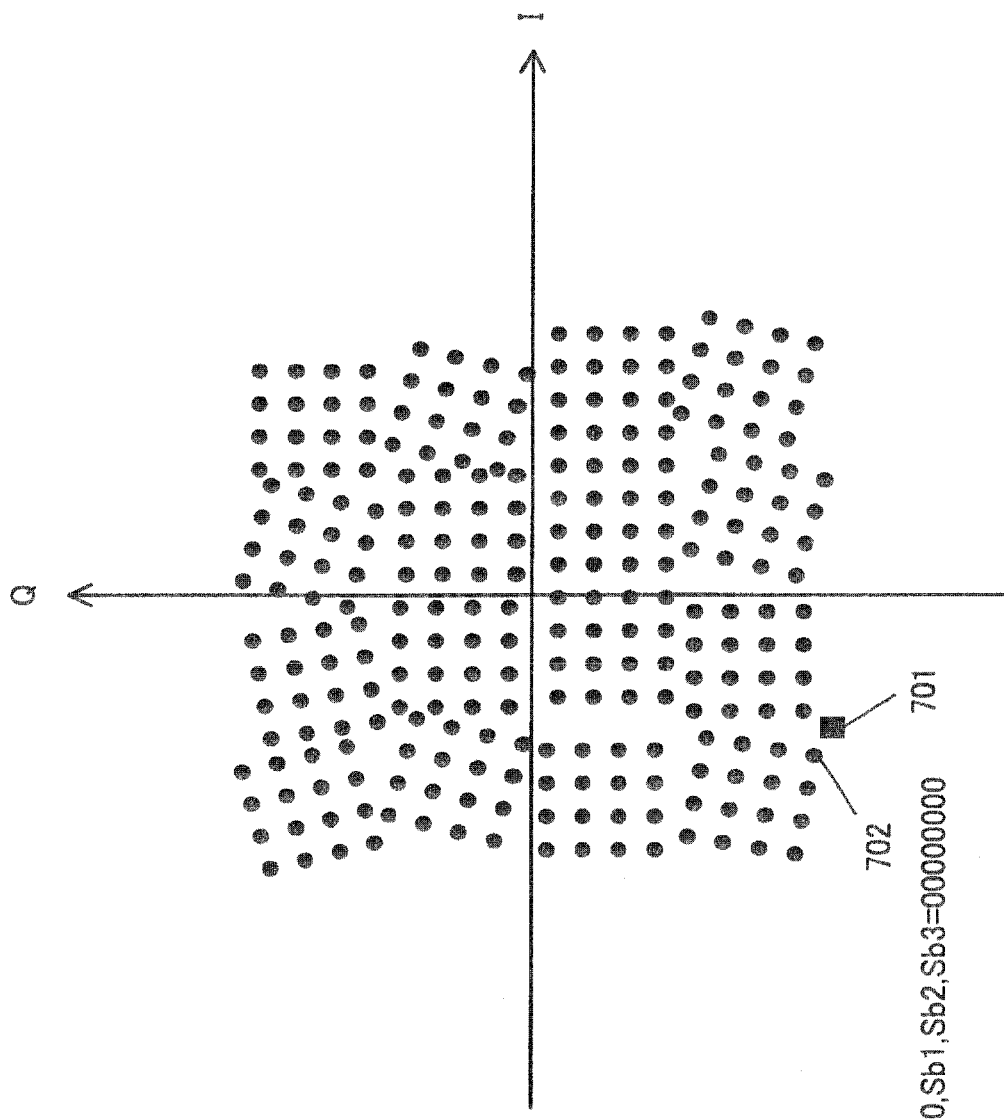
FIG. 8 is a drawing showing a sample signal point arrangement of estimated signal points (candidate signal points) when a 16QAM modulated signal A and 16QAM modulated signal B are received.

Black dots in FIG. 8 indicate 256 estimated signal points. Reference code 701 indicates a signal point of despread baseband signal 306 in FIG. 4. At this time, modulated signal A and modulated signal B decoding and detection can be performed by finding the signal point distances between the 256 estimated signal points and despread-baseband-signal signal point 701, and seeking the estimated signal point with the smallest distance value. For example, reference code 702 indicates an estimated signal point for which (Sa0, Sa1, Sa2, Sa3, Sb0, Sb1, Sb2, Sb3) is (0, 0, 0, 0, 0, 0, 0, 0), and in the case shown in FIG. 8, reception point 701 is at the smallest distance from estimated signal point 702 among the 256 estimated signal points, enabling (0, 0, 0, 0, 0, 0, 0, 0) to be obtained as the detection result.

A drawback with performing detection in this way is that it is necessary to find the signal point distances between a reception point and all 256 estimated signal points, and therefore the computational complexity is extremely large. However, an advantage is that good reception quality (data with good bit error rate performances) can be obtained. On the other hand, a detection method in which the inverse matrix computation of the relational expression of Equation (1) is performed enables the computational complexity to be reduced, but has a drawback of poor bit error rate performances.

Receiving apparatus 300 of this embodiment is configured based on the features of both these methods, enabling receive data of high quality (with good bit error rate performances) to be obtained with a small computational complexity.

FIG. 5 shows the detailed configuration of signal processing section 321, which is a feature of receiving apparatus 300 of this embodiment.

A separation section 507 has modulated signal A channel fluctuation signals 308 and 318, modulated signal B channel fluctuation signals 310 and 320, and despread baseband signals 306 and 316 as input, and obtains estimated signals of transmit signals Txa(t) and Txb(t) by performing the inverse matrix computation of Equation (1). Separation section 507 sends thus obtained modulated signal A estimated baseband signal 508 to partial bit determination section 509, and also sends modulated signal B estimated baseband signal 511 to partial bit determination section 512.

Here, separation section 507 and partial bit determination sections 509 and 512 make up partial bit demodulation section 550 that demodulates only some bits of modulated signals A and B using a detection method different from likelihood detection. In this embodiment, a case is described in which Equation (1) inverse matrix computation is performed by separation section 507, but a received signal in which a plurality of modulated signals are mixed together may also be separated into modulated signals A and B by performing MMSE computation, for example, the essential point being that only some bits of modulated signals A and B are demodulated using a detection method different from likelihood detection.

Figure 9A:
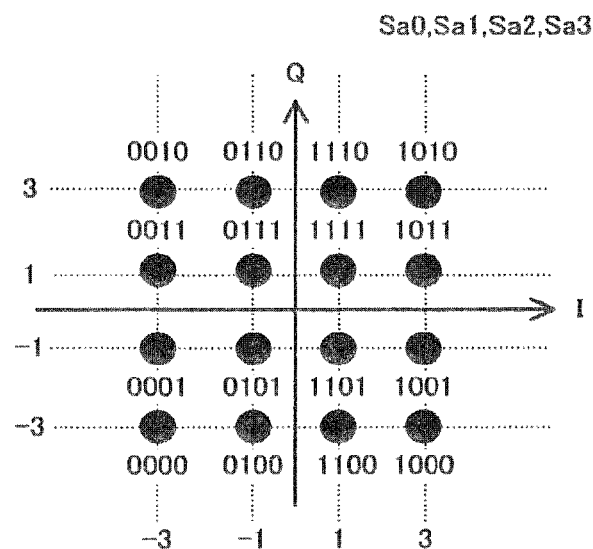
FIG. 9 is a drawing showing a 16QAM bit arrangement (FIG. 9A) and an area division method for 16QAM partial bit determination in Embodiment 1 (FIG. 9B)

The operation of partial bit determination sections 509 and 512 will now be explained. Partial bit determination section 509 and partial bit determination section 512 perform similar operations, with only the signals processed being different, and therefore the operation of partial bit determination section 509 for modulated signal A will be described here. FIG. 9A shows the arrangement of the coordinates of the 16 signal points, (symbols) of 16QAM. As can be seen, the 4 bits (Sa0, Sa1, Sa2, Sa3) making up one modulated signal A symbol can have a value from (0, 0, 0, 0) to (1, 1, 1, 1) according to the signal point location.

Figure 9B:
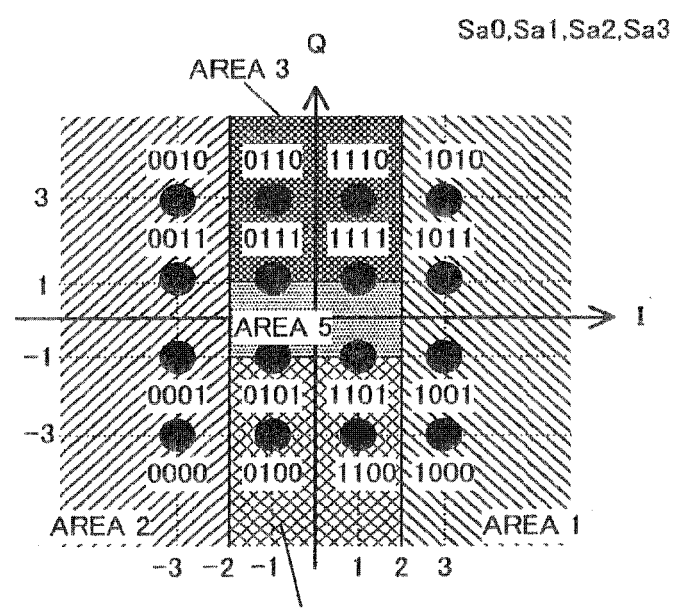

Partial bit determination section 509 has modulated signal A estimated baseband signal 508 as input, determines Sa0=1 when modulated signal A estimated baseband signal 508 is present in area 1 shown in FIG. 9B, Sa0=0 when present in area 2, Sa2=1 when present in area 3, Sa2=0 when present in area 4, and Sa3=1 when present in area 5, and outputs this information as modulated signal A determined partial bit information 510. Partial bit determination section 512 has modulated signal B estimated baseband signal 511 as input, performs the same kind of operation as described above, and outputs modulated signal B determined partial bit information 513.

The reason for setting the areas that determine 1 bit as shown in FIG. 9B is that 1 bit set as shown in FIG. 9B from among Sa0, Sb1, Sa2, and Sa3 has a higher probability of being correct than the remaining 3 bits. Therefore, if this 1 bit is determined, there is a low probability of degradation of reception quality in subsequent detection.

Next, the operation of signal point reduction sections 514 and 516 will be explained. Signal point reduction section 514 has modulated signal A channel fluctuation estimation signal 318, modulated signal B channel fluctuation estimation signal 320, modulated signal A determined partial bit information 510, and modulated signal B determined partial bit information 513 as input. If signal point reduction were not performed here, 256 signal point candidate points would be found from modulated signal A channel fluctuation estimation signal 318 and modulated signal B channel fluctuation estimation signal 320 as shown in FIG. 8. However, in this embodiment, by using modulated signal A determined partial bit information 510 and modulated signal B determined partial bit information 513, as described above, from bit-by-bit determination information (a total of 2 bits), only 8−2=6 bits (64 signal points) are undetermined of the 8 bits (256 signal points).

For example, assume that Sa0=1 information is input to signal point reduction section 514 as modulated signal A determined partial bit information 510, and Sb0=0 information is input to signal point reduction section 514 as modulated signal B determined partial bit information 513. Signal point reduction section 514 then eliminates signal points that do not have Sa0=1 and Sb0=0 values from among the 256 signal points (FIG. 8). By this means, the number of candidate signal points can be reduced to 64, and signal point reduction section 514 outputs information of these 64 signal points as post-reduction signal point information 515. Signal point reduction section 516 has modulated signal A channel fluctuation signal 308, modulated signal B channel fluctuation signal 310, modulated signal A determined partial bit information 510, and modulated signal B determined partial bit information 513 as input, performs the same kind of operation as described above, and outputs post-reduction signal point information 517.

A likelihood detection section 518 has despread baseband signals, 306 and 316, and post-reduction signal point information 515 and 517, as input. Then the state in FIG. 10 is obtained from post-reduction signal point information 515 and despread baseband signal 316. In FIG. 10, despread baseband signal 316 is the signal point indicated by reference code 701, and post-reduction signal point information 515 comprises the 64 signal points indicated by black dots. Likelihood detection section 518 then finds the signal point distances between the 64 candidate signal points and despread-baseband-signal signal point 701. That is to say, likelihood detection section 518 finds a branch metric. This is named branch metric X. Similarly, likelihood detection section 518 finds the signal point distances between the 64 candidate signal points and despread-baseband-signal signal point 701 from post-reduction signal point information 517 and despread baseband signal 306. That is to say, likelihood detection section 518 finds a branch metric. This is named branch metric Y.

Then likelihood detection section 518 finds the 8-bit sequence with the highest likelihood using branch metric X and branch metric Y, and outputs this as modulated signal A digital signal 322 and modulated signal B digital signal 323. In the example in FIG. 5, likelihood detection section 518 separates and outputs (in parallel) modulated signal A and modulated signal B digital signals 322 and 323, but modulated signal A and modulated signal B digital signals may also be bundled and output (in series) as a single digital signal.

Thus, according to this embodiment, by providing partial bit demodulation section 550 that determines partial bits from among a plurality of bits that make up one symbol of each modulated signal using a detection method different from likelihood detection, signal point reduction sections 514 and 516 that reduce the number of candidate signal points using the determined partial bits, and likelihood detection section 518 that obtains received digital signals 322 and 323 by performing likelihood detection based on the Euclidian distances between reduced candidate signal points and a reception point, a receiving apparatus 300 can be realized that enables bit error rate performances to be effectively improved with a comparatively small computational complexity. That is to say, as a reduced number of candidate signal points are used by likelihood detection section 518, the number of computations for finding Euclidian distances is reduced, enabling the computational complexity to be decreased. Also, as partial bits found based on inverse matrix computation results are only bits unlikely to be erroneous, degradation of bit error rate performances due to inverse matrix computation can be greatly suppressed compared with a case in which likelihood decoding of all bits is performed based on inverse matrix computation results.

(i) Another Sample Configuration of a Partial Bit Determination Section

In the above embodiment, a case has been described in which a reduction in the number of candidate signal points of a total of 2 bits is performed by signal point reduction sections 514 and 516 respectively by having bit determination performed one bit at a time by partial bit determination sections 509 and 512. Here, a method and configuration will be described whereby a reduction in the number of candidate signal points of a total of 4 bits is performed by signal point reduction sections 514 and 516 respectively by having bit determination performed 2 bits at a time by partial bit determination sections 509 and 512.

Figure 11A:
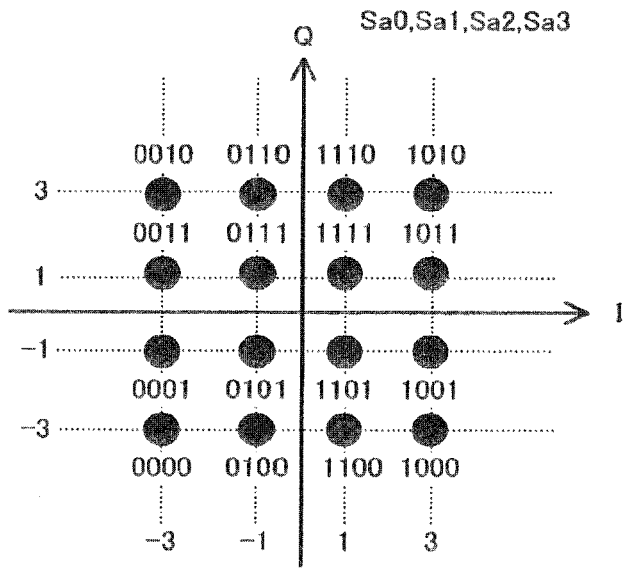
FIG. 11 is a drawing showing a 16QAM bit arrangement (FIG. 11A) and an area division method for partial bit determination of two 16QAM hits (FIG. 11B)
Figure 11B:
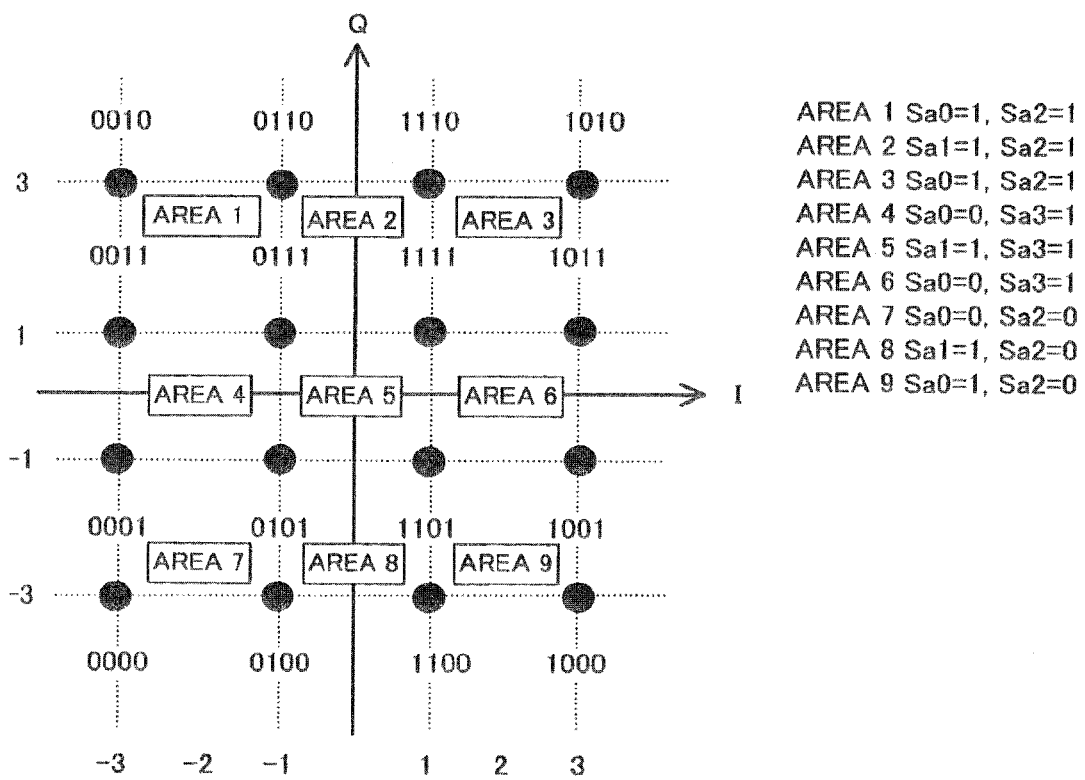

FIG. 11A and FIG. 11B show an example of a determination method for determining 2 bits by partial bit determination sections 509 and 512 in FIG. 8. Partial bit determination section 509 and partial bit determination section 512 perform similar operations, with only the signals processed being different, and therefore the operation of partial bit determination section 509 for modulated signal A will be described here. FIG. 11A shows the arrangement of the coordinates of the 16 signal points (symbols) of 16QAM. As can be seen, the 4 bits (Sa0, Sa1, Sa2, Sa3) making up one modulated signal A symbol can have any value from (0, 0, 0, 0) to (1, 1, 1, 1) according to the signal point location.

Partial bit determination section 509 has modulated signal A estimated baseband signal 508 as input, determines Sa0=0 and Sa2=1 when modulated signal A estimated baseband signal 508 is present in area 1 bounded by dotted lines in FIG. 11B, Sa1=1 and Sa2=1 when present in area 2, Sa0=1 and Sa2=1 when present in area 3, Sa0=0 and Sa3=1 when present in area 4, Sa1=1 and Sa3=1 when present in area 5, Sa0=1 and Sa3=1 when present in area 6, Sa0=0 and Sa2=0 when present in area 7, Sa1=1 and Sa2=0 when present in area 8, and Sa0=1 and Sa2=0 when present in area 9. Partial bit determination section 509 then outputs this information as modulated signal A determined partial bit information 510. Partial bit determination section 512 has modulated signal B estimated baseband signal 511 as input, performs the same kind of operation as described above, and outputs modulated signal B determined partial bit information 513.

The reason for setting the areas that determine 2 bits as shown in FIG. 11B is that 2 bits set as shown in FIG. 11B from among Sa0, Sb1, Sa2, and Sa3 have a higher probability of being correct than the remaining 2 bits. Therefore, if these 2 bits are determined, there is a low probability of degradation of reception quality in subsequent detection.

Signal point reduction section 514 performs candidate signal point reduction by carrying out the same kind of operations as described above. At this time, since modulated signal B determined partial bit information 513 is composed of 2 bits, only 8−4=4 bits (16 signal points) are undetermined of the 8 bits (256 signal points). By this means, the number of candidate signal points can be reduced to 16. Information of these 16 signal points forms post-reduction signal point information. Therefore, branch metric calculation can be further reduced in likelihood detection section 518, and the computational complexity can be further decreased. However, as the number of bits determined by partial bit determination sections 509 and 512 increases, reception quality degrades.

(ii) Application to a Multicarrier System

A sample configuration will be described here for a case in which the present invention is applied to a multicarrier system. A case in which OFDM (Orthogonal Frequency Division Multiplexing) scheme is used as a multicarrier system will be described as an example.

Figure 12:
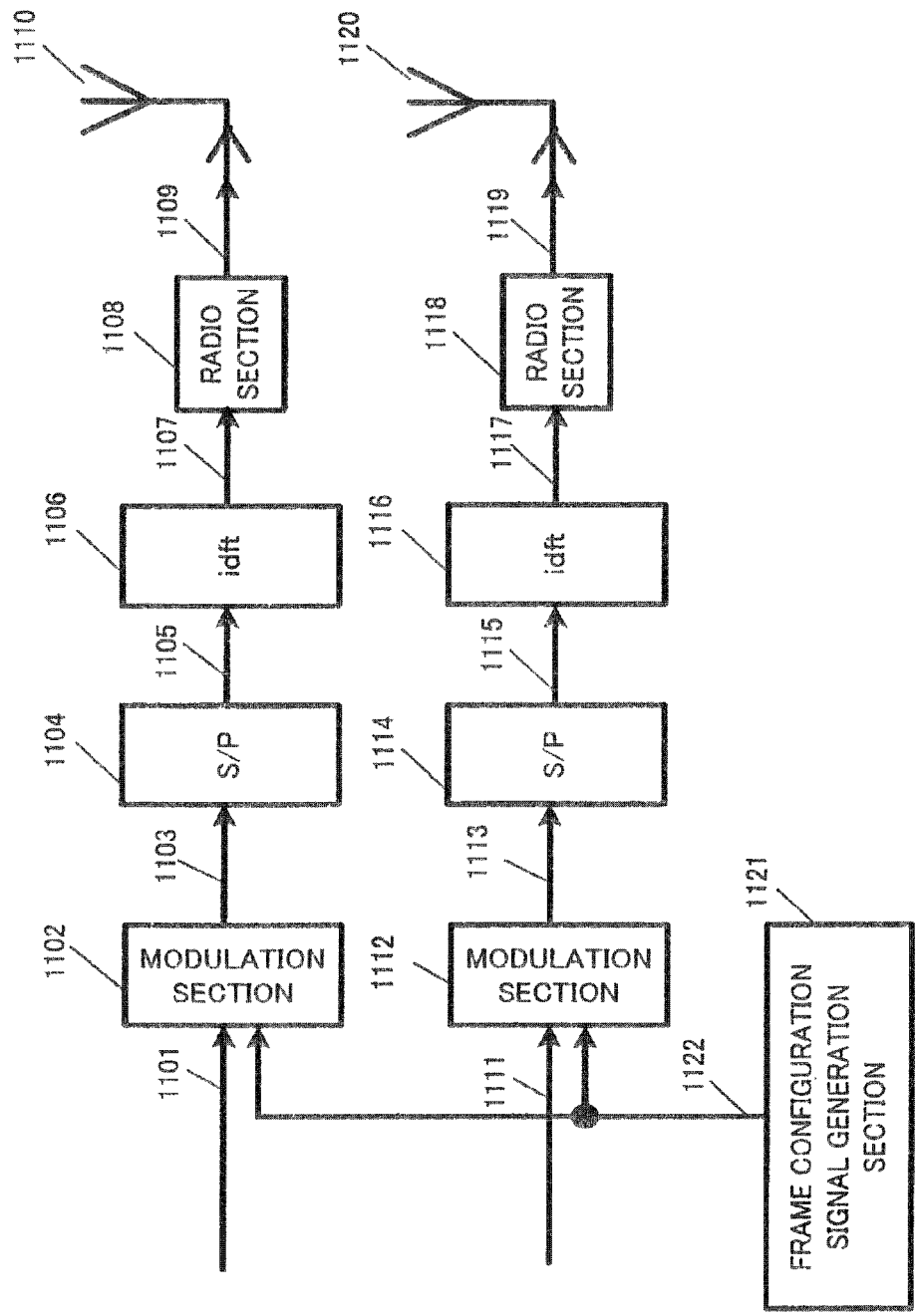
FIG. 12 is a block diagram showing the configuration of a transmitting apparatus of Embodiment 1.

FIG. 12 shows the configuration of a transmitting apparatus. In transmitting apparatus 1100, a digital signal 1101 is input to a modulation section 1102, and a digital signal 1111 is input to a modulation section 1112.

Modulation sections 1102 and 1112 have digital signals 1101 and 1111, and a frame configuration signal 1122, as input, modulate digital signals 1101 and 1111 in accordance with frame configuration signal 1122, and send baseband signals 1103 and 1113 thus obtained to serial/parallel conversion sections (S/Ps) 1104 and 1114. Serial/parallel conversion sections 1104 and 1114 perform serial/parallel conversion of baseband signals 1103 and 1113 respectively, and send parallel signals 1105 and 1115 thus obtained to inverse Fourier transform sections (idft's) 1106 and 1116 respectively. Inverse Fourier transform sections 1106 and 1116 execute inverse Fourier transform processing on parallel signals 1105 and 1115 respectively, and send post-inverse-Fourier-transform signals 1107 and 1117 thus obtained to radio sections 1108 and 1118 respectively. Radio sections 1108 and 1118 execute frequency conversion, signal amplification, and so forth on post-inverse-Fourier-transform signals 1107 and 1117 respectively, thereby obtaining modulated signals 1109 and 1119. Modulated signals 1109 and 1119 are output as radio waves from antennas 1110 and 1120 respectively.

By this means, modulated signal 1109 (modulated signal A) and modulated signal 1119 (modulated signal B), which are OFDM signals, are transmitted from antennas 1110 and 1120 respectively.

Figure 13A:
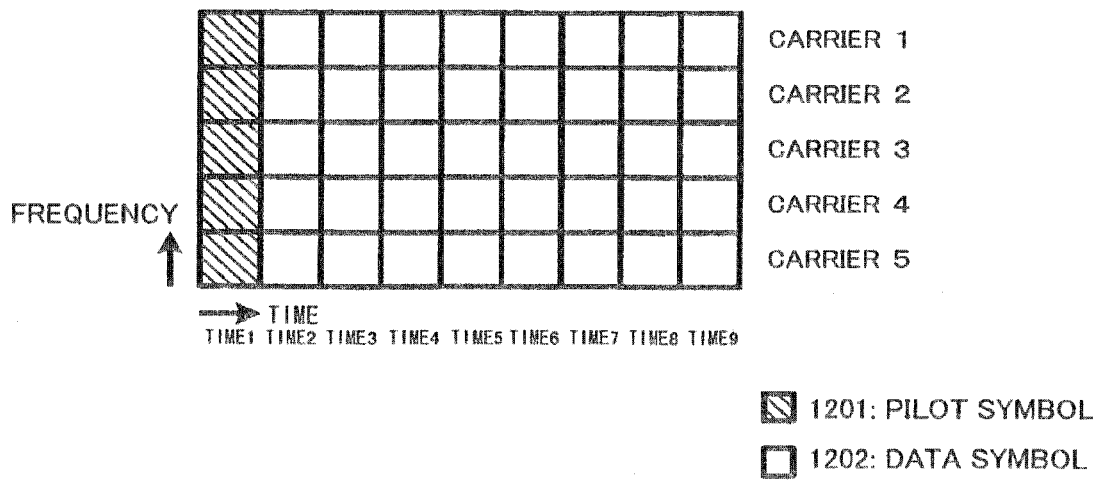
FIG. 13 is a drawing showing the frame configuration of modulated signal A transmitted from the transmitting apparatus in FIG. 12 (FIG. 13A) and the frame configuration of modulated signal B transmitted from the transmitting apparatus in FIG. 12 (FIG. 13B)
Figure 13B:
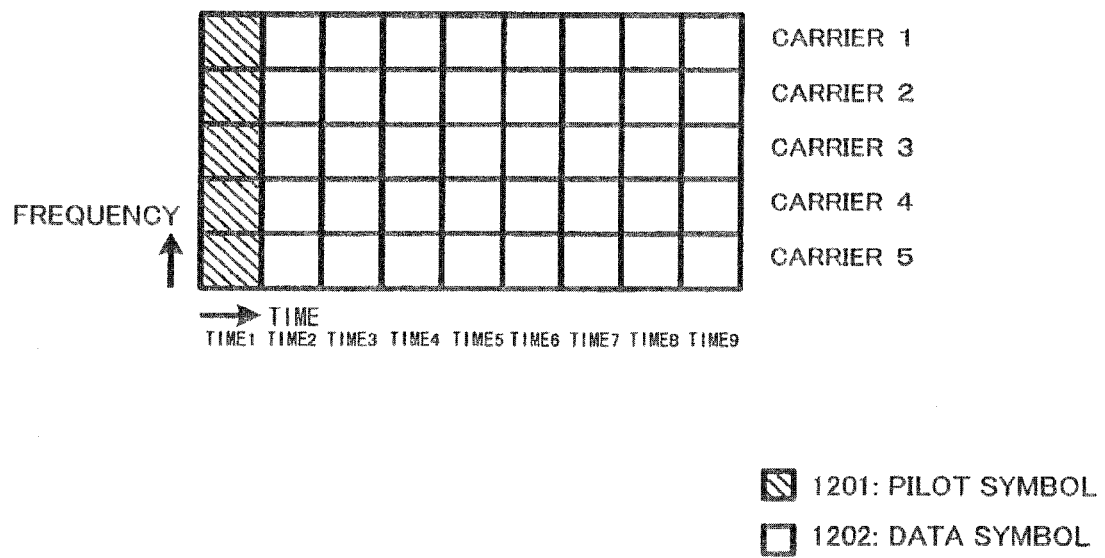

Here, a frame configuration signal generation section 1121 outputs frame configuration information as frame configuration signal 1122. Sample frame configurations are shown in FIG. 13A and FIG. 13B. In FIG. 13A and FIG. 13B, frame configurations are represented on time-frequency axes. FIG. 13A shows a frame configuration of modulated signal A, and FIG. 13B shows a frame configuration of modulated signal B. As an example, a case is shown in which a frame is composed of carrier 1 through carrier 5. It is assumed that symbols of the same time slot are transmitted at the same time. Pilot symbols 1201 indicated by hatching are symbols for performing channel estimation on the receiving side. Although these symbols are referred to here as pilot symbols, they may also be given another designation such as "preamble," and need only be symbols that enable channel estimation to be performed. Blanks indicated by reference code 1202 denote data symbols.

Figure 14:
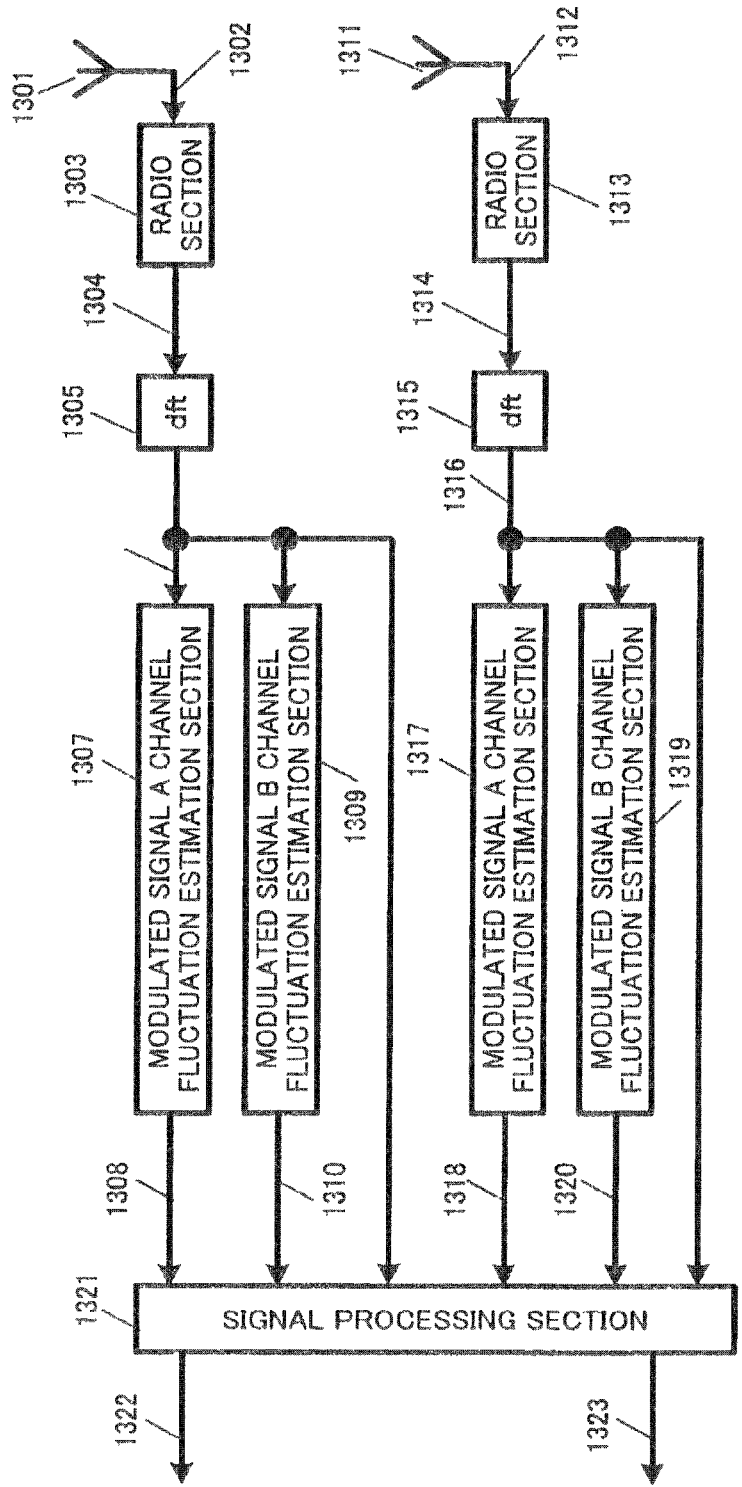
FIG. 14 is a block diagram showing the configuration of a receiving apparatus that receives a signal from the transmitting apparatus in FIG. 12.

FIG. 14 shows the configuration of a receiving apparatus. Receiving apparatus 300 receives signals by means of two antennas 1301 and 1311.

A radio section 1303 has a received signal 1302 received by antenna 1301 as input, executes frequency conversion and so forth on received signal 1302, and sends a baseband signal 1304 thus obtained to a Fourier transform section (dft) 1305. Fourier transform section 1305 performs Fourier transform processing on baseband signal 1304, and outputs a post-Fourier-transform signal 1306 thus obtained.

A modulated signal A channel fluctuation estimation section 1307 has post-Fourier-transform signal 1306 as input, finds modulated signal A channel fluctuation for carrier 1 through carrier 5 using modulated signal A pilot symbols 1201 in FIG. 13A, and outputs a modulated signal A channel fluctuation signal group 1308 (composed of estimation signals for carrier 1 through carrier 5). Similarly, a modulated signal B channel fluctuation estimation section 1309 has post-Fourier-transform signal 1306 as input, finds modulated signal B channel fluctuation for carrier 1 through carrier 5 using modulated signal B pilot symbols 1201 in FIG. 13B, and outputs a modulated signal B channel fluctuation signal group 1310 (composed of estimation signals for carrier 1 through carrier 5).

Similarly, a radio section 1313 has a received signal 1312 received by antenna 1311 as input, executes frequency conversion and so forth on received signal 1312, and sends a baseband signal 1314 thus obtained to a Fourier transform section (dft) 1315. Fourier transform section 1315 performs Fourier transform processing on baseband signal 1314, and outputs a post-Fourier-transform signal 1316 thus obtained.

A modulated signal A channel fluctuation estimation section 1317, has post-Fourier-transform signal 1316 as input, finds modulated signal A channel fluctuation for carrier 1 through carrier 5 using modulated signal A pilot symbols 1201 in FIG. 13A, and outputs a modulated signal A channel fluctuation signal group 1318 (composed of estimation signals for carrier 1 through carrier 5). Similarly, a modulated signal B channel fluctuation estimation section 1319 has post-Fourier-transform signal 1316 as input, finds modulated signal B channel fluctuation for carrier 1 through carrier 5 using modulated signal B pilot symbols 1201 in FIG. 13B, and outputs a modulated signal B channel fluctuation signal group 1320 (composed of estimation signals for carrier 1 through carrier 5).

A signal processing section 1321 has post-Fourier-transform signals 1306 and 1316, modulated signal A channel fluctuation signal groups 1308 and 1318, and modulated signal B channel fluctuation signal groups 1310 and 1320 as input, and by performing modulated signal A and B decoding, detection, and so forth, using these signals, obtains a modulated signal A digital signal 1322 and modulated signal B digital signal 1323.

Signal processing section 1321 may have the same kind of configuration as signal processing section 321 shown in FIG. 5. Thus, modulated signal A channel fluctuation estimation group 1308 is input instead of modulated signal A channel fluctuation signal 308 in FIG. 5, modulated signal B channel fluctuation estimation group 1310 is input instead of modulated signal B channel fluctuation signal 310, post-Fourier-transform signal 1306 is input instead of despread baseband signal 306, modulated signal A channel fluctuation estimation group 1318 is input instead of modulated signal A channel fluctuation signal 318, modulated signal B channel fluctuation estimation group 1320 is input instead of modulated signal B channel fluctuation signal 320, and post-Fourier-transform signal 1316 is input instead of despread baseband signal 316.

Assuming, for example, that separation section 507 has modulated signal A channel fluctuation estimation groups 501 and 504, modulated signal B channel fluctuation estimation groups 502 and 505, and post-Fourier-transform signals 503 and 506 as input, inverse matrix computation is executed for each carrier based on Equation (1), and modulated signal A estimated baseband signal 508 and modulated signal B estimated baseband signal 511 are output in accordance with the frequency-time axis frame configurations in FIG. 13A and FIG. 13B.

Then partial bit determination sections 509 and 512 determine partial bits in the same way as described above for each carrier. Signal point reduction sections 514 and 516 also perform signal point reduction in the same way as described above for each carrier, and likelihood detection section 518 also performs likelihood detection for each carrier. By this means, OFDM modulated signal A and B digital signals 1322 and 1323 are obtained.

In this way, the present invention can also be implemented for a multicarrier system such as OFDM scheme.

(Embodiment 2)

In this embodiment, a method of signal point arrangement in the I-Q plane is described that simplifies division in the case of 2-bit partial determination and greatly improves reception quality compared with Embodiment 1. Although the description here mainly refers to modulated signal A, the same kind of processing can also be performed for modulated signal B.

The general configurations of a transmitting apparatus and receiving apparatus are similar to those in Embodiment 1. Embodiment 2 differs from Embodiment 1 in the configuration of the modulation sections of the transmitting apparatus, and the configuration of the partial bit determination sections and signal point reduction sections of the receiving apparatus.

Figure 1:
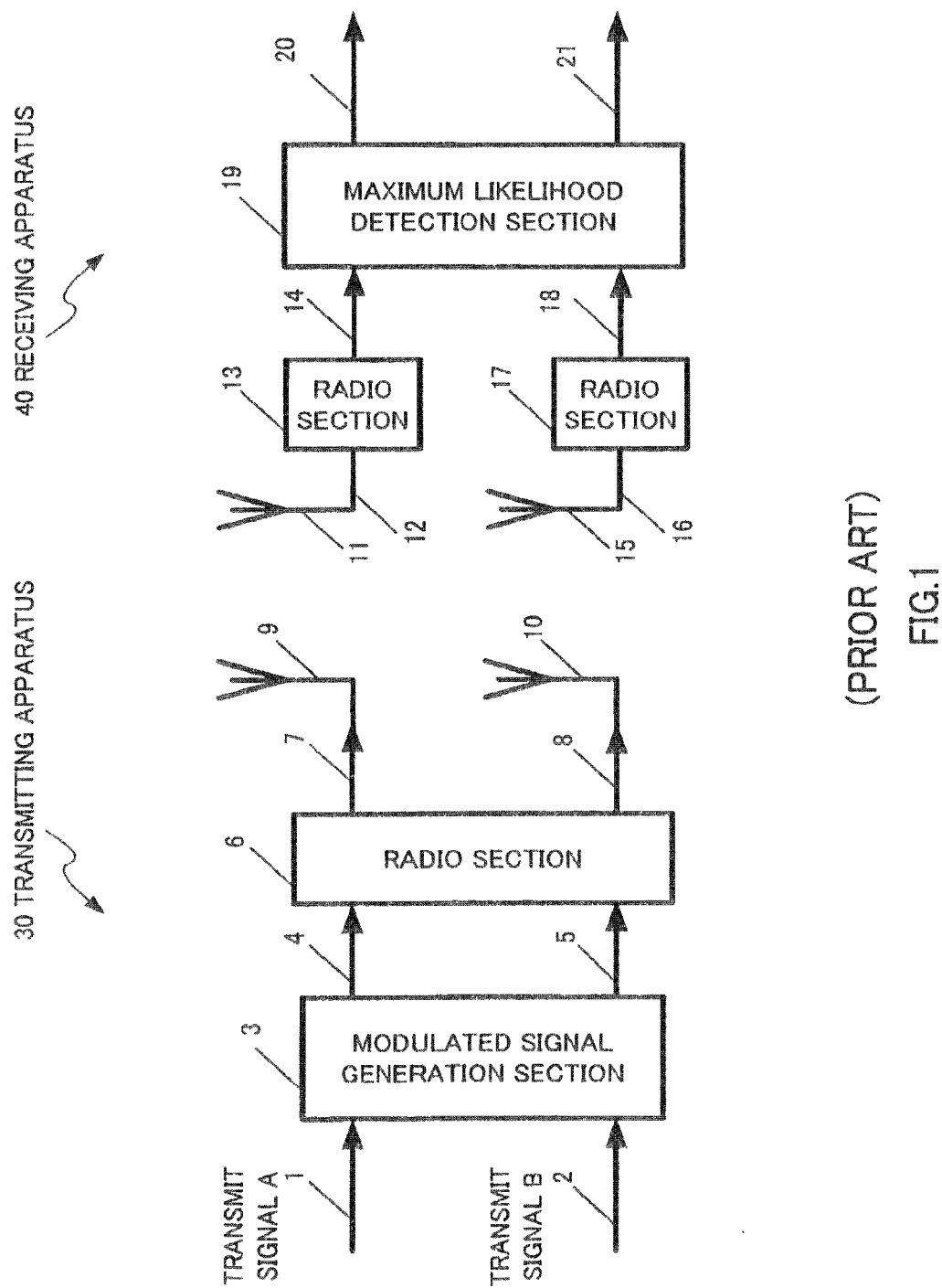
FIG. 1 is a block diagram showing a schematic configuration of a conventional multi-antenna transmitting apparatus and receiving apparatus.
Figure 15A:
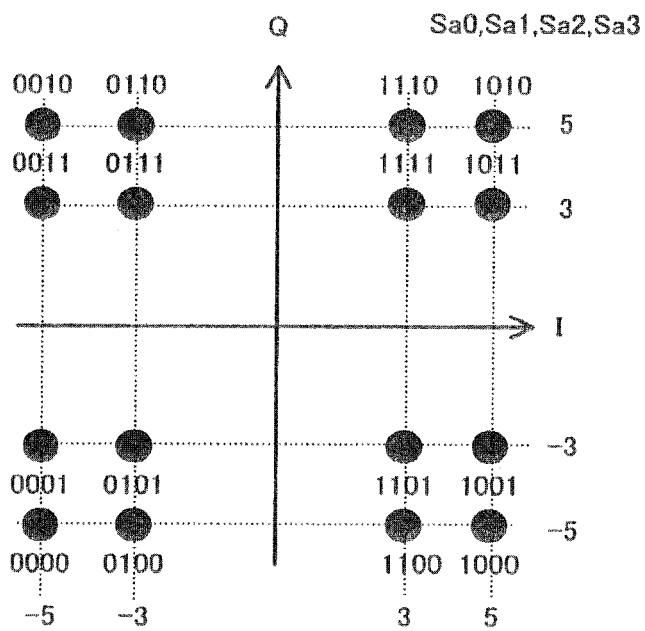
FIG. 15 is a drawing showing a signal point arrangement by a transmitting apparatus of Embodiment 2 (FIG. 15A) and an area division method at the time of partial bit determination by a receiving apparatus of Embodiment 2 (FIG. 15B)
Figure 15B:
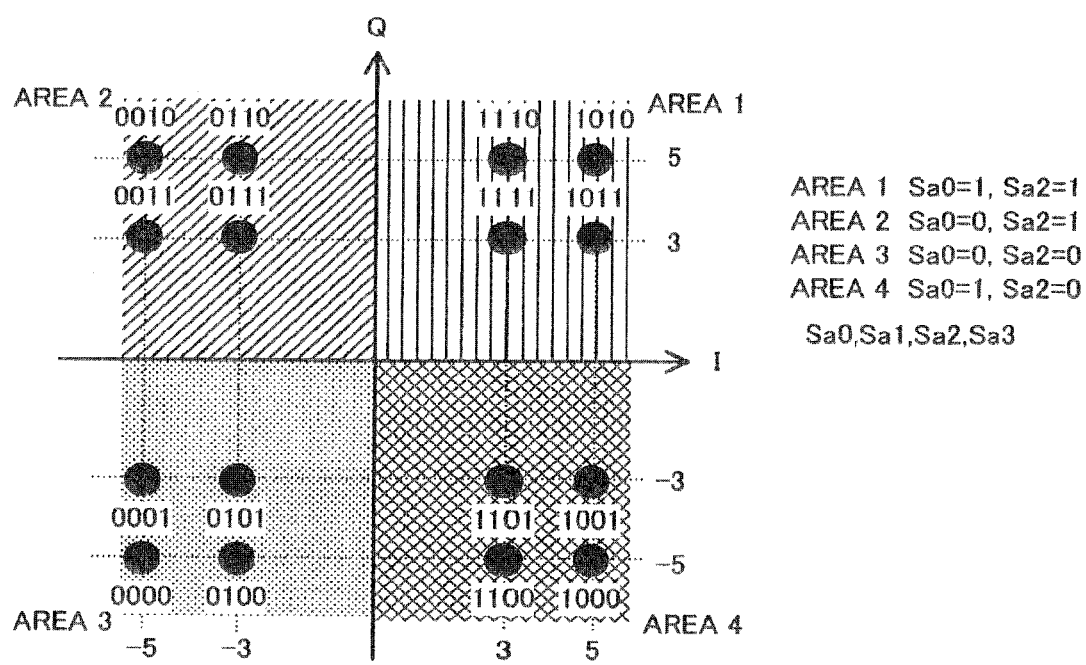

FIG. 15A shows a sample signal point arrangement by a transmitting apparatus of this embodiment, and FIG. 15B shows the partial bit determination method used by a receiving apparatus of this embodiment. That is to say, the kind of signal point mapping shown in FIG. 15A is performed by modulation sections 102 and 110 in FIG. 1 and modulation sections 1102 and 1112 in FIG. 12. Also, partial hits are determined by partial bit determination sections 509 and 512 in FIG. 5 by performing the kind of area division shown in FIG. 15B.

As shown in FIG. 15A, a modulation section of this embodiment takes 4 signal points as 1 set, and performs modulation processing (mapping) so that the distances between the 4 signal points in 1 set are small, but distances between sets are large. Also, a modulation section makes the distances between the 4 signal points in 1 set equal, and also makes the distances between sets equal. In this way, a modulation section arranges signal points so that an area can easily be divided into first through fourth quadrants.

By this means, 2 bits that are common within a set composed of 4 signal points can easily be demodulated on the receiving side. That is to say, since distances between signal points in a set are small and signal point distances between sets are large, the set (quadrant) in which a reception point is included can be determined easily and accurately, enabling 2-bit partial determination to be performed easily and accurately.

Specifically, when a received baseband signal is present in area 1 in the I-Q plane shown in FIG. 15B, the 2 bits Sa0=1 and Sa2=1 common to the 4 signal points of area 1 are determined to be partial bits; when a received baseband signal is present in area 2, the 2 bits Sa0=0 and Sa2=1 common to the 4 signal points of area 2 are determined to be partial bits; when a received baseband signal is present in area 3, the 2 bits Sa0=0 and Sa2=0 common to the 4 signal points of area 3 are determined to be partial bits; and when a received baseband signal is present in area 4, the 2 bits Sa0=1 and Sa2=0 common to the 4 signal points of area 4 are determined to be partial bits.

Partial bit determination section 509 in FIG. 5 outputs information of these determined 2 bits as modulated signal A determined partial bit information 510. The same kind of processing is also performed for modulated signal B by partial bit determination section 512.

Using the 4-bit information determined by partial bit determination sections 509 and 512, signal point reduction sections 514 and 516 in FIG. 5 reduce the 256 candidate signal points to 16 candidate signal points as described above in Embodiment 1.

Thus, according to this embodiment, in modulation sections 102, 110, 1102, and 1112 of transmitting apparatuses 100 and 1100, by performing signal point mapping of transmit bits whereby signal points are divided into a plurality of signal point sets on the IQ plane, and the minimum distance between signal points in a signal point set is made smaller than the minimum signal point distance between signal point sets, an effect can be obtained of enabling partial bit determination to be performed easily and accurately on the receiving side.

In addition, by making the distances between the 4 signal points in 1 set equal, and also making the distances between sets equal, the ratio of maximum transmit power to average transmit power is reduced. By this means, the linear amplifier requirements of the transmitting power amplifier are lessened, and an effect of enabling power consumption to be reduced is also obtained. The same is also true when this embodiment is applied to a 64-value modulation method.

In Embodiment 1 and this embodiment, a case has been described in which the signal point arrangements of modulated signal A and modulated signal B are the same, but similar effects can also be obtained when the signal point arrangements of modulated signal A and modulated signal B are different.

For example, on the transmitting side, the modulated signal A signal point arrangement may be set as shown in FIG. 15A, while the modulated signal B signal point arrangement is set as shown in FIG. 9A. Then, on the receiving side, a total of 3 hits are determined by determining 2 bits by means of partial bit determination section 509 for modulated signal A in FIG. 5, and determining 1 bit by means of partial bit determination section 512 for modulated signal B. Signal point reduction sections 514 and 516 then reduce the 256 candidate signal points to 32 signal points using this determined 3-bit partial bit information.

Figure 16:
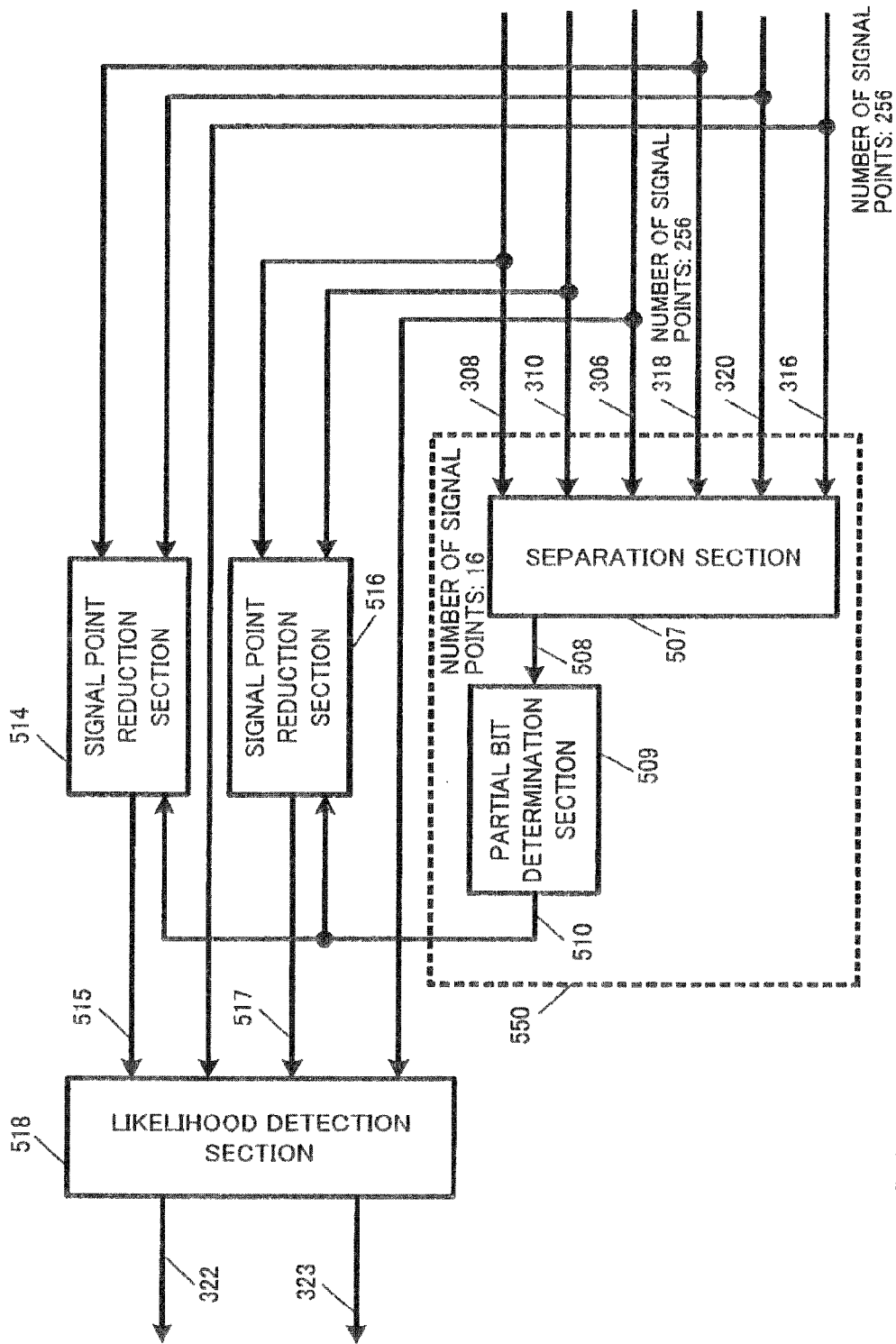
FIG. 16 is a block diagram showing another sample configuration of a signal processing section of Embodiment 2.

A method is also possible whereby only modulated signal A partial bits are determined on the receiving side. The configuration of signal processing section 321 for implementing this method is shown in FIG. 16. In this example, modulated signal A signal points are arranged as shown in FIG. 15A for ease of partial bit determination. Partial bit determination section 509 in FIG. 16 performs partial bit determination of 2 bits of modulated signal A based on the criteria in FIG. 15B. Signal point reduction sections 514 and 516 reduce the 256 candidate signal points to 64 candidate signal points using the determined 2 hits. Likelihood detection section 518 performs likelihood detection by finding the Euclidian distances between the 64 signal points and a received baseband signal.

Determining only partial bits for one modulated signal in this way enables the configuration of the partial bit determination section to be simplified, allowing the computational complexity to be reduced accordingly. This kind of configuration is particularly effective when a signal point arrangement is used whereby partial bit determination is easier for one modulated signal than for the other.

(Embodiment 3)

In this embodiment, an actual signal point arrangement method and partial bit determination method when using 64-value M-ary modulation as the modulation method are described. The general configurations of a transmitting apparatus and receiving apparatus are similar to those in Embodiment 1 and Embodiment 2, except that the modulation method is changed from modulation which has 16 signal points to modulation which has 64 signal points.

Figure 17:
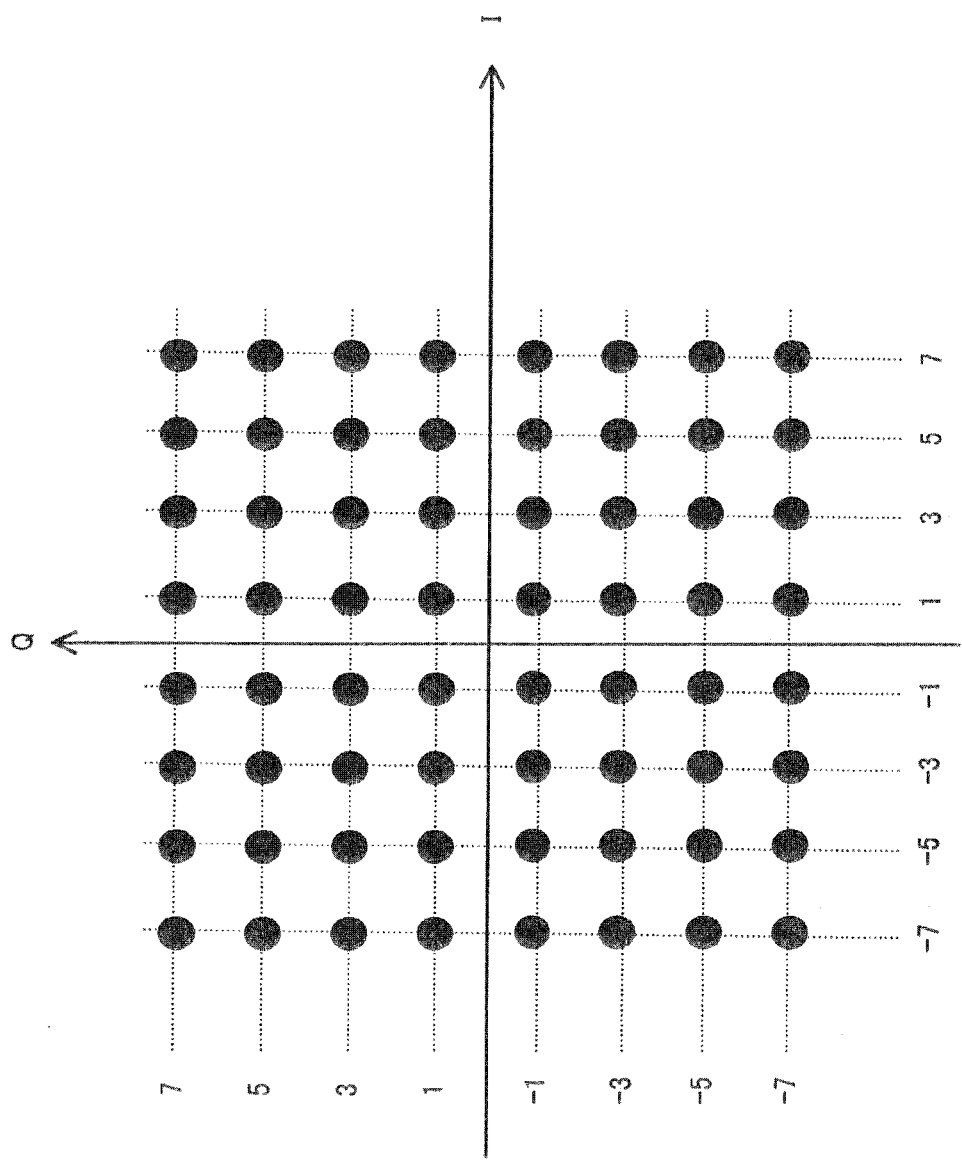
FIG. 17 is a drawing showing a 64QAM signal point arrangement.

FIG. 17 shows the 64QAM signal point arrangement in the I-Q plane. A receiving apparatus of this embodiment, 1 bit is determined by each of partial bit determination sections 509 and 512 in FIG. 5 by performing area division so that the bit with the lowest probability of being erroneous among 6 bits is determined. Then the number of candidate signal points is reduced to 1024 by reducing 2-bit signal points from 64×64=4096 candidate signal points by signal point reduction sections 514 and 516. Likelihood detection section 518 performs likelihood detection by finding the Euclidian distances between each of the 1024 candidate signal points and a reception point.

Also, in the receiving apparatus, if area division is performed by partial bit determination sections 509 and 512 so that 2 bits are determined, and the respective 2-bit partial hits are determined, the number of candidate signal points can be reduced to 256. If area division is performed so that 3 bits are determined, and the respective 3-bit partial bits are determined, the number of candidate signal points can be reduced to 64. Furthermore, if area division is performed so that 4 bits are determined, and the respective 4-bit partial bits are determined, the number of candidate signal points can be reduced to 16. Thus, the greater the number of bits determined by partial bit determination sections 509 and 512 is made, the smaller the number of candidate signal points for performing likelihood detection can be made, enabling the amount of computation to be reduced. However, drawbacks are that the greater the number of bits determined by partial bit determination sections 509 and 512 is made, the more bit error rate performances degrade, and, as with 16QAM in Embodiment 1, the more complicated area division becomes.

Figure 18:
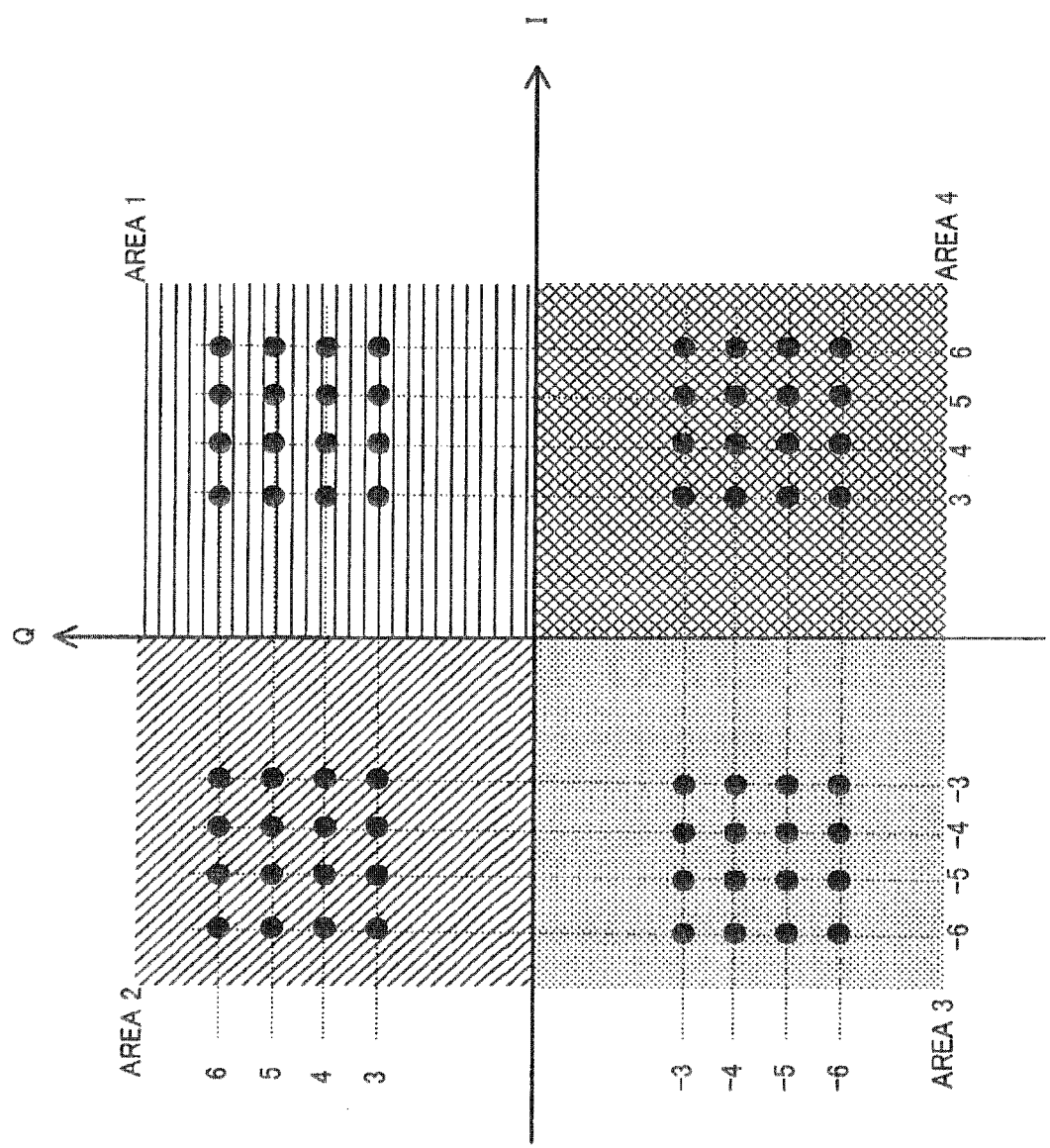
FIG. 18 is a drawing showing a signal point arrangement by a transmitting apparatus of Embodiment 3 and an area division method for partial bit determination by a receiving apparatus.

Thus, in this embodiment, the kind of signal point arrangement shown in FIG. 18 is proposed as a more desirable 64-value M-ary modulation signal point arrangement. The basic concept of the signal point arrangement in FIG. 18 is the same as that described in Embodiment 2. That is to say, modulation processing (mapping) is performed whereby signal points are divided into a plurality of sets, and the minimum Euclidian distance between sets is made greater than the minimum Euclidian distance between signal points within a set.

Specifically, 16 signal points are taken as 1 set, and modulation processing (mapping) is performed so that the distances between the 16 signal points are small, but distances between sets are large. Also, a modulation section makes the distances between the 16 signal points in 1 set equal, and also makes the distances between sets equal. In this way, a modulation section arranges signal points so that an area can easily be divided into first through fourth quadrants.

By this means, 2 bits that are common within a set composed of 16 signal points can easily be demodulated on the receiving side. That is to say, since distances between signal points in a set are small and signal point distances between sets are large, the set (quadrant) in which a reception point is included can be determined easily and accurately, enabling 2-bit partial determination to be performed easily and accurately.

Figure 19:
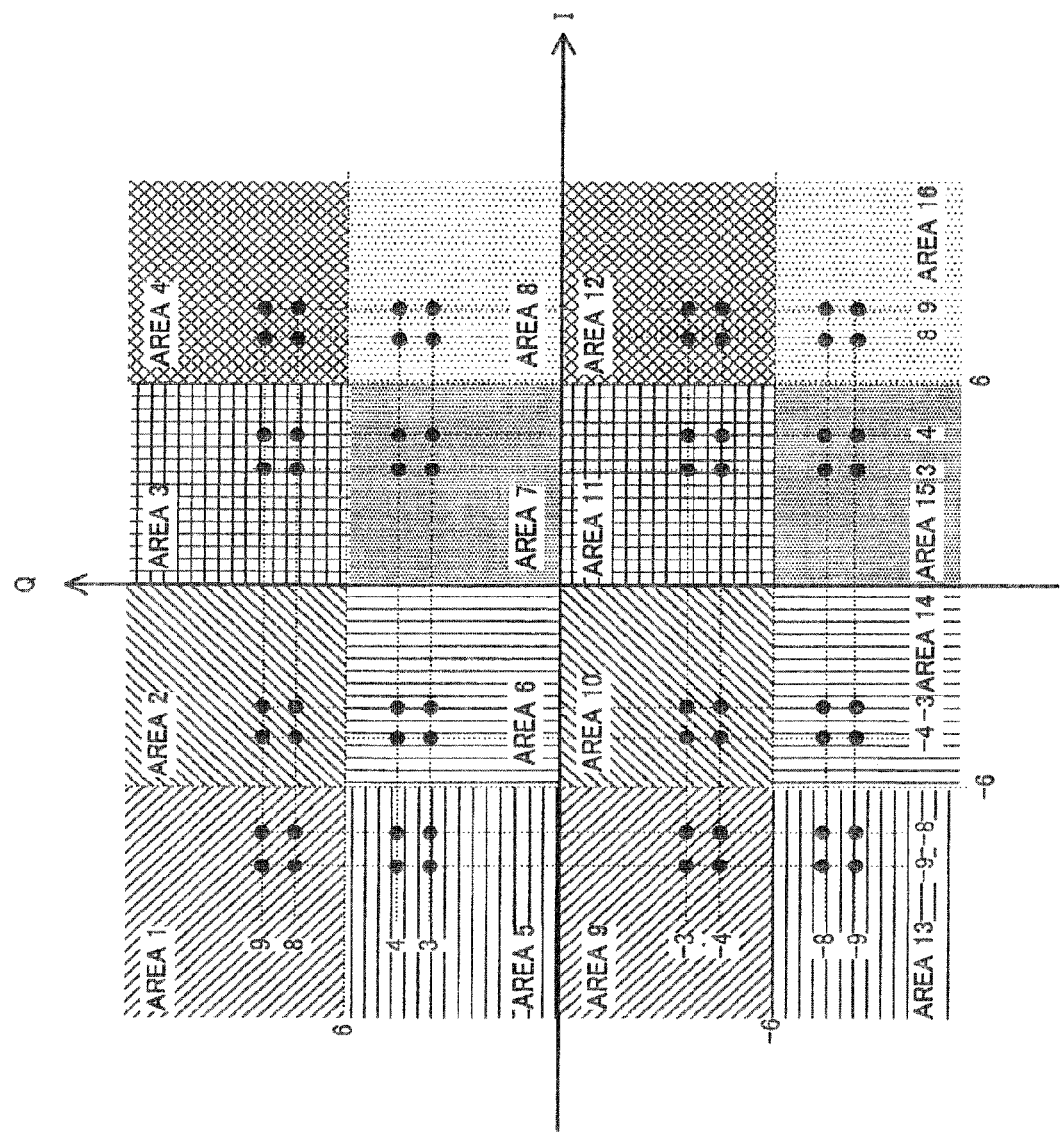
FIG. 19 is a drawing showing a signal point arrangement by a transmitting apparatus of Embodiment 3 and an area division method for partial bit determination by a receiving apparatus.

In this embodiment, the signal point arrangement shown in FIG. 19 is proposed as another desirable signal point arrangement for 64-value M-ary modulation. FIG. 19 shows a 64-value M-ary modulation signal point arrangement suitable for determining 4-bit partial bits for each modulated signal. The basic concept of this signal point arrangement, as in the case described above, is that modulation processing (mapping) is performed whereby signal points are divided into a plurality of sets, and the minimum Euclidian distance between sets is made greater than the minimum Euclidian distance between signal points within a set.

Specifically, 4 signal points are taken as 1 set, and modulation processing (mapping) is performed so that the distances between the 4 signal points within 1 set are small, but distances between sets are large. In this way, signal points are arranged so that an area can easily be divided into areas 1 through 16.

By this means, 4 bits that are common within a set composed of 16 signal points can easily be demodulated on the receiving side. That is to say, since distances between signal points in a set are small and signal point distances between sets are large, the set (area 1 to 16) in which a reception point is included can be determined easily and accurately, enabling 4-bit partial determination to be performed easily and accurately.

Thus, according to this embodiment, when different 64-value M-ary modulation signals are transmitted from a plurality of antennas, by performing modulation (mapping) processing whereby signal points of 64 values are divided into a plurality of sets, and the minimum Euclidian distance between sets is made larger than the minimum Euclidian distance between signal points in a set, easy and accurate partial bit determination processing and signal point reduction processing can be performed on the receiving side, enabling a received signal with good bit error rate performances to be obtained on the receiving side with a comparatively small computational complexity.

As also explained with regard to Embodiment 2, the method of this embodiment is not limited to a case in which the signal point arrangements of modulated signal A and modulated signal B are the same, and may also be implemented even in a case in which modulated signal A and modulated signal B signal points are arranged differently, and the number of partial bits 1.0 determined for modulated signal A and modulated signal B are different.

(Embodiment 4)

In this embodiment, a soft decision value calculation method is described that is suitable for a case in which con-volutional coding or turbo coding is performed on the transmitting side, and soft decision decoding is performed on the receiving side, in addition to implementation of the configurations in Embodiments 1 through 3. While this embodiment can basically be applied to cases in which any of the signal point arrangements described in the above embodiments are used, a case will be described here, by way of example, in which the signal point arrangement shown in FIG. 15A is implemented on the transmitting side.

Figure 20:
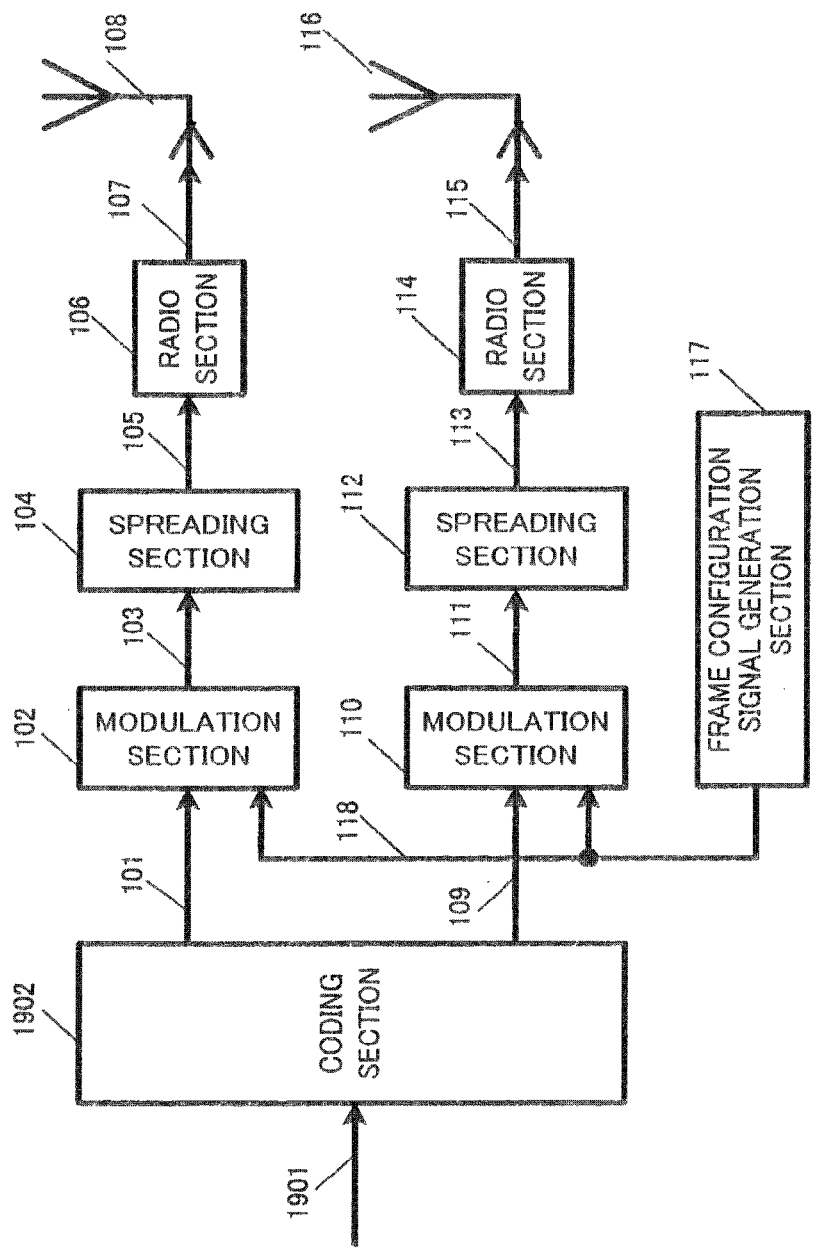
FIG. 20 is a block diagram showing the configuration of a transmitting apparatus of Embodiment 4.

FIG. 20, in which parts corresponding to those in FIG. 2 are assigned the same codes as in FIG. 2, shows the configuration of a transmitting apparatus of this embodiment. In transmitting apparatus 1900, a transmit digital signal 1901 is input to a coding section 1902. Coding section 1902 executes convolutional coding on transmit digital signal 1901 and thereby obtains a coded digital signal 101 and coded digital signal 109, and sends these signals to modulation sections 102 and 110.

The overall configuration of a receiving apparatus is as shown in. FIG. 4. In this embodiment, signal processing section 321 in FIG. 4 is configured as signal processing section 2000 in FIG. 21. Parts in FIG. 21 corresponding to those in FIG. 5 are assigned the same codes as in FIG. 5.

Signal processing section 2000 of this embodiment has a soft decision value calculation section 2001. Soft decision value calculation section 2001 has post-reduction signal point information 515 and 517, and despread baseband signals 503 and 506, as input, obtains soft decision value signal 2002 using these signals, and sends soft decision value signal 2002 to determination section 2003. Determination section 2003 obtains digital signal 2004 by decoding soft decision value signal 2002.

The processing performed by soft decision value calculation section 2001 and determination section 2003 will be described using FIG. 22.

Assume, for example, that transmitting apparatus 1900 in FIG. 20 transmits modulated signals using the kind of signal point arrangement shown in FIG. 15A, and that receiving apparatus 300 has received these modulated signals.

Figure 21:
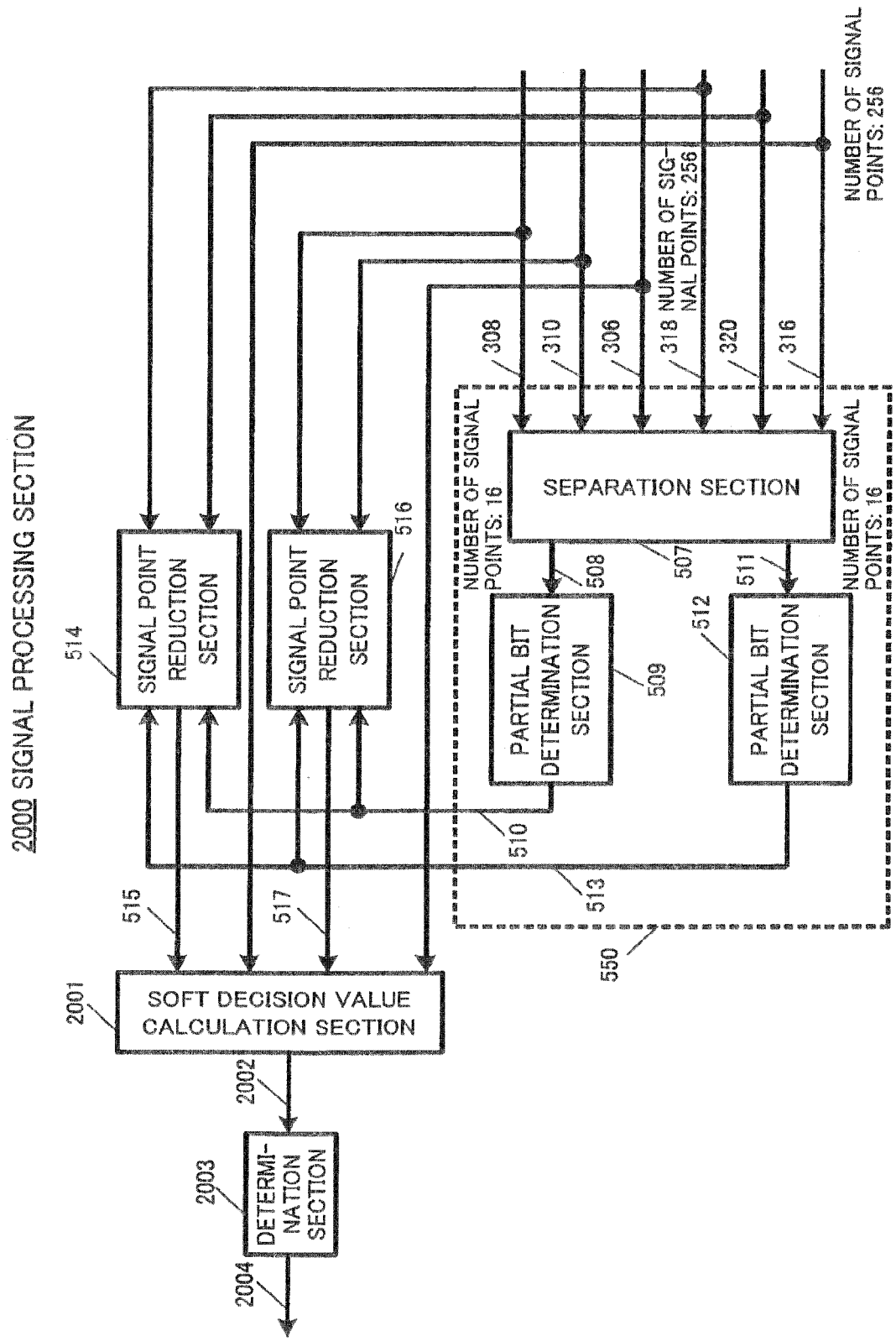
FIG. 21 is a block diagram showing a configuration of a signal processing section of a receiving apparatus of Embodiment 4.

Then, in signal processing section 2000 in FIG. 21, partial bit determination section 509 determines 2 bits Sa0 and Sa2 of modulated signal A based on the area divisions in the signal point arrangement in FIG. 15B, and outputs these as partial bit information 510, and similarly, partial bit determination section 512 determines 2 bits Sb0 and Sb2 of modulated signal B based on the area divisions in the signal point arrangement in FIG. 15B, and outputs these as partial bit information 513.

Using the 4-bit information from partial bit determination sections 509 and 512, signal point reduction section 514 finds 16 signal points from 16×16=256 signal points, and sends these to soft decision value calculation section 2001 as post-reduction signal point information 515. Similarly, signal point reduction section 516 sends 16-signal-point information to soft decision value calculation section 2001 as post-reduction signal point information 517.

Here, as an example, it is assumed that the modulated signal A partial bits determined by partial bit determination section 509 are Sa0=0 and Sa2=0, and the modulated signal B partial bits determined by partial bit determination section 512 are Sb0=0 and Sb2=0.

Figure 22:
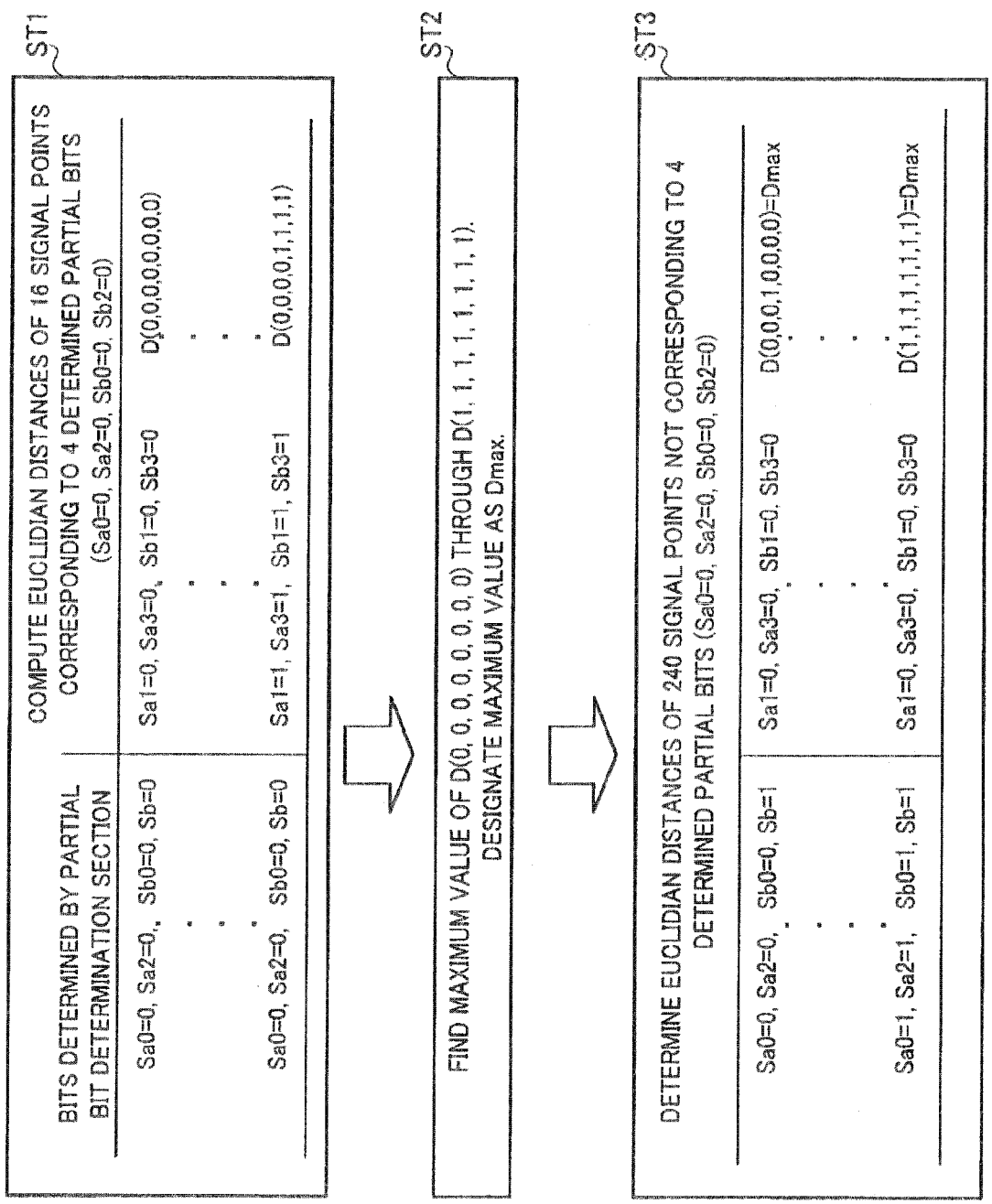
FIG. 22 is a drawing provided to explain computational processing by the soft decision value calculation section in FIG. 21.

At this time, soft decision value calculation section 2001 performs the calculations in FIG. 22 using post-reduction signal point information 515 and despread baseband signal 316.

(Step ST1)

First, the squares, for example, of the Euclidian distances between the 16 signal points of post-reduction signal point information 515 and the despread baseband signals are found. Here, the squares of Euclidian distances are represented by the function D(Sa0, Sa2, Sb0, Sb2, Sa1, Sa3, Sb1 Sb3). Then, since Sa0=0, Sa2=0, Sb0=0, and Sb2=0 in this example, 16 values are found for which Sa1, Sa3, Sb1, and Sb3 are 0 or 1 in D(0, 0, 0, 0, Sa1, Sa3, Sb1, Sb3).

(Step ST2)

Next, the maximum value is found from the 16 values of D(0, 0, 0, 0, Sa1, Sa3, Sb1, Sb3). The maximum value at this time is designated Dmax.

(Step ST3)

Lastly, the values of the squares of the Euclidian distances of the 240 signal points other than the 16 signal points for which the square of the Euclidian distance has actually been found are all taken to be Dmax. In this example, the values from D(0, 0, 0, 1, 0, 0, 0, 0) to D(1, 1, 1, 1, 1, 1, 1, 1) are all taken to be Dmax. That is to say, since the Euclidian distances to the 240 signal points other than the 16 signal points for which the square of the Euclidian distance has actually been found can be considered to be greater than the maximum value of the squares of the Euclidian distances of the 16 signal points, Dmax, the squares of the Euclidian distances of these signal points are uniformly set to Dmax. By this means, the squares of the Euclidian distances of 256 points can easily be obtained by making effective use of the squares of the Euclidian distances of 16 signal points.

Then soft decision value calculation section 2001 outputs the value of the square of the Euclidian distances of these 256 points (branch metric) as soft decision value signal 2002.

Determination section 2003 has soft decision value signal 2002 as input, finds a path metric from the branch metric, decodes this, and outputs digital signal 2004.

Thus, according to signal processing section 2000, a soft decision value can easily be obtained for all candidate signal points by obtaining soft decision values for all candidate signal points by calculating only the Euclidian distances between reduced candidate signal points and a reception point, and setting all the Euclidian distances between other signal points and the reception point as maximum value Dmax of the aforementioned found Euclidian distances.

Figure 23:
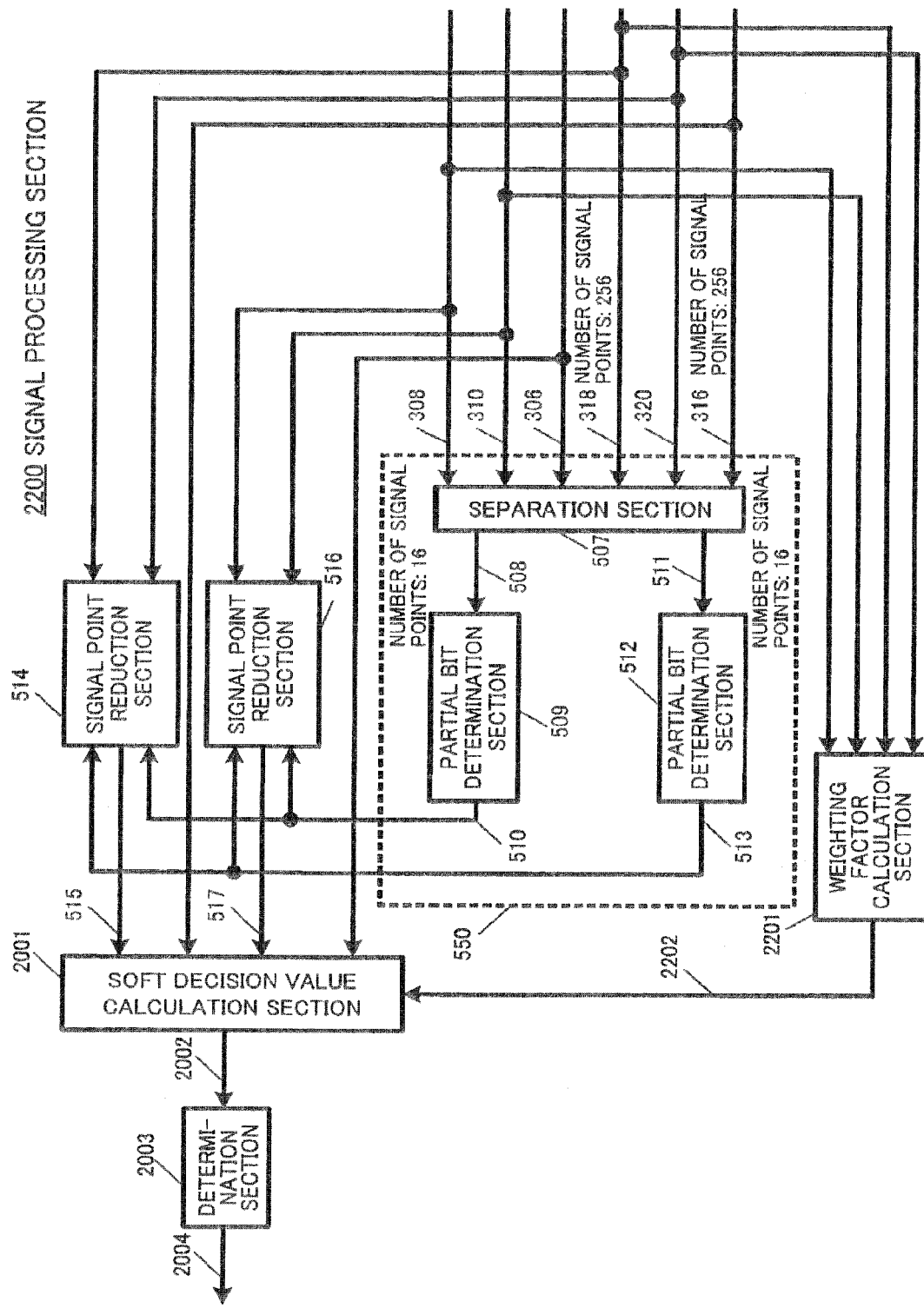
FIG. 23 is a block diagram showing another sample configuration of a signal processing section of Embodiment 4.

FIG. 23, in which parts corresponding to those in FIG. 21 are assigned the same codes as in FIG. 21, shows another configuration of a signal processing section of this embodiment. Signal processing section 2200 has a weighting factor calculation section 2201.

Weighting factor calculation section 2201 has modulated signal A channel fluctuation signals 308 and 318, and modulated signal B channel fluctuation signals 310 and 320, as input, and finds a weighting factor corresponding to a degree of reliability that is multiplied by a branch metric. Here, when separation section 507 separates signals by performing the computations in Equation (1), for example, it is sufficient for weighting factor calculation section 2201 to find a weighting factor corresponding to the precision of signal separation. Specifically, weighting factor calculation section 2201 can find the minimum power of an eigenvalue of the matrix in Equation (1), for example, as shown in "Soft-decision decoder employing eigenvalue of channel matrix in MIMO systems" IEEE PIMRC2003, pp. 1703-1707, September 2003, and output this as a weighting factor signal 2202.

Soft decision value calculation section 2001 has post-reduction signal point information 515 and 517, despread baseband signals 306 and 316, and weighting factor signal 2202 as input, and obtains soft decision value signal 2002 by multiplying a found branch metric by a weighting factor.

Multiplying a branch metric by a weighting factor in signal processing section 2200 in this way enables bit error rate performances to be greatly improved. In the above description, a case has been referred to in which the minimum power of an eigenvalue is used as a weighting factor, but a weighting factor is not limited to this.

Also, in this embodiment, a case has been described in which convolutional coding is used, but this embodiment is not limited to this case, and can also be similarly implemented in a case in which turbo coding, low-density parity coding, or the like is used. Furthermore, this embodiment can also be similarly implemented when a function such as interleaving, which changes the signal order, or puncturing, which performs partial signal elimination and reduces redundancy, is provided. This is also true for other embodiments.

Also, in this embodiment, an example has been described in which the squares of Euclidian distances are found and a soft decision value is found on this basis, but this embodiment can also be applied to a case in which a soft decision value is found on the basis of a different likelihood. This is also true for other embodiments.

(Embodiment 5)

In this embodiment, a more suitable coding (convolutional coding or turbo coding) method is described for use when performing processing that reduces candidate signal points by partial bit reduction on the receiving side as described in the above embodiments.

The general configuration of a transmitting apparatus is as shown in FIG. 20. In this embodiment, it is assumed by way of example that modulation sections 102 and 110 perform modulation which has 16 signal points using the kind of signal point arrangement shown in FIG. 15A. The general configuration of a receiving apparatus is as shown in FIG. 4.

Figure 24:
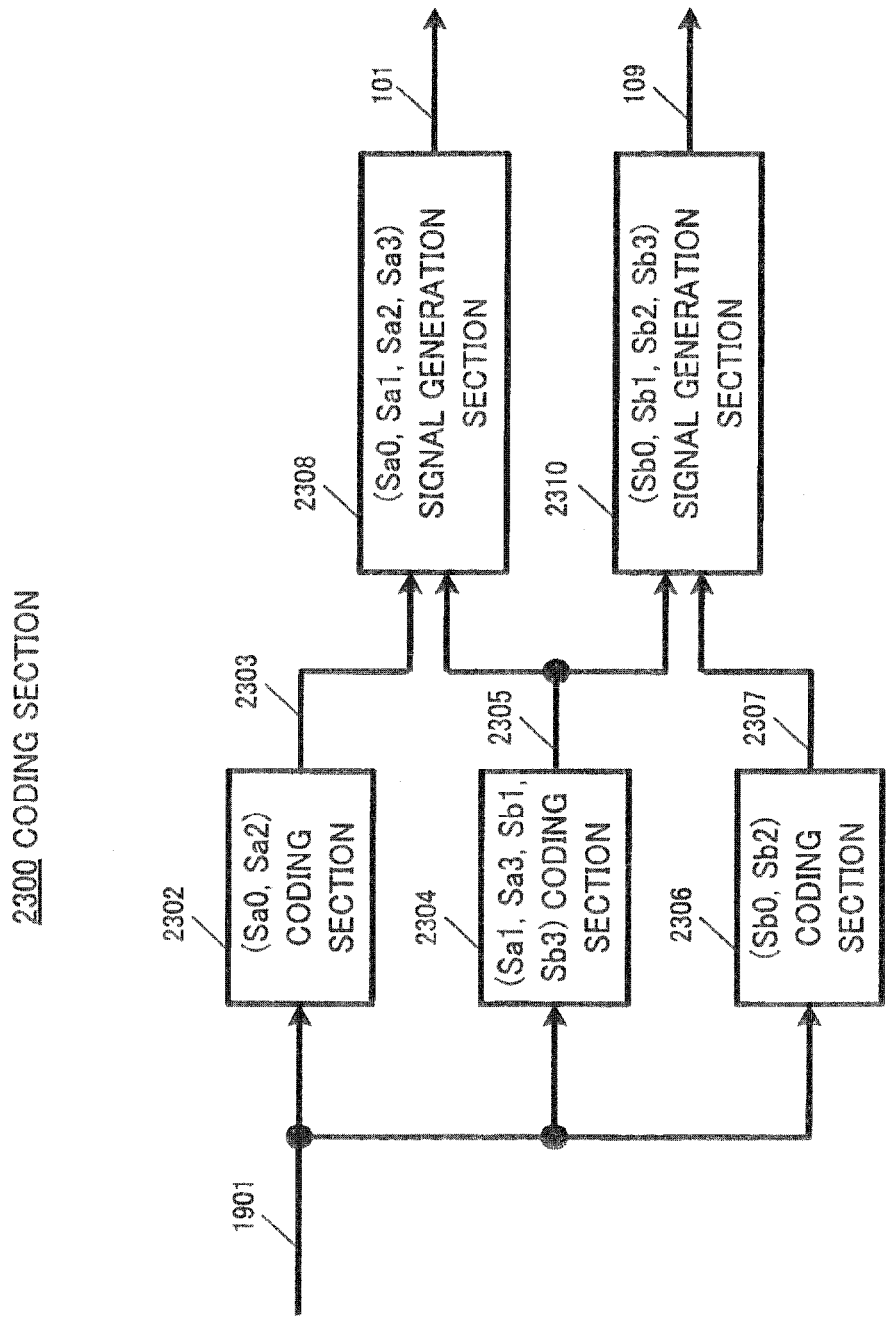
FIG. 24 is a block diagram showing a configuration of a coding section of Embodiment 5.

FIG. 24 shows the configuration of a coding section of this embodiment. That is to say, coding section 2300 in FIG. 24 is used as coding section 1902 in FIG. 20.

Coding section 2300 has (Sa0, Sa2) coding section 2302, (Sa1, Sa3, Sb1, Sb3) coding section 2304, and (Sb0, Sb2) coding section 2306. Coding sections 2302, 2304, and 2306 have digital signal 1901 as input, and perform coding processing on the respective specific bits.

That is to say, (Sa0, Sa2) coding section 2302 codes bits Sa0 and Sa2 contained in digital signal 1901, and outputs bit Sa0 and Sa2 coding information 2303; (Sa1, Sa3, Sb1, Sb3) coding section 2304 codes bits Sa1, Sa3, Sb1, and Sb3 contained in digital signal 1901, and outputs bit Sa1, Sa3, Sb1, and Sb3 coding information 2305; and (Sb0, Sb2) coding section 2306 codes bits Sb0 and Sb2 contained in digital signal 1901, and outputs bit Sb0 and Sb2 coding information 2307.

Executing coding processing in predetermined bit units in this way enables error correction decoding processing to be performed in those bit units on the receiving side. A particular aspect of the suitability of this embodiment is that performing coding processing in bit units for which partial bit determination is performed on the receiving side enables error correction decoding processing to be performed in partial bit units.

(Sa0, Sa1, Sa2, Sa3) signal generation section 2308 has Sa0 and Sa2 coding information 2303 and Sa1, Sa3, Sb1, and Sb3 coding information 2305 as input, generates Sa0, Sa1, Sa2, and Sa3 signals, and outputs these as coded digital signal 101.

Similarly, (Sb0, Sb1, Sb2, Sb3) signal generation section 2310 has Sa1, Sa3, Sb1, and Sb3 coding information 2305 and Sb0 and Sb2 coding information 2307 as input, generates Sb0, Sb1, Sb2, and Sb3 signals, and outputs these as coded digital signal 109.

Next, the configuration of a receiving apparatus that receives such transmit signals will be described. The general configuration of a receiving apparatus of this embodiment is as shown in FIG. 4. The configuration of signal processing section 321 of receiving apparatus 300 is as shown in FIG. 5. In this embodiment, partial bit determination section 509 of signal processing section 321 is configured as shown in FIG. 25A, partial bit determination section 512 is configured as shown in FIG. 25B, and likelihood detection section 518 is configured as shown in FIG. 25C.

Figure 25A:
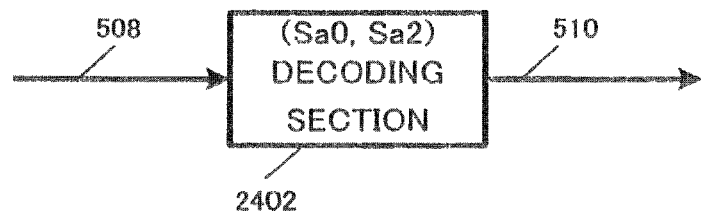
FIG. 25 is a drawing showing the configuration of a partial bit determination section that determines partial bits of modulated signal A according to Embodiment 5 (FIG. 25A), the configuration of a partial bit determination section that determines partial bits of modulated signal B according to Embodiment 5 (FIG. 25B), and the configuration of a likelihood detection section of Embodiment 5 (FIG. 25C)

(Sa0, Sa2) decoding section 2402 in FIG. 25A has modulated signal A estimated baseband signal 508 as input, obtains decoded bits Sa0 and Sa2 by decoding this signal, and outputs these bits as modulated signal A determined partial bit information 510.

Figure 25B:
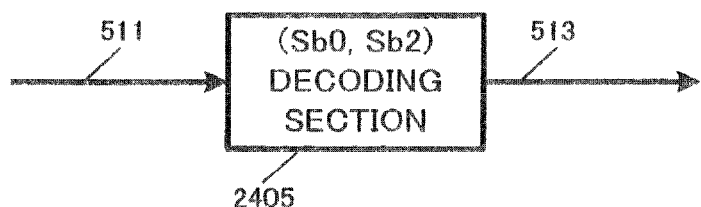
Figure 25C:
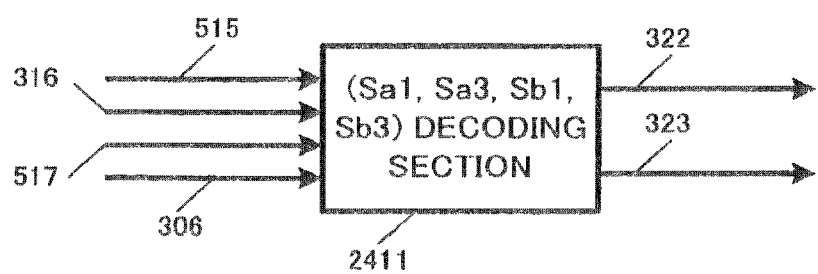

(Sb0, Sb2) decoding section 2405 in FIG. 25B has modulated signal B estimated baseband signal 511 as input, obtains decoded bits Sb0 and Sb2 by decoding this signal, and outputs these bits as modulated signal B determined partial bit information 513.

Implementing error correction coding in partial bit units in this way enables reception quality to be greatly improved. That is to say, if there is an error in partial bit determination, an erroneous signal point is selected during signal point reduction, and therefore the probability of an error occurring in determination of the remaining bits is extremely high. In contrast, in this embodiment, the implementation of error correction coding in partial bit units enables the possibility of being able to decode partial bits correctly to be increased, enabling the possibility of selecting an erroneous signal point during signal point reduction to be decreased.

It is still more desirable for coding with higher error correction capability than (Sa1, Sa3, Sb1, Sb3) coding section 2304 to be performed by (Sa0) Sa2) coding section 2302 and (Sb0, Sb2) coding section 2306. This enables the possibility of being able to decode partial bits Sa0, Sa2, Sb0, and Sb2 without error to be greatly increased, enabling the possibility of performing erroneous signal point reduction to be greatly reduced, with the result that bit error rate performances can be significantly improved.

As modulation signal point arrangements which has 16 signal points, the kind of signal point arrangements shown in FIG. 15A and FIG. 15B are more suitable for implementation of the kind of error correction coding of this embodiment than 16QAM. This is because, whereas the determined partial bits differ according to the area in 16QAM, in the cases shown in FIG. 15A and FIG. 15B the partial bits are fixed at (Sa0, Sa2) and (Sb0, Sb2) irrespective of the area, enabling error correction coding to be implemented easily. In this embodiment, an example has been described in which error correction coding is implemented for modulation which has 16 signal points, but the same kind of effect as in this embodiment can also be obtained if the same kind of error correction coding processing as in this embodiment is performed for 64-value M-ary modulation. In this case, also, for the same reasons as stated above, use of the kind of signal point arrangements shown in FIG. 18 and FIG. 19 is more suitable than 64QAM in enabling error correction coding to be implemented easily.

(Sa1, Sa3, Sb1, Sb3) decoding section 2411 in FIG. 25C has post-reduction signal point information 515 and 517, and despread baseband signals 316 and 306, as input, finds a branch metric by finding, for example, the squares of the Euclidian distances between candidate signal points and baseband signals, finds a path metric from the branch metric, and performs decoding, thereby obtaining modulated signal A received digital signal 322 and modulated signal B received digital signal 323.

Thus, according to this embodiment, by executing coding processing with partial bits as a coding unit—that is, coding transmit bits mapped within the same signal point set together—in addition to implementation of the configurations in Embodiments 1 through 4, possible to greatly improve bit error rate performances on the receiving side in addition to obtaining the effects of Embodiments 1 through 4.

Also, by executing coding processing with higher error correction capability for partial bits than for other bits—that is, coding transmit bits mapped within the same signal point set together—bit error rate performances on the receiving side can be further improved.

Figure 26:
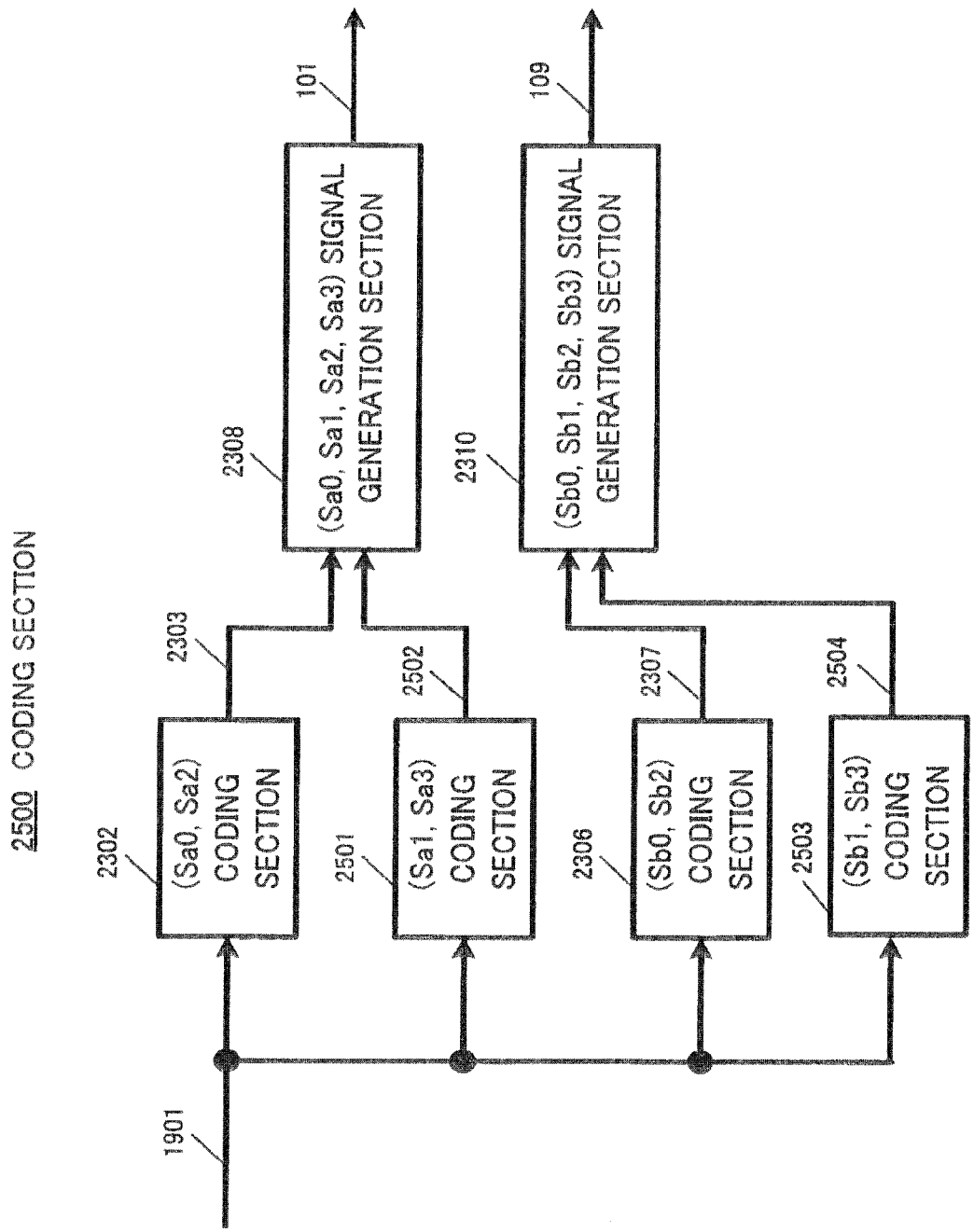
FIG. 26 is a block diagram showing another sample configuration of a coding section of Embodiment 5.
Figure 27:
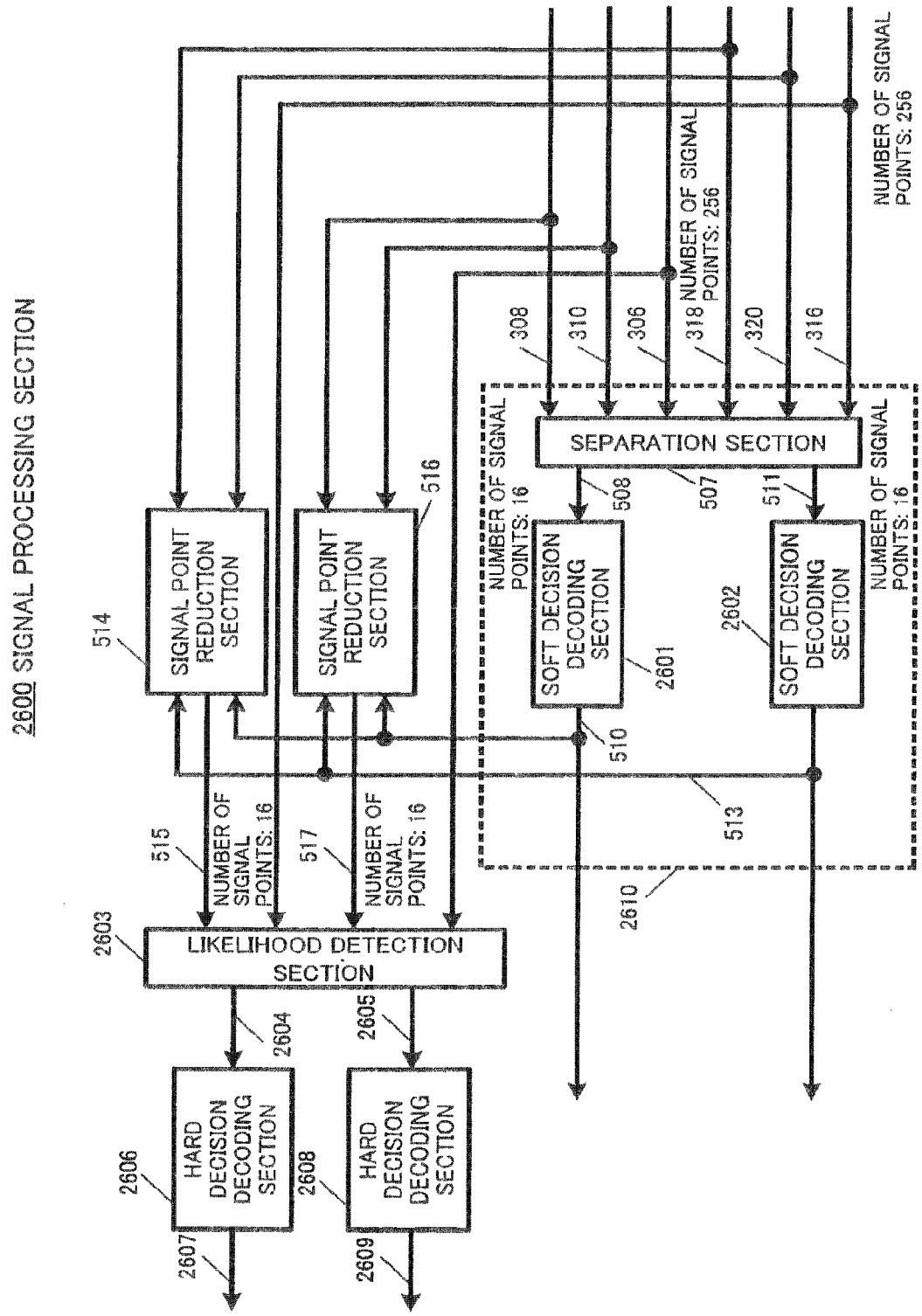
FIG. 27 is a block diagram showing another sample configuration of a signal processing section of a receiving apparatus according to Embodiment 5.

In this embodiment, a case has been described in which the transmitting-side coding section is configured as shown in FIG. 24, and the receiving-side signal processing section is configured as shown in FIG. 5, FIG. 25A, FIG. 25B, and FIG. 25C, but the coding section and signal processing section configurations are not limited to these. FIG. 26 shows another example of a coding section configuration, and FIG. 27 shows another example of a signal processing section configuration.

In FIG. 26, in which parts corresponding to those in FIG. 24 are assigned the same codes as in FIG. 24, coding section 2500 has an (Sa0, Sa2) coding section 2302, an (Sa1, Sa3) coding section 2501, an (Sb0, Sb2) coding section 2306, and an (Sb1, Sb3) coding section 2503. Coding sections 2302, 2501, 2306, and 2503 have digital signal 1901 as input, and perform coding processing on the respective specific bits.

That is to say, (Sa0, Sa2) coding section 2302 codes bits Sa0 and Sa2 contained in digital signal 1901, and outputs bit Sa0 and Sa2 coding information 2303; (Sa1, Sa3) coding section 2501 codes bits Sa1 and Sa3 contained in digital signal 1901, and outputs bit Sa1 and Sa3 coding information 2502; (Sb0, Sb2) coding section 2306 codes bits Sb0 and Sb2 contained in digital signal 1901, and outputs bit Sb0 and Sb2 coding information 2307; and (Sb1 Sb3) coding section 2503 codes bits Sb1 and Sb3 contained in digital signal 1901, and outputs bit Sb1 and Sb3 coding information 2504.

(Sa0, Sa1, Sa2, Sa3) signal generation section 2308 has Sa0 and Sa2 coding information 2303 and Sa1, Sa3 coding information 2502 as input, generates Sa0, Sa1, Sa2, and Sa3 signals, and outputs these as coded digital signal 101.

Similarly, (Sb0, Sb1, Sb2, Sb3) signal generation section 2310 has Sb1 and Sb3 coding information 2504 and Sb0 and Sb2 coding information 2307 as input, generates Sb0, Sb1, Sb2, and Sb3 signals, and outputs these as coded digital signal 109.

Next, the configuration of signal processing section 2600 in FIG. 27 will be described. Signal processing section 2600 in FIG. 27 has a similar configuration to signal processing section 321 in FIG. 5, except that, as compared with signal processing section 321 in FIG. 5, soft decision decoding sections 2601 and 2602 are provided as partial bit determination sections 509 and 512 (that is, partial bit demodulation section 2610 is composed of separation section 507 and soft decision decoding sections 2601 and 2602), and hard decision decoding sections 2606 and 2608 are provided.

Soft decision decoding section 2601 has modulated signal A estimated baseband signal 508 as input, performs soft decision decoding for partial bits Sa0 and Sa2 in FIG. 26, and outputs partial bit Sa0 and Sa2 information thus obtained as modulated signal A determined partial bit information 510. Similarly, soft decision decoding section 2602 has modulated signal B estimated baseband signal 511 as input, performs soft decision decoding for partial bits Sb0 and Sb2 in FIG. 26, and outputs partial bit Sb0 and Sb2 information thus obtained as modulated signal B determined partial bit information 513.

Signal point reduction sections 514 and 516 perform candidate signal point reduction using determined partial bit information 510 and 513, and send post-reduction signal point information 515 and 517 to likelihood determination section 2603.

Likelihood determination section 2603 performs likelihood determination of the candidate signal points with the highest likelihood from the post-reduction candidate signal points and despread baseband signal 316, and finds bits Sa1, Sa3, Sb1, and Sb3. Then likelihood determination section 2603 sends bits Sa1 and Sa3 to hard decision decoding section 2606 as bit information 2604, and sends bits Sb1 and Sb3 to hard decision decoding section 2608 as bit information 2605.

Hard decision decoding section 2606 obtains modulated signal A post-error-correction bit information 2607 by performing hard decision decoding of bit information 2604. Similarly, hard decision decoding section 2608 obtains modulated signal B post-error-correction bit information 2609 by performing hard decision decoding of bit information 2605.

Here, modulated signal A determined partial bit information 510 and modulated signal A post-error-correction bit information 2607 correspond to final post-error-correction modulated signal A bit information, and modulated signal B determined partial bit information 513 and modulated signal B post-error-correction bit information 2609 correspond to final post-error-correction modulated signal B bit information.

Thus, in signal processing section 2600, by providing soft decision decoding sections 2601 and 2602, and finding partial bits used in signal point reduction by means of soft decision decoding processing, the probability of error of partial bits can be reduced compared with a case in which hard decision processing is performed, for example, enabling the final bit error rate performances to be improved. The reason for performing hard decision processing on signals after likelihood determination is that, since determination is carried out for modulated signal A and modulated signal B simultaneously when likelihood determination is performed, in principal it is difficult to make a soft decision for only modulated signal A or to make a soft decision for only modulated signal B.

In this embodiment, a case has been described in which coding is performed on bits (Sa1, Sa3, Sb1, Sb3) other than the bits for which partial bit determination is performed on the receiving side, but it is also possible for coding not to be performed for bits other than the bits for which partial bit determination is performed. Essentially, the same kind of effect as in this embodiment can be obtained as long as coding is performed in partial bit units.

(Embodiment 6)

In this embodiment, the implementation of trellis coding modulation on the transmitting side is proposed. A case in which 16QAM is used as the modulation method will be described here by way of example.

The general configuration of a transmitting apparatus is as shown in FIG. 2, and the transmit signal frame configurations are as shown in FIG. 3. The general configuration of a receiving apparatus is as shown in FIG. 4, and the detailed configuration of signal processing section 321 in FIG. 4 is as shown in FIG. 5.

Figure 28:
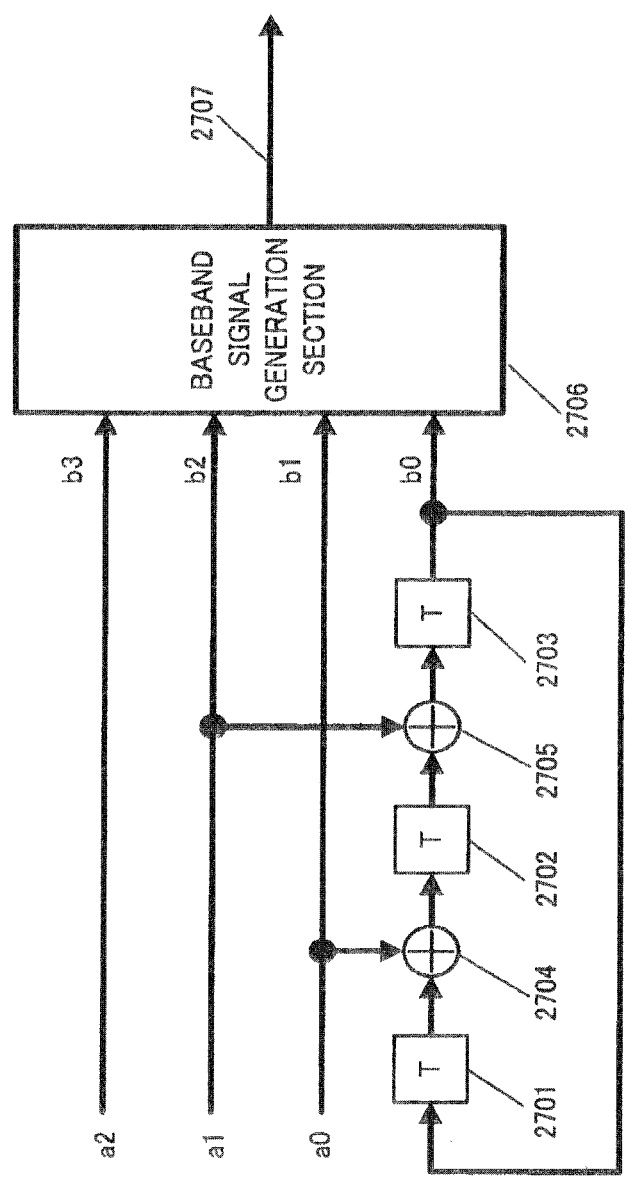
FIG. 28 is a block diagram showing the configuration of a modulation section for performing trellis coding modulation according to Embodiment 6.

In order to implement 16QAM trellis coding modulation, modulation sections 102 and 110 of transmitting apparatus 100 in FIG. 2 can be configured as shown in FIG. 28, for example.

In FIG. 28, reference codes 2701, 2702, and 2703 denote shift registers and reference codes 2704 and 2705 denote exclusive OR circuits, and b0, b1, b2, and b3 are generated from inputs a0, a1, and a2. A baseband signal generation section 2706 has b0, b1, b2, and b3 as input, and obtains a baseband signal 2707 by performing 16QAM mapping.

The operation of a receiving apparatus will now be described. As described above, the characteristic operation of a receiving apparatus of the present invention lies in partial bit determination sections 509 and 512 (FIG. 5). Since similar operations are performed by partial bit determination section 509 and partial bit determination section 512, the operation of partial bit determination section 509 will mainly be described here.

Partial bit determination section 509 has modulated signal A estimated baseband signal 508 as input, determines coding related bits—that is, b0, b1, and b2 in FIG. 28—by performing Viterbi decoding, for example, and outputs this information as modulated signal A determined partial bit information 510. Similarly, partial bit determination section 512 outputs modulated signal B determined partial bit information 513 (3-bit information).

Signal point reduction sections 514 and 516 perform signal point reduction. Then likelihood detection section 518 determines b3 information in FIG. 28 transmitted by modulated signal A, and b3 information in FIG. 28 transmitted by modulated signal B, and outputs this information as a modulated signal A digital signal 519 and modulated signal B digital signal 520.

Thus, according to this embodiment, performing trellis coding modulation on the transmitting side enables implementation of error correction coding to be carried out easily, and bit error rate performances on the receiving side to be effectively improved with a simple transmitting apparatus configuration.

(Embodiment 7)

In this embodiment, an actual sample configuration when using 3 receiving antennas and 3 transmitting antennas will be described as an example of a case in which the number of transmitting antennas and the number of receiving antennas are greater than two.

Also, in this embodiment, a partial bit determination method and signal point reduction method for effectively improving bit error rate performances are proposed.

Figure 30:
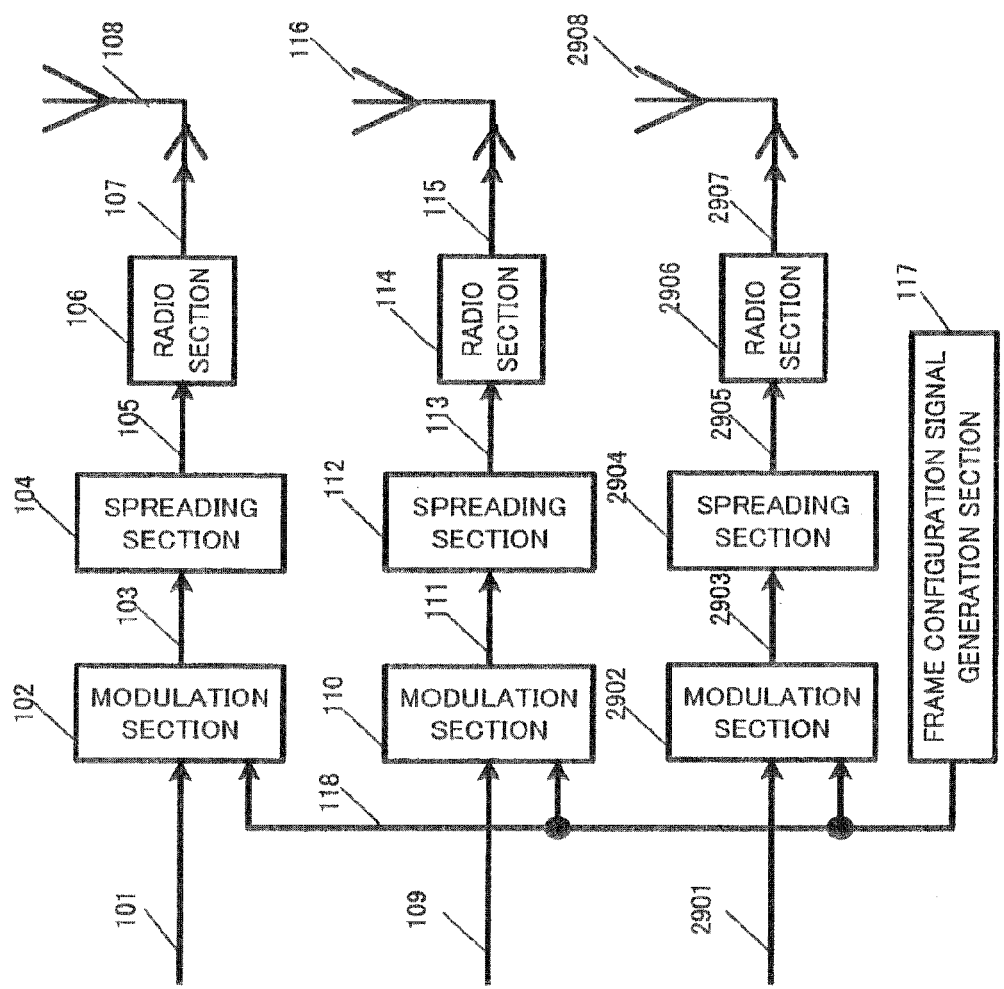
FIG. 30 is a block diagram showing the configuration of a transmitting apparatus of Embodiment 7.

FIG. 30, in which parts corresponding to those in FIG. 2 are assigned the same codes as in FIG. 2, shows the configuration of a transmitting apparatus according to this embodiment. Transmitting apparatus 2900 has the same kind of configuration as transmitting apparatus 100 in FIG. 2, except for the fact that it has a transmitting section that transmits a modulated signal C in addition to those transmitting modulated signal A and modulated signal B. Here, only the configuration of the transmitting section that transmits modulated signal C will be described.

Modulation section 2902 has a digital signal 2901 and frame configuration signal 118 as input, modulates digital signal 2901 in accordance with frame configuration signal 118, and sends a baseband signal 2903 thus obtained to a spreading section 2904. Spreading section 2904 multiplies baseband signal 2903 by a spreading code, and sends a spread baseband signal 2905 thus obtained to a radio section 2906. Radio section 2906 executes frequency conversion, amplification, and so forth on spread baseband signal 2905, thereby obtaining a modulated signal 2907 (modulated signal C). Modulated signal 2907 is output as a radio wave from an antenna 2908.

Figure 31:
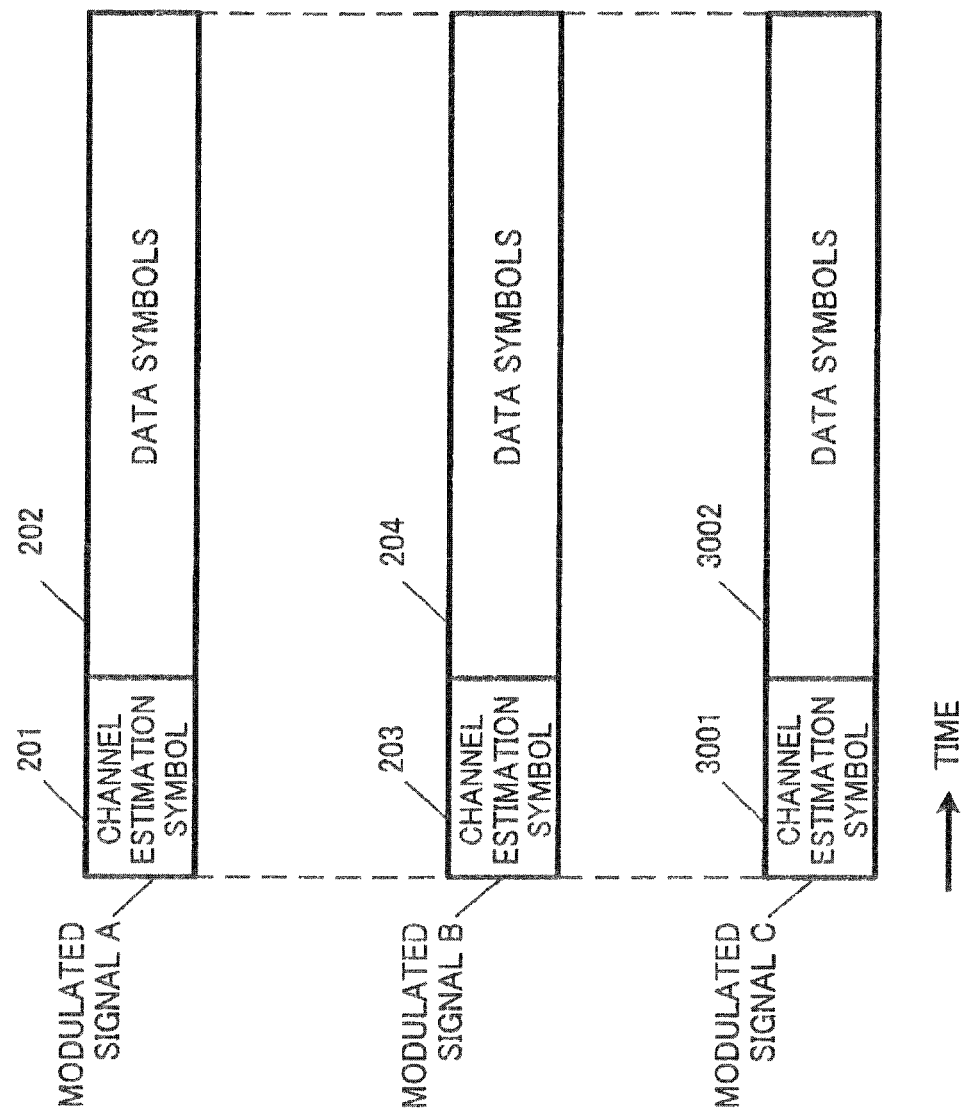
FIG. 31 is a drawing showing frame configurations of Embodiment 7.

Frame configuration signal generation section 117 outputs information on the frame configurations in FIG. 31, for example, as frame configuration signal 118.

FIG. 31 shows sample frame configurations of modulated signals transmitted from antennas 108, 116, and 2908 of transmitting apparatus 2900. Modulated signal A transmitted from antenna 108, modulated signal B transmitted from antenna 116, and modulated signal C transmitted from antenna 2908 have channel estimation symbols 201, 203, and 3001 for channel estimation, and data symbols 202, 204, and 3002. Transmitting apparatus 2900 transmits modulated signal A, modulated signal B, and modulated signal C with the frame configurations shown in FIG. 31 at virtually the same time. Channel estimation symbols 201, 203, and 3001 for channel estimation can also be referred to as pilot symbols, unique words, or preambles.

Figure 32:
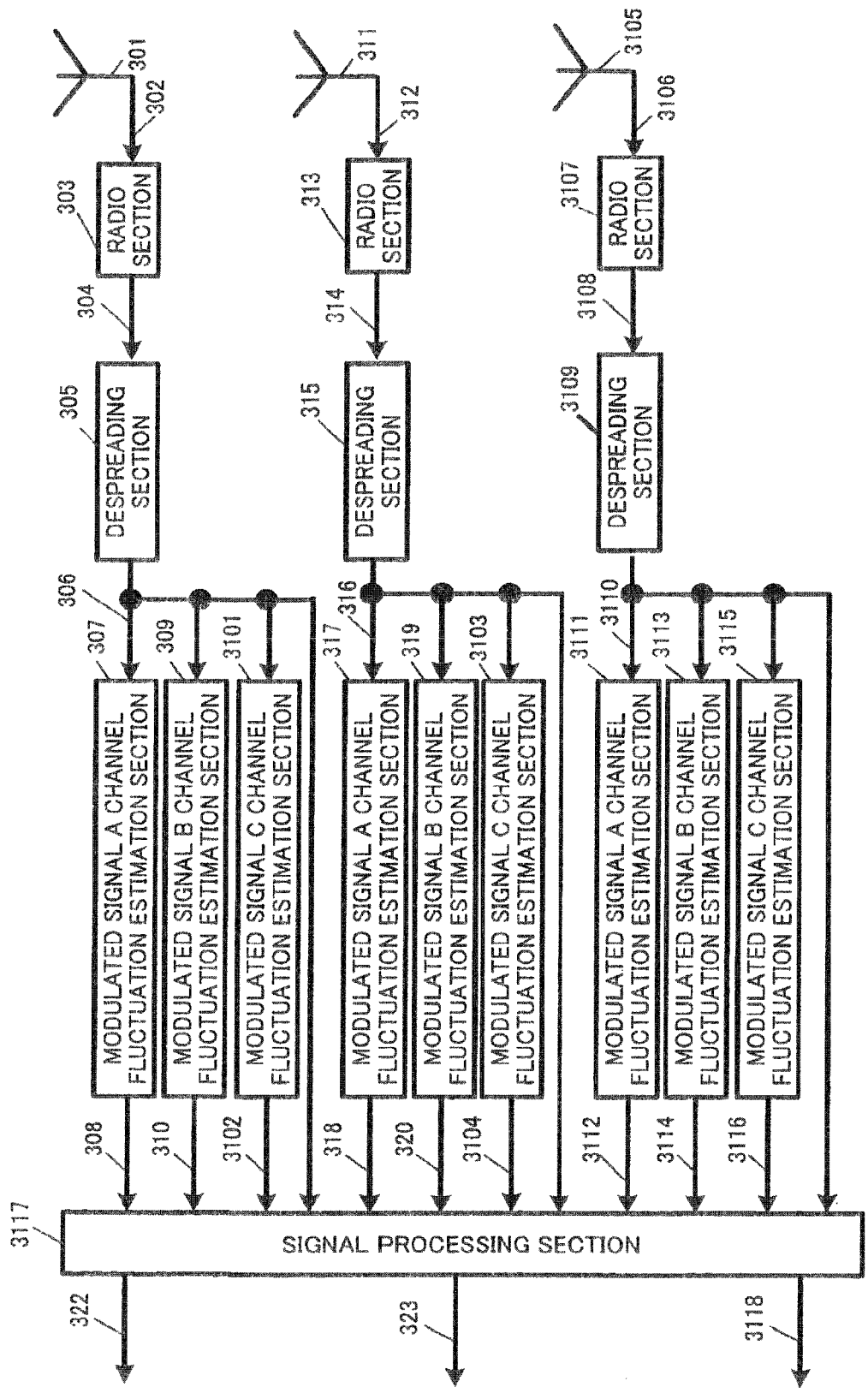
FIG. 32 is a block diagram showing the configuration of a receiving apparatus of Embodiment 7.

FIG. 32, in which parts corresponding to those in FIG. 4 are assigned the same codes as in FIG. 4, shows the configuration of a receiving apparatus according to this embodiment. Descriptions of parts that operate in the same way as in FIG. 4 are omitted from the following explanation.

If, in transmitting apparatus 2900 in FIG. 30, a signal transmitted from antenna 108 is designated Txa(t), a signal transmitted from antenna 116, Txb(t), and a signal transmitted from antenna 2908, Txc(t); and in receiving apparatus 3100 in FIG. 32, a signal received by antenna 301 is designated Rx1(t), a signal received by antenna 311, Rx2(t), and a signal received by antenna 3105, Rx3(t); and, furthermore, propagation fluctuations between the transmitting and receiving antennas are designated h11(t), h12(t), h13(t), h21(t), h22(t), h23(t), h31(t), h32(t), and h33(t); then the relational expression in the following equation holds true, where t denotes time.

$$\begin{pmatrix} Rx1(t) \\ Rx2(t) \\ Rx3(t) \end{pmatrix} = \begin{pmatrix} h11(t) & h12(t) & h13(t) \\ h21(t) & h22(t) & h23(t) \\ h31(t) & h32(t) & h33(t) \end{pmatrix} \begin{pmatrix} Txa(t) \\ Txb(t) \\ Txc(t) \end{pmatrix} \quad (2)$$

A modulated signal C channel fluctuation estimation section 3101 has despread baseband signal 306 as input, estimates channel fluctuation using modulated signal C channel estimation symbol 3001 in the frame configuration in FIG. 31, for example, and sends a modulated signal C channel fluctuation signal 3102 thus obtained to a signal processing section 3117. Similarly, a modulated signal C channel fluctuation estimation section 3103 has despread baseband signal 316 as input, estimates channel fluctuation using modulated signal C channel estimation symbol 3001 in the frame configuration in FIG. 31, for example, and sends a modulated signal C channel fluctuation signal 3104 thus obtained to signal processing section 3117.

A radio section 3107 has a received signal 3106 received by antenna 3105 as input, executes frequency conversion, quadrature demodulation, and so forth on received signal 3106, and sends a baseband signal 3108 thus obtained to a despreading section 3109. Despreading section 3109 despreads baseband signal 3108, and outputs despread baseband signal 3110 thus obtained.

A modulated signal A channel fluctuation estimation section 3111 has despread baseband signal 3110 as input, estimates channel fluctuation using modulated signal A channel estimation symbol 201 in the frame configuration in FIG. 31, for example, and sends a modulated signal A channel fluctuation signal 3112 thus obtained to signal processing section 3117. Similarly, a modulated signal B channel fluctuation estimation section 3113 has despread baseband signal 3110 as input, estimates channel fluctuation using modulated signal B channel estimation symbol 203 in the frame configuration in FIG. 31, for example, and sends a modulated signal B channel fluctuation signal 3114 thus obtained to signal processing section 3117. In the same way, a modulated signal C channel fluctuation estimation section 3115 has despread baseband signal 3110 as input, estimates channel fluctuation using modulated signal C channel estimation symbol 3001 in the frame configuration in FIG. 31, for example, and sends a modulated signal C channel fluctuation signal 3116 thus obtained to signal processing section 3117.

Signal processing section 3117 has despread baseband signals 306, 316, and 3110, modulated signal A channel fluctuation signals 308, 318, and 3112, modulated signal B channel fluctuation signals 310, 320, and 3114, and modulated signal C channel fluctuation signals 3102, 3104, and 3116, as input, and by performing modulated signal A, B, and C detection, decoding, and so forth, using these signals, obtains a modulated signal A digital signal 322, modulated signal B digital signal 323, and modulated signal C digital signal 3118.

Figure 33:
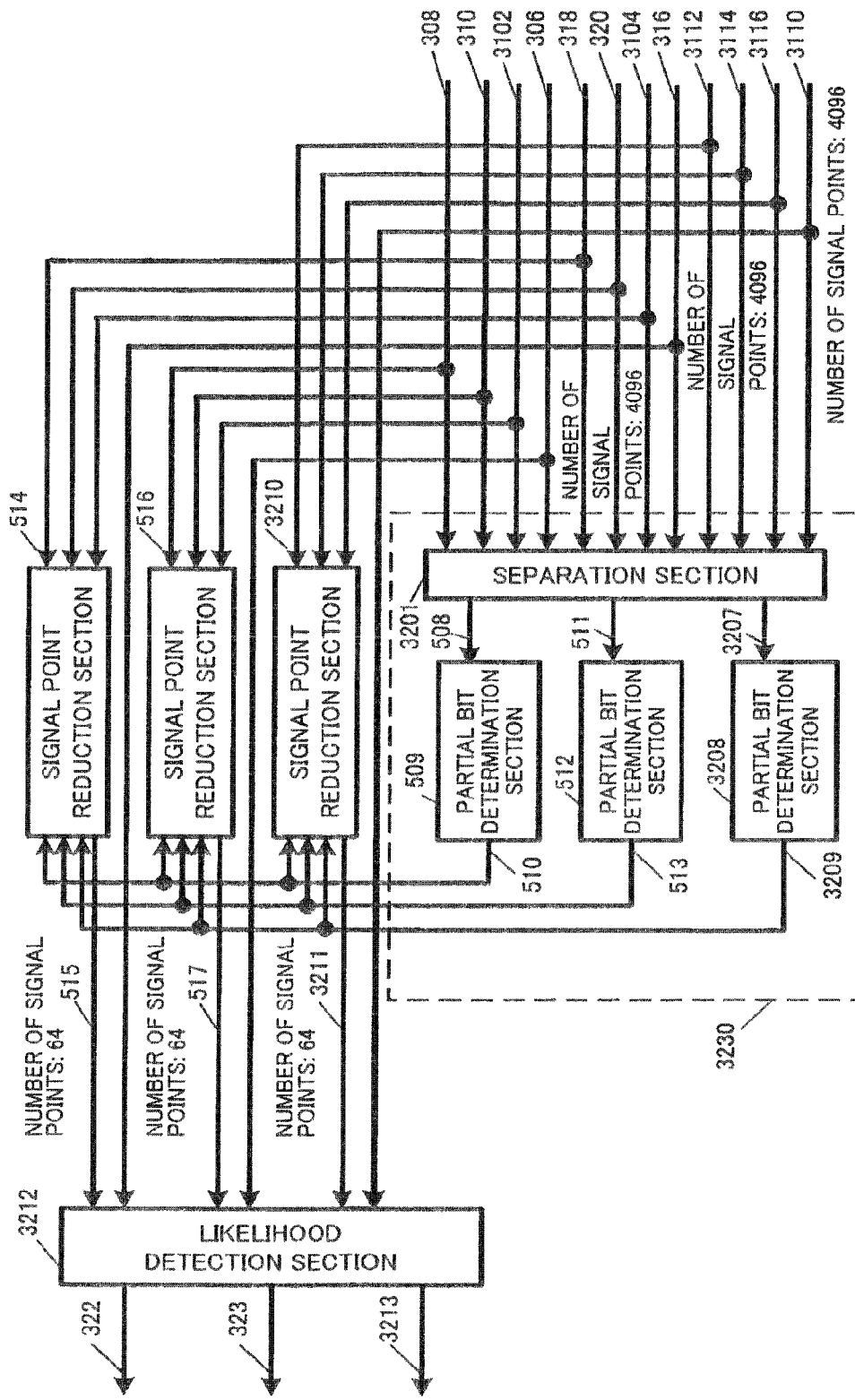
FIG. 33 is a block diagram showing a configuration of a signal processing section of a receiving apparatus according to Embodiment 7.
Figure 34:
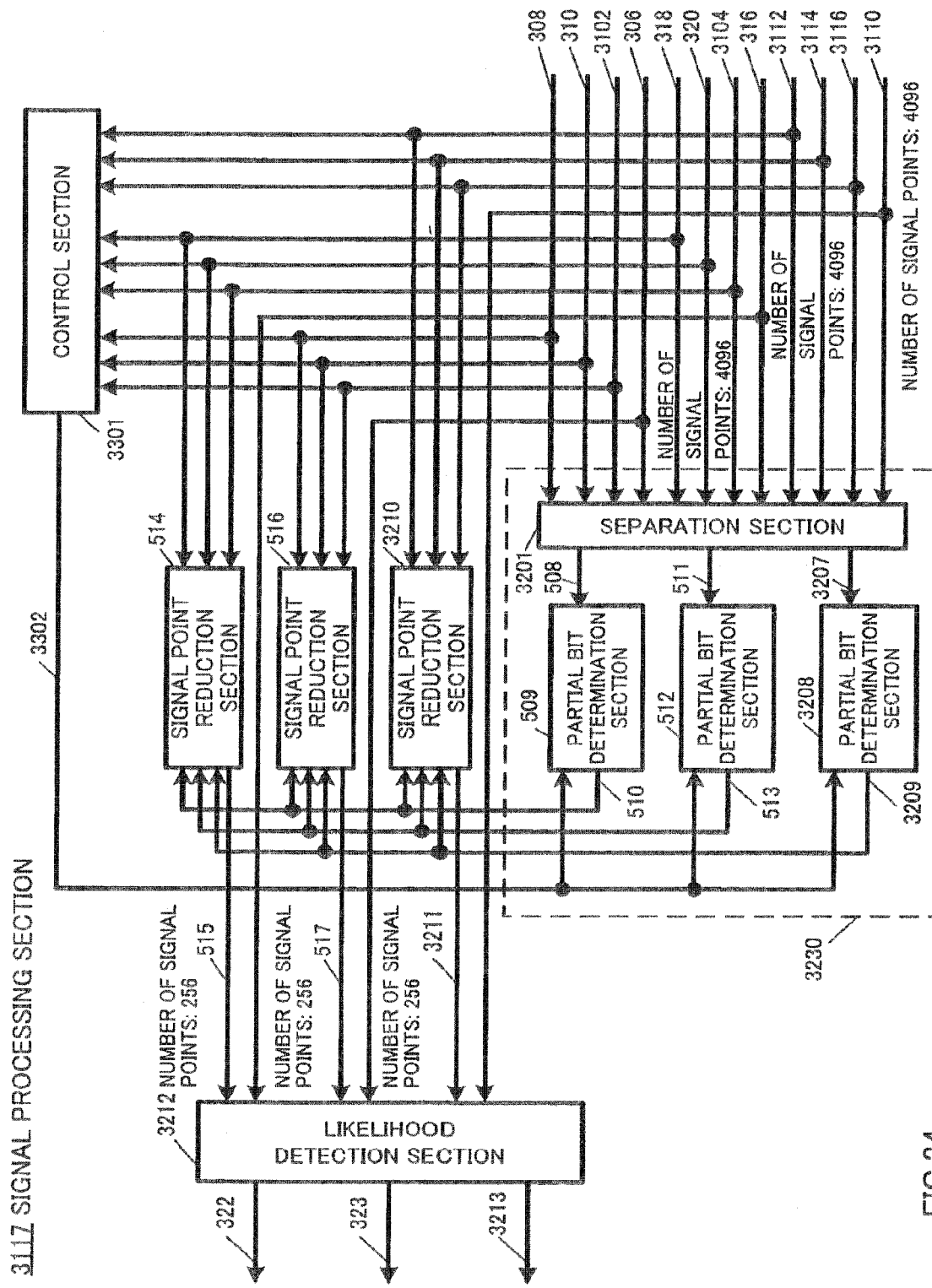
FIG. 34 is a block diagram showing another configuration of a signal processing section of a receiving apparatus according to Embodiment 7.

A sample configuration of signal processing section 3117 is shown in FIG. 33, and another sample configuration of signal processing section 3117 is shown in FIG. 34.

First, the configuration in FIG. 33 will be described. In FIG. 33, in which parts corresponding to those in FIG. 5 are assigned the same codes as in FIG. 5, separation section 3201 of partial bit demodulation section 3230 of signal processing section 3117 has modulated signal A channel fluctuation signals 308, 318, and 3112, modulated signal B channel fluctuation signals 310, 320, and 3114, modulated signal C channel fluctuation signals 3102, 3104, and 3116, and despread baseband signals 306, 316, and 3110 as input, and obtains transmit signals Txa(t), Txb(t), and Txc(t) by performing an inverse matrix computation or MMSE (Minimum Mean Square Error) computation, for example, for Equation (2). Separation section 3201 sends thus obtained modulated signal A estimated baseband signal 508 to partial bit determination section 509, modulated signal B estimated baseband signal 511 to partial bit determination section 512, and modulated signal C estimated baseband signal 3207 to partial bit determination section 3208. Partial bit determination sections 509, 512, and 3208 send out found partial bit information 510, 512, and 3209.

Figure 29:
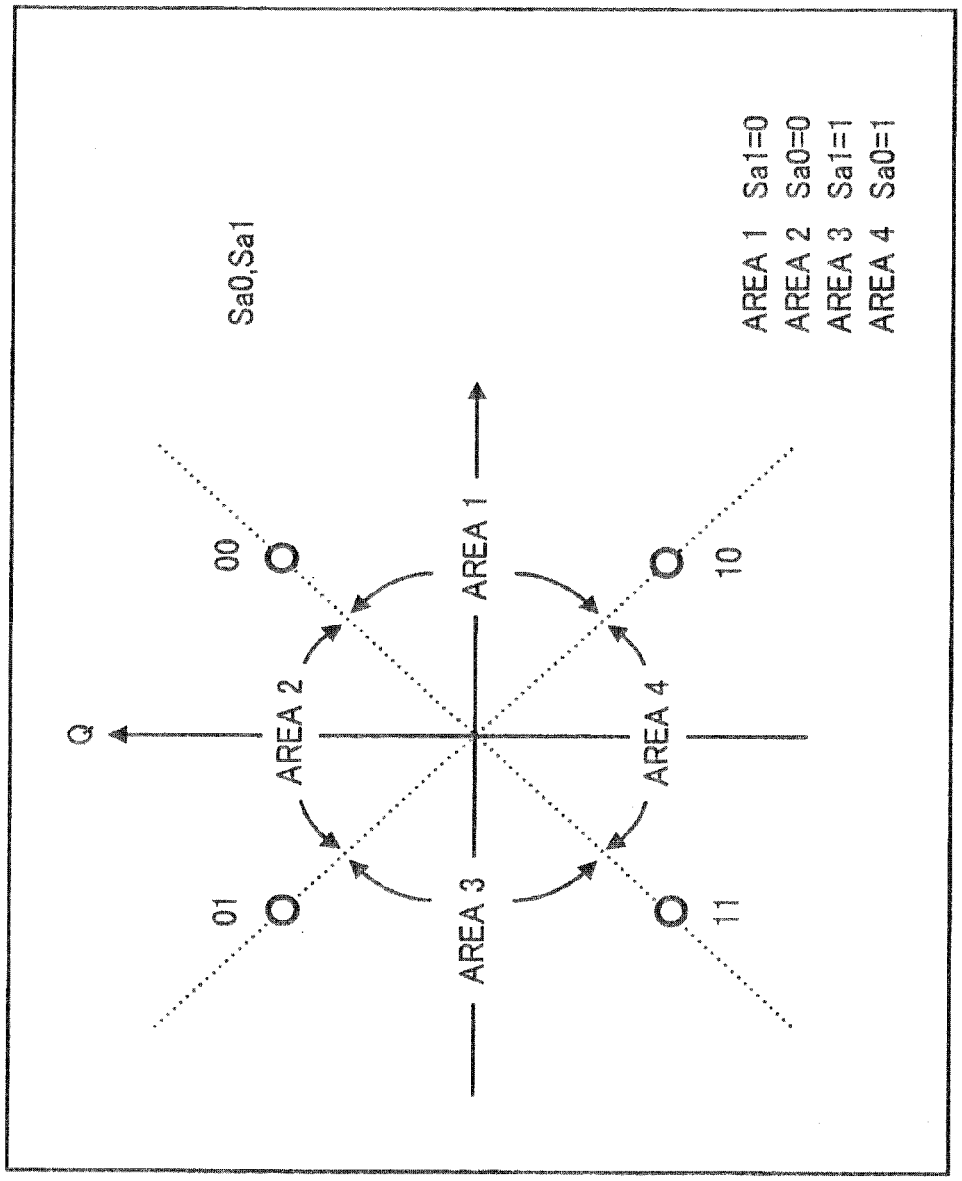
FIG. 29 is a drawing showing an area division method for partial bit determination of a BPSK signal.

Partial bit determination of partial bit determination sections 509, 512, and 3208 can be performed by using the methods in FIG. 9B and FIG. 11B above, for example, when the modulation method is 16QAM. In the case of QPSK, partial bit determination can be implemented by performing the kind of area division shown in FIG. 29, for example. Here, an implementation method in the case of 3 antennas will be described taking a case in which the modulation method is 16QAM, and 2 of 4 bits are determined as in FIG. 11B, as an example.

When three 16QAM signals transmitted simultaneously from different antennas are received, 16×16×16=4096 candidate signal points exist. As 2 bits are determined for each of modulated signals A, B, and C by partial bit determination sections 509, 512, and 3208, the 4096 signal points are reduced to 4096/4/4/4=64 candidate signal points. Thus, in likelihood detection section 3212, branch metrics between 64 candidate signal points and despread baseband signals are found, and by performing narrowing-down to one candidate signal point and detection, modulated signal A, modulated signal B, and modulated signal C digital signals 322, 323, and 3213 are obtained.

By thus also performing partial bit determination, reducing the number of candidate signal points using determined partial bits, and performing likelihood determination using the reduced candidate signal points even when there are 3 transmitting antennas, 3 receiving antennas, and 3 transmit modulated signals, in the same way as when there are 2 transmitting antennas, 2 receiving antennas, and 2 transmit modulated signals, received digital signals 322, 323, and 3213 of good reception quality can be obtained with a comparatively small amount of computation.

Next, the configuration in FIG. 34 will be described. Signal processing section 3117 in FIG. 34, in which parts corresponding to those in FIG. 33 are assigned the same codes as in FIG. 33, has a control section 3301.

Control section 3301 has modulated signal A channel fluctuation signals 308, 318, and 3112, modulated signal B channel fluctuation signals 310, 320, and 3114, and modulated signal C channel fluctuation signals 3102, 3104, and 3116 as input, and estimates, for example, the received field strength of modulated signal A, the received field strength of modulated signal B, and the received field strength of modulated signal C. Control section 3301 then outputs control information 3302 such that partial bit determination is not performed for only the modulated signal with the lowest field strength.

Assume, for example, that the received field strength of modulated signal A the lowest. In this case, modulated signal A partial bit determination section 509 is controlled so as not to perform bit determination. That is to say, determined bits are 0 bits. On the other hand, modulated signal B partial bit determination section 512 and modulated signal C partial bit determination section 3208 are each controlled so as to perform 2-bit determination. Then signal point reduction sections 514, 516, and 3210 reduce the 4096 candidate signal points to 4096/4/4=256 candidate signal points using 0 modulated signal A determined bits (that is to say, no hits have been determined), 2 modulated signal B determined bits, and 2 modulated signal C determined bits. In likelihood detection section 3212, branch metrics between 256 candidate signal points and despread baseband signals are found, and by performing narrowing-down to one candidate signal point and detection, modulated signal A, modulated signal B, and modulated signal C digital signals 322, 323, and 3213 are obtained.

By selecting which modulated signals' partial bits are used for signal point reduction in this way, received digital signals with significantly better bit error rate performances can be obtained than in a case in which partial bits of all modulated signals are simply used for signal point reduction (as in the configuration in FIG. 33, for example).

That is to say, when candidate signal point reduction is performed simply by using the results of partial bit determination for all modulated signals, the probability of error of partial bit determination results for a modulated signal of low reception quality (in the case of this embodiment, received field strength) increases, and in line with this, the probability of not being able to perform candidate signal point reduction accurately also increases. As a result, there is a risk of degradation of the bit error rate performances of the final received digital signals. Taking this into consideration, in this embodiment signal point reduction is performed using only partial bit determination results of modulated signals that have good reception quality.

Thus, according to this embodiment, by providing a control section 3301 that controls which modulated signals' partial bits are used for candidate signal point reduction by signal point reduction sections 514, 516, and 3210 based on the reception quality of each modulated signal, received digital signals 322, 323, and 3213 with significantly better bit error rate performances can be obtained.

In this embodiment, a case in which received field strength is used as a reception quality parameter has been described as an example, but this is not a limitation, and it is also possible, for example, to find the carrier power to noise power ratio of each modulated signal after inverse matrix computation or MMSE computation, and use this as a reception quality parameter for each modulated signal.

Also, in this embodiment an example has been described in which partial bits are determined for only two modulated signals, but the present invention can be similarly implemented by determining partial bits for only one modulated signal.

Furthermore, the number of bits determined as partial bits may be varied according to a reception quality priority order. For example, compatibility between good bit error rate performances and a small computation scale can be achieved by having 2 bits determined by the modulated signal A partial bit determination section, 1 bit determined by the modulated signal B partial bit determination section, and 0 bits determined by the modulated signal C partial bit determination section when the relationship "modulated signal A received field strength>modulated signal B received field strength>modulated signal C received field strength" holds true.

That is to say, if the number of partial bits used in each modulated signal is controlled by control section 3301 in signal point reduction by signal point reduction sections 514, 516, and 3210 based on the reception quality of each modulated signal, received digital signals 322, 323, and 3213 with significantly better bit error rate performances can be obtained.

In this embodiment, a case has been described in which 16QAM is used as the modulation method, but the same kind of effect can also be obtained when a different modulation method is used.

Also, in this embodiment, a case in which the number of transmitting antennas is 3, the number of receiving antennas is 3, and the number of transmit modulated signals is 3 has been described as an example, but this embodiment can be widely applied to cases with n transmitting antennas, n receiving antennas, and n transmit signals (where n≥2). For example, in a case in which the number of transmitting antennas is 2, the number of receiving antennas is 2, and the number of transmit modulated signals is 2, if modulated signal A received field strength>modulated signal B received field strength, determination may be carried out whereby 2 partial bits are determined for modulated signal A, 1-bit or 0-bit partial determination is performed for modulated signal B, and the remaining bits are then included by performing likelihood determination.

Furthermore, in this embodiment, a case in which coding is not performed has been described as an example, but the same kind of effect can also be obtained by using the determination method of this embodiment when error correction coding is applied.

A method may also be used whereby modulated signal A, modulated signal B, and modulated signal C received digital signals 322, 323, and 3213 are obtained by determining partial bits of modulated signal A and modulated signal B and obtaining branch metric $BM_{AB}$ from candidate signal points reduced using these partial bits, determining partial bits of modulated signal A and modulated signal C and obtaining branch metric $BM_{AC}$ from candidate signal points reduced using these partial bits, and determining partial bits of modulated signal B and modulated signal C and obtaining branch metric $BM_{BC}$ from candidate signal points reduced using these partial bits, and performing determination using these branch metrics $BM_{AB}$, $BM_{AC}$, and $BM_{BC}$.

As a result of performing a simulation, it was found that the method described in this embodiment, whereby partial bits used in candidate signal point reduction by signal point reduction sections are controlled according to the reception quality of each modulated signal, enables received digital signals 322, 323, and 3213 with extremely good bit error rate performances to be obtained especially when MMSE is performed by separation section 3201 (FIG. 34).

(Embodiment 8)

In above Embodiment 1, a 1-bit partial determination method when the modulation method is 16QAM (FIG. 9B) was described, but in this embodiment, a 1-bit partial determination method will be described that enables significantly better bit error rate performances to be obtained.

Figure 35:
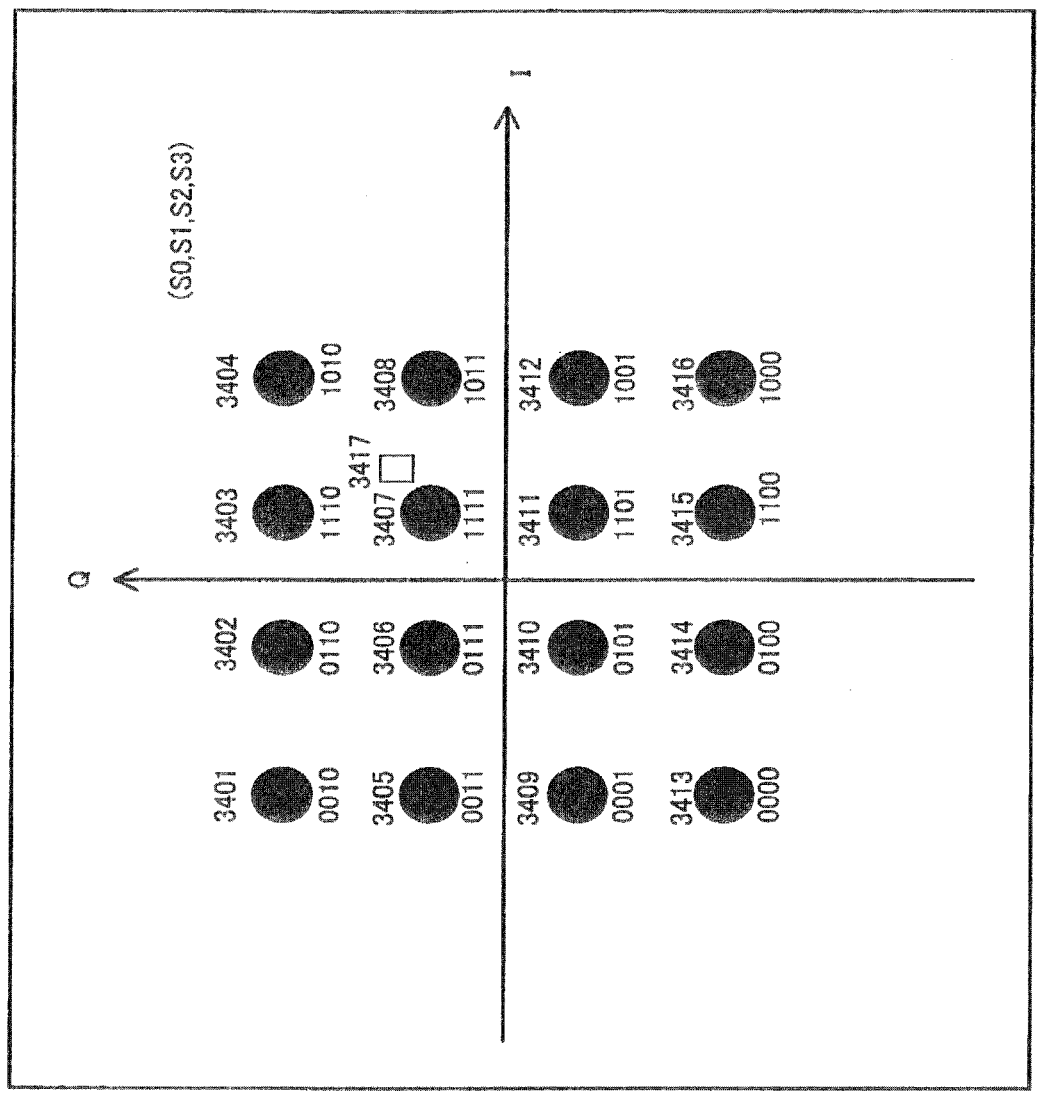
FIG. 35 is a drawing provided to explain 1-bit determination processing of Embodiment 8.

FIG. 35 shows an example of 16QAM signal point arrangement and a received-signal signal point. In this figure, reference codes 3401 through 3416 denote 16QAM signal points (candidate signal points), and reference code 3417 denotes a received-signal signal point (reception point). FIG. 35 also shows the relationships of the 4 bits (S0, S1, S2, S3) of signal points 3401 through 3416.

In a 1-bit partial bit determination method of this embodiment, first, the Euclidian distances between received-signal signal point 3417 and 16QAM signal points 3401 through 3416 are found, the 16QAM signal point with the minimum Euclidian distance is found, and the 4 bits indicated by that signal point are found. In the example in FIG. 35, signal point 3407 is detected as the signal point having the minimum Euclidian distance from reception point 3417, and (S0, S1, S2, S3)=(1, 1, 1, 1) is found as the 4-bit bit string indicated by that signal point 3407.

Next, the following Euclidian distances are found for the 4 bits (S0, S1, S2, S3).

As "1" has been found for bit S0, signal points with "0" in the S0 position of bit string (S0, S1, S2, S3) are searched for. As a result of the search, signal points 3401, 3402, 3405, 3406, 3409, 3410, 3413, and 3414 are obtained. Then the minimum Euclidian distance between these 8 signal points and reception point 3417 is found, and the value of minimum Euclidian distance $D_{min,S0}$ is found.

Similarly, as "1" has been found for bit S1, signal points with "0" in the S1 position of bit string (S0, S1, S2, S3) are searched for. As a result of the search, signal points 3401, 3404, 3405, 3408, 3409, 3412, 3413, and 3416 are obtained. Then the minimum Euclidian distance between these 8 signal points and reception point 3417 is found, and the value of minimum Euclidian distance $D_{min,S1}$ is found.

Similarly, as "1" has been found for bit S2, signal points with "0" in the S2 position of bit string (S0, S1, S2, S3) are searched for. As a result of the search, signal points 3409, 3410, 3411, 3412, 3413, 3414, 3415, and 3416 are obtained. Then the minimum Euclidian distance between these 8 signal points and reception point 3417 is found, and the value of minimum Euclidian distance $D_{min,S2}$ is found.

Similarly, as "1" has been found for bit S3, signal points with "0" in the S3 position of bit string (S0, S1, S2, S3) are searched for. As a result of the search, signal points 3401, 3402, 3403, 3404, 3413, 3414, 3415, and 3416 are obtained. Then the minimum Euclidian distance between these 8 signal points and reception point 3417 is found, and the value of minimum Euclidian distance $D_{min,S3}$ is found.

That is to say, signal points that have a value that is the NOT of determined bit Sx are searched for, the minimum Euclidian distance between these signal points and reception point 3407 is found, and the value of minimum Euclidian distance $D_{min,Sx}$ is found.

Then the item with the maximum value among $D_{min,S0}$, $D_{min,S1}$, $D_{min,S2}$, and $D_{min,S3}$ is searched for. If, for example, the item with the maximum value is $D_{min,S0}$, S0 is determined. That is to say, when the item with the maximum value is $D_{min,Sy}$, Sy is determined. By this means, the most probable bit within bit string (S0, S1, S2, S3) can be chosen.

Figure 36:
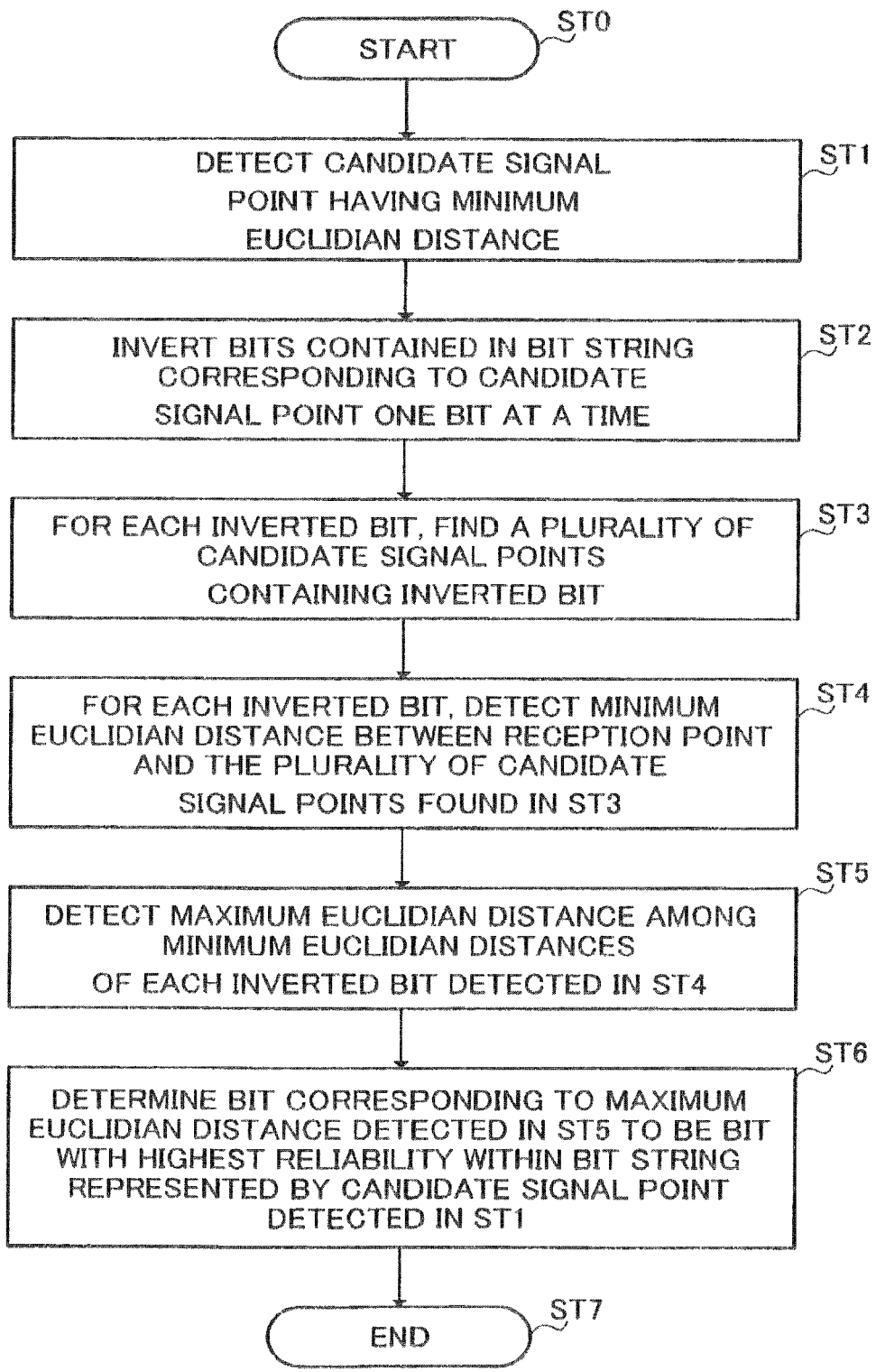
FIG. 36 is a flowchart showing the 1-bit determination processing procedure of Embodiment 8.

The above-described processing is summarized in FIG. 36.

First, when processing is started in step ST0, candidate signal point 3407 having the minimum Euclidian distance from reception point 3417 is detected in step ST1.

In step ST2, the bits contained in bit string (1, 1, 1, 1) corresponding to candidate signal point 3407 are inverted one bit at a time. In step ST3, for each inverted bit, a plurality of candidate signal points containing the inverted bit are searched for. In step ST4, for each inverted bit, the minimum Euclidian distance between a reception point and the plurality of candidate signal points found in step ST3 is detected. In step ST5, the maximum Euclidian distance is detected from among the minimum Euclidian distances of each inverted bit detected in step ST4. In step ST6, the bit corresponding to the maximum Euclidian distance detected in step ST5 is taken as the bit with the highest reliability within bit string (1, 1, 1, 1) represented by candidate signal point 3407 detected in step ST1, and this is adopted as a partial bit.

That is to say, in step ST2 through step ST6, the bit with the highest reliability within a bit string represented by a candidate signal point detected in step ST1 is determined. Then processing ends in step ST7.

Thus, according to this embodiment, 1 bit with an extremely low probability of being erroneous can be determined by: detecting a candidate signal point for which the Euclidian distance from a modulated signal reception point is a minimum; inverting the bits contained in the bit string corresponding to the detected candidate signal point one at a time; searching, for each inverted bit, for a plurality of candidate signal points containing the inverted bit; detecting, for each inverted bit, the minimum Euclidian distance between the reception point and the aforementioned found plurality of candidate signal points; detecting the maximum Euclidian distance among the minimum Euclidian distances of each aforementioned inverted bit; and determining the bit corresponding to the detected maximum Euclidian distance to be a partial bit.

If this kind of 1-bit determination algorithm is here executed by partial bit determination sections 509 and 512, a partial bit (1 bit) with an extremely low probability of being erroneous can be determined, enabling the bit error rate performances of a finally obtained received digital signal to be improved. The 1-bit determination algorithm of this embodiment is not limited to a case in which a receiving apparatus with a configuration described in an above embodiment is used, and can be widely applied to cases in which it is wished to select the bit with the lowest probability of being erroneous within a bit string represented by a signal point.

In this embodiment, 16QAM has been described as an example, but 1 bit can also be similarly determined when a different nodulation method is used. Also, this embodiment can be similarly implemented when the squares of Euclidian distances are found instead of Euclidian distances.

(Other Embodiments)

In the above embodiments, cases have mainly been described, by way of example, in which the present invention is applied to spread spectrum communication scheme and OFDM scheme. But the present invention is not limited to these cases, and similar effects can also be obtained when a single-carrier system or a multicarrier system other than OFDM, or a system combining use of a multicarrier system and spread spectrum communication scheme with MEMO transmission applied therein, is used.

Also, although cases in which modulation which has 16 signal points is used as the modulation method have mainly been described, similar effects can also be obtained when M-ary modulation other than modulation which has 16 signal points is used. That is to say, in the above embodiments, partial bits have been found as shown in FIG. 9B, FIG. 11B, and FIG. 15B when a modulation signal which has 16 signal points is received, but this is not a limitation. The same kind of effects as in the above-described embodiments can be obtained when, in the case of an m-value modulation method that transmits in bits in 1 symbol, for example, m bits are reduced to m−k bits based on k (k<m) bits found by means of partial bit determination (that is, the number of candidate signal points is reduced), and likelihood detection is performed for the reduced candidate signal points. Furthermore, the area division method used when finding partial bits is not limited to the method in FIG. 9B, FIG. 11B, FIG. 15B, FIG. 17, FIG. 18, or FIG. 19, and a different division method can be applied.

In the above embodiments, cases have mainly been described in which inverse matrix computations are performed in determining partial bits, but the partial bit determination method is not limited to this, and, essentially, the same kind of effects as in the above-described embodiments can be obtained as long as partial bits are found by means of a detection method different from likelihood detection and a detection method involving a smaller amount of computation than likelihood decoding, since the amount of computation can be reduced compared with a case in which all bits are found by means of likelihood detection.

Furthermore, in the above embodiments, a case has generally been described, by way of example, in which the number of transmitting antennas is 2, the number of receiving antennas is 2, and the number of transmit modulated signals is 2, but the present invention is not limited to this case, and can also be applied to an apparatus with n transmitting antennas, n receiving antennas, and n transmit signals (where n≥3). Moreover, the present invention can also be applied to an apparatus aimed at improving the degree of separation and/or reception quality by using more receiving antennas than transmitting antennas and transmit signals, and performing combining or selection diversity when performing separation and signal point reduction.

The present invention is not limited to the above-described embodiments, and various variations and modifications may be possible without departing from the scope of the present invention.

According to one aspect of a receiving apparatus of the present invention, a receiving apparatus that receives modulated signals transmitted from a transmitting apparatus that transmits different modulated signals from a plurality of antennas employs a configuration that includes: a channel fluctuation estimation section that finds a channel estimate of each modulated signal; a partial bit demodulation section that demodulates only some bits of a modulated signal using a detection method different from likelihood detection; a signal point reduction section that reduces the number candidate signal points using demodulated partial bits and a channel estimate; and a likelihood detection section that performs likelihood detection using a reduced number of candidate signal points and a received baseband signal.

According to this configuration, since demodulation of only some bits is performed by the partial bit demodulation section using a detection method different from likelihood detection, partial bits can be obtained with a small amount of computation. Also, since likelihood detection is performed by the likelihood detection section using a reduced number of candidate signal points, the remaining bits can be found with a high degree of precision using a small amount of computation. As likelihood detection is performed on a partial basis in this way, received digital signals with good bit error rate performances can be obtained while reducing the number of computations for finding Euclidian distances.

According to one aspect of a receiving apparatus of the present invention, a configuration is employed that further includes a control section that controls which modulated signals' partial bits are used for candidate signal point reduction by a signal point reduction section based on the reception quality of each modulated signal.

According to this configuration, compared with a case in which signal point reduction is performed by simply using partial bits of all modulated signals, it is possible to provide for partial bits with a high probability of being erroneous not to be used in signal point reduction, processing, enabling more accurate signal point reduction processing to be performed, and received digital signals with significantly better bit error rate performances to be obtained.

According to one aspect of a receiving apparatus of the present invention, a configuration is employed that further includes a control section that controls how many partial bits of each modulated signal are used for candidate signal point reduction by a signal point reduction section based on the reception quality of each modulated signal.

According to this configuration, it is possible to provide for partial bits with a high probability of being erroneous not to be used in signal point reduction processing, enabling more accurate signal point reduction processing to be performed, and received digital signals with significantly better bit error rate performances to be obtained, compared with a case in which signal point reduction is performed by simply using the same number of partial bits for all modulated signals.

According to one aspect of a receiving apparatus of the present invention, a partial bit demodulation section employs a configuration that includes: a separation section that separates a received signal into modulated signals; and a partial bit determination section that finds a candidate signal point for which the Euclidian distance from the separated modulated signal reception point is a minimum, inverts the bits contained in the bit string corresponding to the found candidate signal point one at a time, searches, for each inverted bit, for a plurality of candidate signal points containing the inverted bit, detects, for each inverted bit, the minimum Euclidian distance between the reception point and the aforementioned plurality of candidate signal points, detects the maximum Euclidian distance among the minimum Euclidian distances of each aforementioned inverted bit, and determines 1 bit corresponding to the detected maximum Euclidian distance to be a demodulation partial bit.

According to this configuration, 1 bit with an extremely low probability of being erroneous can be obtained by the partial bit determination section, enabling more accurate signal point reduction processing to be performed, and received digital signals with significantly better bit error rate performances to be obtained.

According to one aspect of a receiving apparatus of the present invention, a partial bit determination section employs a configuration that includes: a separation section that separates modulated signals by performing inverse matrix computation on a channel estimation matrix using a channel estimate; and a partial bit determination section that determines partial bits of a separated modulated signal.

According to one aspect of a receiving apparatus of the present invention, a partial bit determination section employs a configuration that includes: a separation section that separates modulated signals by performing MMSE (Minimum Mean Square Error) computation on a channel estimation matrix using a channel estimate; and a partial bit determination section that determines partial bits of separated modulated signals.

According to these configurations, partial bits can be determined, using a small amount of computation compared with a case of likelihood detection.

One aspect of a partial bit determination method of the present invention includes: a minimum distance candidate point detecting step of detecting a candidate signal point for which the Euclidian distance from a modulated signal reception point is a minimum; an inverting step of inverting the bits contained in the bit string corresponding to the detected candidate signal point one at a time; a step of searching, for each inverted bit, for a plurality of candidate signal points containing the inverted bit; a step of detecting, for each inverted bit, the minimum Euclidian distance between the reception point and the aforementioned found plurality of candidate signal points; a step of detecting the maximum Euclidian distance among the minimum Euclidian distances of each inverted bit; and a step of determining the bit corresponding to the detected maximum Euclidian distance to be a partial bit.

According to this method, the bit with the highest reliability can be determined within a bit string represented by a candidate signal point detected in the minimum distance candidate point detecting step, enabling 1 bit with an extremely low probability of being erroneous to be determined.

According to one aspect of a transmitting apparatus of the present invention, a transmitting apparatus that transmits different modulated signals from a plurality of antennas employs a configuration that includes: a modulation section that obtains a modulated signal by performing signal point mapping of transmit bits using a signal point arrangement that is divided into a plurality of signal point sets on the IQ plane, and whereby the minimum distance between signal points within a signal point set is smaller than the minimum signal point distance between signal point sets; and an antenna that transmits a modulated signal obtained by the modulation section.

According to this configuration, a bit common to signal points within a signal set can be determined easily and accurately on the receiving side. Thus, an extremely convenient transmit signal can be formed for a receiving apparatus for which demodulation of only some bits (partial bits) of a modulated signal is required.

According to one aspect of a transmitting apparatus of the present invention, a configuration is employed that further includes a coding section that codes transmit bits mapped within the same signal point set together.

According to this configuration, error correction processing can be performed on the receiving side in partial bit units common within a signal point set, enabling partial bits with a significantly lower probability of being erroneous to be obtained on the receiving side with a much simpler configuration.

According to one aspect of a transmitting apparatus of the present invention, the coding section employs a configuration that executes coding with higher error correction capability for transmit hats mapped within the same signal point set than for other transmit bits.

According to this configuration, partial bits with a significantly lower probability of being erroneous can be obtained on the receiving side.

The present application is based on Japanese Patent Application No. 2003-395219 filed on Nov. 26, 2003, and Japanese Patent Application No. 2004-290441 filed on Oct. 1, 2004, the entire content of which is expressly incorporated herein by reference.

Industrial Applicability

A receiving apparatus and transmitting apparatus of the present invention can be widely applied to radio communication systems in which different modulated signals are transmitted from a plurality of antennas, such as a MIMO (Multiple-Input Multiple-Output) system or OFDM-MIMO system, for example.

The invention claimed is:

1. A receiving apparatus comprising:
a receiver configured to receive a modulation symbol sequence; and
a decoder configured to decode the received modulation symbol sequence,
wherein the decoder comprises:
a first decoder configured to decode a first bit group included in the each received modulation symbol by a first decoding scheme, the first bit group being encoded by a first encoding process; and
a second decoder configured to decode a second bit group included in the each received modulation symbol by a second decoding scheme, the second bit group being a bit group other than the first bit group, and encoded by a second encoding process different from the first encoding process, and wherein
the first bit group comprises a plurality of bits indicating one of four regions on an IQ plane, the four regions on the IQ plane being regions into which a mapping pattern of the received modulation symbol sequence is divided, and
the second bit group comprises a plurality of bits indicating a position of the received modulation symbol sequence in the one of the four regions on the I-Q plane, and
the first encoding process has higher error correction capability than the second encoding process.

2. The receiving apparatus according to claim 1, wherein
the mapping pattern indicates a position of the each received modulation symbol on the IQ plane, the position of the each received modulation symbol being determined with the first bit group and the second bit group,
a distance between the each received modulation symbol includes a first distance and a second distance in a horizontal direction or in a vertical direction of the IQ plane is difference form each other.

3. A receiving method comprising:
receiving a modulation symbol sequence; and
decoding the received modulation symbol sequence,
wherein decoding the received modulation symbol sequence comprises:
decoding a first bit group included in the each received modulation symbol by a first decoding scheme, the first bit group being encoded by a first encoding process; and
decoding a second bit group included in the each received modulation symbol by a second decoding scheme, the second bit group being a bit group other than the first bit group, and encoded by a second encoding process different from the first encoding process, and wherein
the first bit group comprises a plurality of bits indicating one of four regions on an IQ plane, the four regions on the I lane being regions into which a mapping pattern arrangement of the received modulation symbol sequence is divided, and the second bit group comprises a plurality of bits indicating a position of the received modulation symbol sequence in the one of the four regions on the 1-0 plane, and the first encoding process has higher error correction capability than the second encoding process.

4. The receiving method according to claim 3, wherein the mapping pattern indicates a position of the each received modulation symbol on the IQ plane, the position of the each received modulation symbol being determined with the first bit group and the second bit group, a distance between the each received modulation symbol includes a first distance and a second distance in a horizontal direction or in a vertical direction of the IQ plane is difference form each other.

* * * * *

UNITED STATES PATENT AND TRADEMARK OFFICE
CERTIFICATE OF CORRECTION

PATENT NO. : 9,160,491 B2
APPLICATION NO. : 14/094420
DATED : October 13, 2015
INVENTOR(S) : Yutaka Murakami et al.

It is certified that error appears in the above-identified patent and that said Letters Patent is hereby corrected as shown below:

Title Page 2, left column, Item 56, References Cited, Foreign Patent Documents, line 3 incorrectly reads:

"JP   2000-315957   1/2000"

and should read:

"JP   2000-315957   11/2000".

Title Page 3, left column, Item 56, References Cited, Other Publications, lines 1-2 incorrectly read:

"Y. Ashina, et at, "Computational Complexity Reduction of MIMO-MLD for Space Division Multiplexing Systems," the 25th Sympo-"

and should read:

"Y. Ashina, et al., "Computational Complexity Reduction of MIMO-MLD for Space Division Multiplexing Systems," The 25th Sympo-".

In the Claims

Column 32, Claim 3, line 65 incorrectly reads:

"the I lane being regions into which a mapping pattern"

and should read:

"the IQ plane being regions into which a mapping pattern".

Signed and Sealed this
Twenty-second Day of March, 2016

Michelle K. Lee
*Director of the United States Patent and Trademark Office*

CERTIFICATE OF CORRECTION (continued)
U.S. Pat. No. 9,160,491 B2

Column 33, Claim 3, line 3 incorrectly reads:

"in the one of the four regions on the 1-0 plane, and"

and should read:

"in the one of the four regions on the I-Q plane, and".